United States Patent
Sanghavi et al.

(10) Patent No.: US 10,681,212 B2
(45) Date of Patent: *Jun. 9, 2020

(54) VIRTUAL ASSISTANT AIDED COMMUNICATION WITH 3$^{rd}$ PARTY SERVICE IN A COMMUNICATION SESSION

(71) Applicant: Apple Inc., Cupertino, CA (US)

(72) Inventors: Mehul K. Sanghavi, San Jose, CA (US); Jeffrey P. Schwerdtfeger, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/210,870

(22) Filed: Dec. 5, 2018

(65) Prior Publication Data
US 2019/0116264 A1 Apr. 18, 2019

Related U.S. Application Data

(63) Continuation of application No. 15/403,906, filed on Jan. 11, 2017, now Pat. No. 10,356,243, which is a
(Continued)

(51) Int. Cl.
*H04M 3/00* (2006.01)
*H04M 5/00* (2006.01)
(Continued)

(52) U.S. Cl.
CPC .......... *H04M 3/5183* (2013.01); *H04L 51/02* (2013.01); *H04L 51/046* (2013.01); *H04L 51/18* (2013.01);
(Continued)

(58) Field of Classification Search
CPC ....... H04L 51/02; H04L 51/046; H04L 51/18; H04L 65/1069; H04M 1/72552;
(Continued)

(56) References Cited

U.S. PATENT DOCUMENTS 6,466,654 B1 * 10/2002 Cooper ................... G10L 13/00
379/88.01
6,813,218 B1 * 11/2004 Antonelli ................ G01S 17/74
367/134
(Continued)

FOREIGN PATENT DOCUMENTS

AU 2015203483 A1 7/2015
CA 2694314 A1 8/2010
(Continued)

OTHER PUBLICATIONS

"Alexa, Turn Up the Heat!", Smartthings Samsung [online], Available online at https://web.archive.org/web/20160329142041/https://blog.smartthings.com/news/smartthingsupdates/alexa-turn-up-the-heat/, Mar. 3, 2016, 3 pages.
(Continued)

*Primary Examiner* — Khai N. Nguyen
(74) *Attorney, Agent, or Firm* — Dentons US LLP

(57) ABSTRACT

Disclosed are systems, methods, and non-transitory computer-readable storage media for utilizing a virtual assistant to assist a user with a communication session between the user and a third party service. A user can use a communication application to enter a message directed to the virtual assistant and request assistance to communicate with a 3$^{rd}$ party service. In response, the virtual assistant can access a set of communication instructions associated with the 3$^{rd}$ party service. The set of communication instructions can include a set of commands for communicating with the 3$^{rd}$ party service, services provided by the 3$^{rd}$ party service and data needed by the 3$^{rd}$ party service to facilitate communication. The virtual assistant can use the communication instructions to gather data needed by the 3$^{rd}$ party service, communicate with the 3$^{rd}$ party service and present the user with data received from the 3$^{rd}$ party service.

48 Claims, 24 Drawing Sheets

Related U.S. Application Data continuation of application No. 14/732,625, filed on Jun. 5, 2015, now Pat. No. 9,578,173.

(51) Int. Cl.
| | |
|---|---|
| *H04M 3/51* | (2006.01) |
| *H04L 12/58* | (2006.01) |
| *H04M 1/725* | (2006.01) |
| *H04M 3/42* | (2006.01) |
| *H04L 29/06* | (2006.01) |

(52) U.S. Cl.
CPC .... *H04L 65/1069* (2013.01); *H04M 1/72552* (2013.01); *H04M 3/42382* (2013.01); *H04M 3/5166* (2013.01); *H04M 2203/256* (2013.01); *H04M 2250/74* (2013.01)

(58) Field of Classification Search
CPC ....... H04M 2203/256; H04M 2250/74; H04M 3/42382; H04M 3/5166; H04M 3/5183
USPC ........... 379/210.01, 265.01, 265.02, 265.03, 379/265.04, 265.05, 265.06, 265.07, 379/265.08, 265.09, 265.1, 265.11, 379/265.12, 265.13, 265.14, 266.01, 379/266.02, 266.03, 266.04, 266.05, 379/266.06, 266.07, 266.08, 266.09, 379/266.1
See application file for complete search history.

(56) References Cited

U.S. PATENT DOCUMENTS

| | | | |
|---|---|---|---|
| 6,850,775 B1 * | 2/2005 | Berg | H04R 25/70 381/315 |
| 7,251,454 B2 * | 7/2007 | White | A63B 24/0021 455/41.1 |
| 7,475,010 B2 | 1/2009 | Chao | |
| 7,475,015 B2 | 1/2009 | Epstein et al. | |
| 7,475,063 B2 | 1/2009 | Datta et al. | |
| 7,477,238 B2 | 1/2009 | Fux et al. | |
| 7,477,240 B2 | 1/2009 | Yanagisawa | |
| 7,478,037 B2 | 1/2009 | Strong | |
| 7,478,091 B2 | 1/2009 | Mojsilovic et al. | |
| 7,478,129 B1 | 1/2009 | Chemtob | |
| 7,479,948 B2 | 1/2009 | Kim et al. | |
| 7,479,949 B2 | 1/2009 | Jobs et al. | |
| 7,483,832 B2 | 1/2009 | Tischer | |
| 7,483,894 B2 | 1/2009 | Cao | |
| 7,487,089 B2 | 2/2009 | Mozer | |
| 7,487,093 B2 | 2/2009 | Mutsuno et al. | |
| 7,490,034 B2 | 2/2009 | Finnigan et al. | |
| 7,490,039 B1 | 2/2009 | Shaffer et al. | |
| 7,493,251 B2 | 2/2009 | Gao et al. | |
| 7,493,560 B1 | 2/2009 | Kipnes et al. | |
| 7,496,498 B2 | 2/2009 | Chu et al. | |
| 7,496,512 B2 | 2/2009 | Zhao et al. | |
| 7,499,923 B2 | 3/2009 | Kawatani | |
| 7,502,738 B2 | 3/2009 | Kennewick et al. | |
| 7,505,795 B1 | 3/2009 | Lim et al. | |
| 7,508,324 B2 | 3/2009 | Suraqui | |
| 7,508,373 B2 | 3/2009 | Lin et al. | |
| 7,516,123 B2 | 4/2009 | Betz et al. | |
| 7,519,327 B2 | 4/2009 | White | |
| 7,519,398 B2 | 4/2009 | Hirose | |
| 7,522,927 B2 | 4/2009 | Fitch et al. | |
| 7,523,036 B2 | 4/2009 | Akabane et al. | |
| 7,523,108 B2 | 4/2009 | Cao | |
| 7,526,466 B2 | 4/2009 | Au | |
| 7,526,738 B2 | 4/2009 | Ording et al. | |
| 7,528,713 B2 | 5/2009 | Singh et al. | |
| 7,529,671 B2 | 5/2009 | Rockenbeck et al. | |
| 7,529,676 B2 | 5/2009 | Koyama | |
| 7,529,677 B1 | 5/2009 | Wittenber | |
| 7,535,997 B1 | 5/2009 | McQuaide, Jr. et al. | |
| 7,536,029 B2 * | 5/2009 | Choi | G01S 3/7864 348/14.04 |
| 7,536,565 B2 | 5/2009 | Girish et al. | |
| 7,538,685 B1 | 5/2009 | Cooper et al. | |
| 7,539,619 B1 | 5/2009 | Seligman et al. | |
| 7,539,656 B2 | 5/2009 | Fratkina et al. | |
| 7,541,940 B2 | 6/2009 | Upton | |
| 7,542,967 B2 | 6/2009 | Hurst-Hiller et al. | |
| 7,542,971 B2 | 6/2009 | Thione et al. | |
| 7,543,232 B2 | 6/2009 | Easton, Jr. et al. | |
| 7,546,382 B2 | 6/2009 | Healey et al. | |
| 7,546,529 B2 | 6/2009 | Reynar et al. | |
| 7,548,895 B2 | 6/2009 | Pulsipher | |
| 7,552,045 B2 | 6/2009 | Barliga et al. | |
| 7,552,055 B2 | 6/2009 | Lecoeuche | |
| 7,555,431 B2 | 6/2009 | Bennett | |
| 7,555,496 B1 | 6/2009 | Lantrip et al. | |
| 7,558,381 B1 | 7/2009 | Ali et al. | |
| 7,558,730 B2 | 7/2009 | Davis et al. | |
| 7,559,026 B2 | 7/2009 | Girish et al. | |
| 7,561,069 B2 | 7/2009 | Horstemeyer | |
| 7,562,007 B2 | 7/2009 | Hwang | |
| 7,562,032 B2 | 7/2009 | Abbosh et al. | |
| 7,565,104 B1 * | 7/2009 | Brown | H04H 60/72 455/3.01 |
| 7,565,380 B1 | 7/2009 | Venkatachary | |
| 7,568,151 B2 | 7/2009 | Bargeron et al. | |
| 7,571,092 B1 | 8/2009 | Nieh | |
| 7,571,106 B2 | 8/2009 | Cao et al. | |
| 7,577,522 B2 | 8/2009 | Rosenberg | |
| 7,580,551 B1 | 8/2009 | Srihari et al. | |
| 7,580,576 B2 | 8/2009 | Wang et al. | |
| 7,580,839 B2 | 8/2009 | Tamura et al. | |
| 7,584,092 B2 | 9/2009 | Brockett et al. | |
| 7,584,093 B2 | 9/2009 | Potter et al. | |
| 7,584,278 B2 | 9/2009 | Rajarajan et al. | |
| 7,584,429 B2 | 9/2009 | Fabritius | |
| 7,593,868 B2 | 9/2009 | Margiloff et al. | |
| 7,596,269 B2 | 9/2009 | King et al. | |
| 7,596,499 B2 | 9/2009 | Anguera et al. | |
| 7,596,606 B2 | 9/2009 | Codignotto | |
| 7,596,765 B2 | 9/2009 | Almas | |
| 7,599,918 B2 | 10/2009 | Shen et al. | |
| 7,603,349 B1 | 10/2009 | Kraft et al. | |
| 7,603,381 B2 | 10/2009 | Burke et al. | |
| 7,606,444 B1 | 10/2009 | Erol et al. | |
| 7,606,712 B1 | 10/2009 | Smith et al. | |
| 7,607,083 B2 | 10/2009 | Gong et al. | |
| 7,609,179 B2 | 10/2009 | Diaz-Gutierrez et al. | |
| 7,610,258 B2 | 10/2009 | Yuknewicz et al. | |
| 7,613,264 B2 | 11/2009 | Wells et al. | |
| 7,614,008 B2 | 11/2009 | Ording | |
| 7,617,094 B2 | 11/2009 | Aoki et al. | |
| 7,620,407 B1 | 11/2009 | Donald et al. | |
| 7,620,549 B2 | 11/2009 | Di Cristo et al. | |
| 7,620,894 B1 | 11/2009 | Kahn | |
| 7,623,119 B2 | 11/2009 | Autio et al. | |
| 7,624,007 B2 | 11/2009 | Bennett | |
| 7,627,481 B1 | 12/2009 | Kuo et al. | |
| 7,630,900 B1 | 12/2009 | Strom | |
| 7,630,901 B2 | 12/2009 | Omi | |
| 7,633,076 B2 | 12/2009 | Huppi et al. | |
| 7,634,409 B2 | 12/2009 | Kennewick et al. | |
| 7,634,413 B1 | 12/2009 | Kuo et al. | |
| 7,634,718 B2 | 12/2009 | Nakajima | |
| 7,634,732 B1 | 12/2009 | Blagsvedt et al. | |
| 7,636,657 B2 | 12/2009 | Ju et al. | |
| 7,640,158 B2 | 12/2009 | Detlef et al. | |
| 7,640,160 B2 | 12/2009 | Di Cristo et al. | |
| 7,643,990 B1 | 1/2010 | Bellegarda | |
| 7,647,225 B2 | 1/2010 | Bennett et al. | |
| 7,649,454 B2 | 1/2010 | Singh et al. | |
| 7,649,877 B2 | 1/2010 | Vieri et al. | |
| 7,653,883 B2 | 1/2010 | Hotelling et al. | |
| 7,656,393 B2 | 2/2010 | King et al. | |
| 7,657,424 B2 | 2/2010 | Bennett | |
| 7,657,828 B2 | 2/2010 | Lucas et al. | |
| 7,657,844 B2 | 2/2010 | Gibson et al. | |

(56) References Cited

U.S. PATENT DOCUMENTS

| | | | |
|---|---|---|---|
| 7,657,849 B2 | 2/2010 | Chaudhri et al. |
| 7,660,715 B1 | 2/2010 | Thambiratnam |
| 7,663,607 B2 | 2/2010 | Hotelling et al. |
| 7,664,558 B2 | 2/2010 | Lindahl et al. |
| 7,664,638 B2 | 2/2010 | Cooper et al. |
| 7,668,710 B2 | 2/2010 | Doyle |
| 7,669,134 B1 | 2/2010 | Christie et al. |
| 7,672,841 B2 | 3/2010 | Bennett |
| 7,672,952 B2 | 3/2010 | Isaacson et al. |
| 7,673,238 B2 | 3/2010 | Girish et al. |
| 7,673,251 B1 | 3/2010 | Wibisono |
| 7,673,340 B1 | 3/2010 | Cohen et al. |
| 7,676,026 B1 | 3/2010 | Baxter, Jr. |
| 7,676,365 B2 | 3/2010 | Hwang et al. |
| 7,676,463 B2 | 3/2010 | Thompson et al. |
| 7,679,534 B2 | 3/2010 | Kay et al. |
| 7,680,649 B2 | 3/2010 | Park |
| 7,681,126 B2 | 3/2010 | Roose |
| 7,683,886 B2 | 3/2010 | Willey |
| 7,683,893 B2 | 3/2010 | Kim |
| 7,684,985 B2 | 3/2010 | Dominach et al. |
| 7,684,990 B2 | 3/2010 | Caskey et al. |
| 7,684,991 B2 | 3/2010 | Stohr et al. |
| 7,689,245 B2 | 3/2010 | Cox et al. |
| 7,689,408 B2 | 3/2010 | Chen et al. |
| 7,689,409 B2 | 3/2010 | Heinecke |
| 7,689,412 B2 | 3/2010 | Wu et al. |
| 7,689,421 B2 | 3/2010 | Li et al. |
| 7,693,715 B2 | 4/2010 | Hwang et al. |
| 7,693,717 B2 | 4/2010 | Kahn et al. |
| 7,693,719 B2 | 4/2010 | Chu et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,703,091 B1 | 4/2010 | Martin et al. |
| 7,706,510 B2 | 4/2010 | Ng |
| 7,707,026 B2 | 4/2010 | Liu |
| 7,707,027 B2 | 4/2010 | Balchandran et al. |
| 7,707,032 B2 | 4/2010 | Wang et al. |
| 7,707,221 B1 * | 4/2010 | Dunning ................. G06F 16/68 707/770 |
| 7,707,226 B1 | 4/2010 | Tonse |
| 7,707,267 B2 | 4/2010 | Lisitsa et al. |
| 7,710,262 B2 | 5/2010 | Ruha |
| 7,711,129 B2 | 5/2010 | Lindahl et al. |
| 7,711,550 B1 | 5/2010 | Feinberg et al. |
| 7,711,565 B1 * | 5/2010 | Gazdzinski ............... B66B 3/00 187/396 |
| 7,711,672 B2 | 5/2010 | Au |
| 7,712,053 B2 | 5/2010 | Bradford et al. |
| 7,716,056 B2 | 5/2010 | Weng et al. |
| 7,716,216 B1 | 5/2010 | Harik et al. |
| 7,720,674 B2 | 5/2010 | Kaiser et al. |
| 7,720,683 B1 | 5/2010 | Vermeulen et al. |
| 7,721,226 B2 * | 5/2010 | Barabe .................. G06F 3/0482 715/708 |
| 7,721,301 B2 | 5/2010 | Wong et al. |
| 7,724,242 B2 | 5/2010 | Hillis et al. |
| 7,724,696 B1 | 5/2010 | Parekh |
| 7,725,307 B2 | 5/2010 | Bennett |
| 7,725,318 B2 | 5/2010 | Gavalda et al. |
| 7,725,320 B2 | 5/2010 | Bennett |
| 7,725,321 B2 | 5/2010 | Bennett |
| 7,725,838 B2 | 5/2010 | Williams |
| 7,729,904 B2 | 6/2010 | Bennett |
| 7,729,916 B2 | 6/2010 | Coffman et al. |
| 7,734,461 B2 | 6/2010 | Kwak et al. |
| 7,735,012 B2 | 6/2010 | Naik |
| 7,739,588 B2 | 6/2010 | Reynar et al. |
| 7,742,953 B2 | 6/2010 | King et al. |
| 7,743,188 B2 | 6/2010 | Haitani et al. |
| 7,747,616 B2 | 6/2010 | Yamada et al. |
| 7,752,152 B2 | 7/2010 | Paek et al. |
| 7,756,707 B2 | 7/2010 | Garner et al. |
| 7,756,708 B2 | 7/2010 | Cohen et al. |
| 7,756,868 B2 | 7/2010 | Lee |
| 7,756,871 B2 | 7/2010 | Yacoub et al. |
| 7,757,173 B2 | 7/2010 | Beaman |
| 7,757,176 B2 | 7/2010 | Vakil et al. |
| 7,757,182 B2 | 7/2010 | Elliott et al. |
| 7,761,296 B1 | 7/2010 | Bakis et al. |
| 7,763,842 B2 | 7/2010 | Hsu et al. |
| 7,774,202 B2 | 8/2010 | Spengler et al. |
| 7,774,204 B2 | 8/2010 | Mozer et al. |
| 7,774,388 B1 | 8/2010 | Runchey |
| 7,777,717 B2 | 8/2010 | Fux et al. |
| 7,778,432 B2 | 8/2010 | Larsen |
| 7,778,595 B2 | 8/2010 | White et al. |
| 7,778,632 B2 | 8/2010 | Kurlander et al. |
| 7,778,830 B2 | 8/2010 | Davis et al. |
| 7,779,353 B2 | 8/2010 | Grigoriu et al. |
| 7,779,356 B2 | 8/2010 | Griesmer |
| 7,779,357 B2 | 8/2010 | Naik |
| 7,783,283 B2 | 8/2010 | Kuusinen et al. |
| 7,783,486 B2 | 8/2010 | Rosser et al. |
| 7,788,590 B2 | 8/2010 | Taboada et al. |
| 7,788,663 B2 | 8/2010 | Illowsky et al. |
| 7,796,980 B1 | 9/2010 | McKinney et al. |
| 7,797,265 B2 | 9/2010 | Brinker et al. |
| 7,797,269 B2 | 9/2010 | Rieman et al. |
| 7,797,331 B2 | 9/2010 | Theimer et al. |
| 7,797,629 B2 | 9/2010 | Fux et al. |
| 7,801,721 B2 | 9/2010 | Rosart et al. |
| 7,801,728 B2 | 9/2010 | Ben-David et al. |
| 7,801,729 B2 | 9/2010 | Mozer |
| 7,805,299 B2 | 9/2010 | Coifman |
| 7,809,550 B1 | 10/2010 | Barrows |
| 7,809,565 B2 | 10/2010 | Coifman |
| 7,809,569 B2 | 10/2010 | Attwater et al. |
| 7,809,570 B2 | 10/2010 | Kennewick et al. |
| 7,809,610 B2 | 10/2010 | Cao |
| 7,809,744 B2 | 10/2010 | Nevidomski et al. |
| 7,818,165 B2 | 10/2010 | Carlgren et al. |
| 7,818,176 B2 | 10/2010 | Freeman et al. |
| 7,818,215 B2 | 10/2010 | King et al. |
| 7,818,291 B2 | 10/2010 | Ferguson et al. |
| 7,818,672 B2 | 10/2010 | Mccormack et al. |
| 7,822,608 B2 | 10/2010 | Cross, Jr. et al. |
| 7,823,123 B2 | 10/2010 | Sabbouh |
| 7,826,945 B2 | 11/2010 | Zhang et al. |
| 7,827,047 B2 | 11/2010 | Anderson et al. |
| 7,831,246 B1 * | 11/2010 | Smith .................... G06Q 20/40 455/408 |
| 7,831,423 B2 | 11/2010 | Schubert |
| 7,831,426 B2 | 11/2010 | Bennett |
| 7,831,432 B2 | 11/2010 | Bodin et al. |
| 7,835,504 B1 | 11/2010 | Donald et al. |
| 7,836,437 B2 | 11/2010 | Kacmarcik et al. |
| 7,840,348 B2 | 11/2010 | Kim et al. |
| 7,840,400 B2 | 11/2010 | Lavi et al. |
| 7,840,447 B2 | 11/2010 | Kleinrock et al. |
| 7,840,581 B2 | 11/2010 | Ross et al. |
| 7,840,912 B2 | 11/2010 | Elias et al. |
| 7,844,394 B2 | 11/2010 | Kim |
| 7,848,924 B2 | 12/2010 | Nurminen et al. |
| 7,848,926 B2 | 12/2010 | Goto et al. |
| 7,853,444 B2 | 12/2010 | Wang et al. |
| 7,853,445 B2 | 12/2010 | Bachenko et al. |
| 7,853,574 B2 | 12/2010 | Kraenzel et al. |
| 7,853,577 B2 | 12/2010 | Sundaresan et al. |
| 7,853,664 B1 | 12/2010 | Wang et al. |
| 7,853,900 B2 | 12/2010 | Nguyen et al. |
| 7,865,817 B2 | 1/2011 | Ryan et al. |
| 7,869,998 B1 | 1/2011 | Di Fabbrizio et al. |
| 7,869,999 B2 | 1/2011 | Amato et al. |
| 7,870,118 B2 | 1/2011 | Jiang et al. |
| 7,870,133 B2 | 1/2011 | Krishnamoorthy et al. |
| 7,873,149 B2 | 1/2011 | Schultz et al. |
| 7,873,519 B2 | 1/2011 | Bennett |
| 7,873,654 B2 | 1/2011 | Bernard |
| 7,877,705 B2 | 1/2011 | Chambers et al. |
| 7,880,730 B2 | 2/2011 | Robinson et al. |
| 7,881,283 B2 | 2/2011 | Cormier et al. |

(56) References Cited

U.S. PATENT DOCUMENTS

| | | | |
|---|---|---|---|
| 7,881,936 | B2 | 2/2011 | Longe et al. |
| 7,885,390 | B2 | 2/2011 | Chaudhuri et al. |
| 7,885,844 | B1 | 2/2011 | Cohen et al. |
| 7,886,233 | B2 | 2/2011 | Rainisto et al. |
| 7,889,101 | B2 | 2/2011 | Yokota |
| 7,889,184 | B2 | 2/2011 | Blumenberg et al. |
| 7,889,185 | B2 | 2/2011 | Blumenberg et al. |
| 7,890,330 | B2 | 2/2011 | Ozkaragoz et al. |
| 7,890,652 | B2 | 2/2011 | Bull et al. |
| 7,895,039 | B2 | 2/2011 | Braho et al. |
| 7,895,531 | B2 | 2/2011 | Radtke et al. |
| 7,899,666 | B2 | 3/2011 | Varone |
| 7,904,297 | B2 | 3/2011 | Mirkovic et al. |
| 7,908,287 | B1 | 3/2011 | Katragadda |
| 7,912,289 | B2 | 3/2011 | Kansal et al. |
| 7,912,699 | B1 | 3/2011 | Saraclar et al. |
| 7,912,702 | B2 | 3/2011 | Bennett |
| 7,912,720 | B1 | 3/2011 | Hakkani-Tur et al. |
| 7,912,828 | B2 | 3/2011 | Bonnet et al. |
| 7,913,185 | B1 | 3/2011 | Benson et al. |
| 7,916,979 | B2 | 3/2011 | Simmons |
| 7,917,367 | B2 | 3/2011 | Di Cristo et al. |
| 7,917,497 | B2 | 3/2011 | Harrison et al. |
| 7,920,678 | B2 | 4/2011 | Cooper et al. |
| 7,920,682 | B2 | 4/2011 | Byrne et al. |
| 7,920,857 | B2 | 4/2011 | Lau et al. |
| 7,925,525 | B2 | 4/2011 | Chin |
| 7,925,610 | B2 | 4/2011 | Elbaz et al. |
| 7,929,805 | B2 | 4/2011 | Wang et al. |
| 7,930,168 | B2 | 4/2011 | Weng et al. |
| 7,930,183 | B2 | 4/2011 | Odell et al. |
| 7,930,197 | B2 | 4/2011 | Ozzie et al. |
| 7,936,339 | B2 | 5/2011 | Marggraff et al. |
| 7,936,861 | B2 | 5/2011 | Martin et al. |
| 7,936,863 | B2 | 5/2011 | John et al. |
| 7,937,075 | B2 | 5/2011 | Zellner |
| 7,941,009 | B2 | 5/2011 | Li et al. |
| 7,945,294 | B2 | 5/2011 | Zhang et al. |
| 7,945,470 | B1 | 5/2011 | Cohen et al. |
| 7,949,529 | B2 | 5/2011 | Weider et al. |
| 7,949,534 | B2 | 5/2011 | Davis et al. |
| 7,949,752 | B2 | 5/2011 | Lange et al. |
| 7,953,679 | B2 | 5/2011 | Chidlovskii et al. |
| 7,957,975 | B2 | 6/2011 | Burns et al. |
| 7,958,136 | B1 | 6/2011 | Curtis et al. |
| 7,962,179 | B2 | 6/2011 | Huang |
| 7,974,835 | B2 | 7/2011 | Balchandran et al. |
| 7,974,844 | B2 | 7/2011 | Sumita |
| 7,974,972 | B2 | 7/2011 | Cao |
| 7,975,216 | B2 | 7/2011 | Woolf et al. |
| 7,983,478 | B2 | 7/2011 | Liu et al. |
| 7,983,915 | B2 | 7/2011 | Knight et al. |
| 7,983,917 | B2 | 7/2011 | Kennewick et al. |
| 7,983,919 | B2 | 7/2011 | Conkie |
| 7,983,997 | B2 | 7/2011 | Allen et al. |
| 7,984,062 | B2 | 7/2011 | Dunning et al. |
| 7,986,431 | B2 | 7/2011 | Emori et al. |
| 7,987,151 | B2 | 7/2011 | Schott et al. |
| 7,987,244 | B1 | 7/2011 | Lewis et al. |
| 7,991,614 | B2 | 8/2011 | Washio et al. |
| 7,992,085 | B2 | 8/2011 | Wang-Aryattanwanich et al. |
| 7,996,228 | B2 | 8/2011 | Miller et al. |
| 7,996,589 | B2 | 8/2011 | Schultz et al. |
| 7,996,769 | B2 | 8/2011 | Fux et al. |
| 7,996,792 | B2 | 8/2011 | Anzures et al. |
| 7,999,669 | B2 | 8/2011 | Singh et al. |
| 8,000,453 | B2 | 8/2011 | Cooper et al. |
| 8,005,664 | B2 | 8/2011 | Hanumanthappa |
| 8,005,679 | B2 | 8/2011 | Jordan et al. |
| 8,006,180 | B2 | 8/2011 | Tunning et al. |
| 8,014,308 | B2 | 9/2011 | Gates et al. |
| 8,015,006 | B2 | 9/2011 | Kennewick et al. |
| 8,015,011 | B2 | 9/2011 | Nagano et al. |
| 8,015,144 | B2 | 9/2011 | Zheng et al. |
| 8,018,431 | B1 | 9/2011 | Zehr et al. |
| 8,019,271 | B1 | 9/2011 | Izdepski |
| 8,019,604 | B2 | 9/2011 | Ma |
| 8,020,104 | B2 | 9/2011 | Roberts et al. |
| 8,024,195 | B2 | 9/2011 | Mozer et al. |
| 8,024,415 | B2 | 9/2011 | Horvitz et al. |
| 8,027,836 | B2 | 9/2011 | Baker et al. |
| 8,031,943 | B2 | 10/2011 | Chen et al. |
| 8,032,383 | B1 | 10/2011 | Bhardwaj et al. |
| 8,036,901 | B2 | 10/2011 | Mozer |
| 8,037,034 | B2 | 10/2011 | Plachta et al. |
| 8,041,557 | B2 | 10/2011 | Liu |
| 8,041,570 | B2 | 10/2011 | Mirkovic et al. |
| 8,041,611 | B2 | 10/2011 | Kleinrock et al. |
| 8,042,053 | B2 | 10/2011 | Darwish et al. |
| 8,046,363 | B2 | 10/2011 | Cha et al. |
| 8,046,374 | B1 | 10/2011 | Bromwich et al. |
| 8,050,500 | B1 | 11/2011 | Batty et al. |
| 8,054,180 | B1 | 11/2011 | Scofield et al. |
| 8,055,502 | B2 | 11/2011 | Clark et al. |
| 8,055,708 | B2 | 11/2011 | Chitsaz et al. |
| 8,056,070 | B2 | 11/2011 | Goller et al. |
| 8,060,824 | B2 | 11/2011 | Brownrigg, Jr. et al. |
| 8,064,753 | B2 | 11/2011 | Freeman |
| 8,065,143 | B2 | 11/2011 | Yanagihara |
| 8,065,155 | B2 | 11/2011 | Gazdzinski |
| 8,065,156 | B2 | 11/2011 | Gazdzinski |
| 8,068,604 | B2 | 11/2011 | Leeds et al. |
| 8,069,046 | B2 | 11/2011 | Kennewick et al. |
| 8,069,422 | B2 | 11/2011 | Sheshagiri et al. |
| 8,073,681 | B2 | 12/2011 | Baldwin et al. |
| 8,073,695 | B1 | 12/2011 | Hendricks et al. |
| 8,077,153 | B2 | 12/2011 | Benko et al. |
| 8,078,473 | B1 | 12/2011 | Gazdzinski |
| 8,082,153 | B2 | 12/2011 | Coffman et al. |
| 8,082,498 | B2 | 12/2011 | Salamon et al. |
| 8,090,571 | B2 | 1/2012 | Elshishiny et al. |
| 8,095,364 | B2 | 1/2012 | Longe et al. |
| 8,099,289 | B2 | 1/2012 | Mozer et al. |
| 8,099,395 | B2 | 1/2012 | Pabla et al. |
| 8,099,418 | B2 | 1/2012 | Inoue et al. |
| 8,103,510 | B2 | 1/2012 | Sato |
| 8,107,401 | B2 | 1/2012 | John et al. |
| 8,112,275 | B2 | 2/2012 | Kennewick et al. |
| 8,112,280 | B2 | 2/2012 | Lu |
| 8,117,037 | B2 | 2/2012 | Gazdzinski |
| 8,117,542 | B2 | 2/2012 | Radtke et al. |
| 8,121,413 | B2 | 2/2012 | Hwang et al. |
| 8,121,837 | B2 | 2/2012 | Agapi et al. |
| 8,122,094 | B1 | 2/2012 | Kotab |
| 8,122,353 | B2 | 2/2012 | Bouta |
| 8,130,929 | B2 | 3/2012 | Wilkes et al. |
| 8,131,557 | B2 | 3/2012 | Davis et al. |
| 8,135,115 | B1 | 3/2012 | Hogg, Jr. et al. |
| 8,138,912 | B2 | 3/2012 | Singh et al. |
| 8,140,330 | B2 | 3/2012 | Cevik et al. |
| 8,140,335 | B2 | 3/2012 | Kennewick et al. |
| 8,140,567 | B2 | 3/2012 | Padovitz et al. |
| 8,145,489 | B2 | 3/2012 | Freeman et al. |
| 8,150,694 | B2 | 4/2012 | Kennewick et al. |
| 8,150,700 | B2 | 4/2012 | Shin et al. |
| 8,155,956 | B2 | 4/2012 | Cho et al. |
| 8,156,005 | B2 | 4/2012 | Vieri |
| 8,160,877 | B1 | 4/2012 | Nucci et al. |
| 8,160,883 | B2 | 4/2012 | Lecoeuche |
| 8,165,321 | B2 | 4/2012 | Paquier et al. |
| 8,165,886 | B1 | 4/2012 | Gagnon et al. |
| 8,166,019 | B1 | 4/2012 | Lee et al. |
| 8,166,032 | B2 | 4/2012 | Sommer et al. |
| 8,170,790 | B2 | 5/2012 | Lee et al. |
| 8,175,872 | B2 | 5/2012 | Kristjansson et al. |
| 8,175,876 | B2 | 5/2012 | Bou-Ghazale et al. |
| 8,179,370 | B1 | 5/2012 | Yamasani et al. |
| 8,188,856 | B2 | 5/2012 | Singh et al. |
| 8,190,359 | B2 | 5/2012 | Bourne |
| 8,190,596 | B2 | 5/2012 | Nambiar et al. |
| 8,195,467 | B2 | 6/2012 | Mozer et al. |
| 8,195,468 | B2 | 6/2012 | Kennewick et al. |
| 8,200,489 | B1 | 6/2012 | Baggenstoss |
| 8,200,495 | B2 | 6/2012 | Braho et al. |

(56) References Cited

U.S. PATENT DOCUMENTS

| | | |
|---|---|---|
| 8,201,109 B2 | 6/2012 | Van Os et al. |
| 8,204,238 B2 | 6/2012 | Mozer |
| 8,205,788 B1 | 6/2012 | Gazdzinski et al. |
| 8,209,183 B1 | 6/2012 | Patel et al. |
| 8,213,911 B2 | 7/2012 | Williams et al. |
| 8,219,115 B1 | 7/2012 | Nelissen |
| 8,219,406 B2 | 7/2012 | Yu et al. |
| 8,219,407 B1 | 7/2012 | Roy et al. |
| 8,219,608 B2 | 7/2012 | alSafadi et al. |
| 8,224,649 B2 | 7/2012 | Chaudhari et al. |
| 8,224,757 B2 | 7/2012 | Bohle |
| 8,228,299 B1 | 7/2012 | Maloney et al. |
| 8,233,919 B2 | 7/2012 | Haag et al. |
| 8,234,111 B2 | 7/2012 | Lloyd et al. |
| 8,239,206 B1 | 8/2012 | LeBeau et al. |
| 8,239,207 B2 | 8/2012 | Seligman et al. |
| 8,244,712 B2 | 8/2012 | Serlet et al. |
| 8,250,071 B1 | 8/2012 | Killalea et al. |
| 8,254,829 B1 | 8/2012 | Kindred et al. |
| 8,255,216 B2 | 8/2012 | White |
| 8,255,217 B2 | 8/2012 | Stent et al. |
| 8,260,247 B2 | 9/2012 | Lazaridis et al. |
| 8,260,617 B2 | 9/2012 | Dhanakshirur et al. |
| 8,270,933 B2 | 9/2012 | Riemer et al. |
| 8,271,287 B1 | 9/2012 | Kermani |
| 8,275,621 B2 | 9/2012 | Alewine et al. |
| 8,279,171 B2 | 10/2012 | Hirai et al. |
| 8,280,438 B2 | 10/2012 | Barbera |
| 8,285,546 B2 | 10/2012 | Reich |
| 8,285,551 B2 | 10/2012 | Gazdzinski |
| 8,285,553 B2 | 10/2012 | Gazdzinski |
| 8,290,777 B1 | 10/2012 | Nguyen et al. |
| 8,290,778 B2 | 10/2012 | Gazdzinski |
| 8,290,781 B2 | 10/2012 | Gazdzinski |
| 8,296,124 B1 | 10/2012 | Holsztynska et al. |
| 8,296,145 B2 | 10/2012 | Clark et al. |
| 8,296,146 B2 | 10/2012 | Gazdzinski |
| 8,296,153 B2 | 10/2012 | Gazdzinski |
| 8,296,380 B1 | 10/2012 | Kelly et al. |
| 8,296,383 B2 | 10/2012 | Lindahl |
| 8,300,776 B2 | 10/2012 | Davies et al. |
| 8,300,801 B2 | 10/2012 | Sweeney et al. |
| 8,301,456 B2 | 10/2012 | Gazdzinski |
| 8,311,189 B2 | 11/2012 | Champlin et al. |
| 8,311,834 B1 | 11/2012 | Gazdzinski |
| 8,311,835 B2 | 11/2012 | Lecoeuche |
| 8,311,838 B2 | 11/2012 | Lindahl et al. |
| 8,312,017 B2 | 11/2012 | Martin et al. |
| 8,321,786 B2 | 11/2012 | Lunati et al. |
| 8,326,627 B2 | 12/2012 | Kennewick et al. |
| 8,332,205 B2 | 12/2012 | Krishnan et al. |
| 8,332,218 B2 | 12/2012 | Cross et al. |
| 8,332,224 B2 | 12/2012 | Di Cristo et al. |
| 8,332,748 B1 | 12/2012 | Karam |
| 8,335,689 B2 | 12/2012 | Wittenstein et al. |
| 8,340,975 B1 | 12/2012 | Rosenberger |
| 8,345,665 B2 | 1/2013 | Vieri et al. |
| 8,346,563 B1 | 1/2013 | Hjelm et al. |
| 8,352,183 B2 | 1/2013 | Thota et al. |
| 8,352,268 B2 | 1/2013 | Naik et al. |
| 8,352,272 B2 | 1/2013 | Rogers et al. |
| 8,355,919 B2 | 1/2013 | Silverman et al. |
| 8,359,234 B2 | 1/2013 | Vieri |
| 8,370,145 B2 | 2/2013 | Endo et al. |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,375,320 B2 | 2/2013 | Kotler et al. |
| 8,380,504 B1 | 2/2013 | Peden et al. |
| 8,380,507 B2 | 2/2013 | Herman et al. |
| 8,381,107 B2 | 2/2013 | Rottler et al. |
| 8,381,135 B2 | 2/2013 | Hotelling et al. |
| 8,386,485 B2 | 2/2013 | Kerschberg et al. |
| 8,386,926 B1 | 2/2013 | Matsuoka |
| 8,391,844 B2 | 3/2013 | Lamiraux et al. |
| 8,396,714 B2 | 3/2013 | Rogers et al. |
| 8,401,163 B1 | 3/2013 | Kirchhoff et al. |
| 8,406,745 B1 | 3/2013 | Upadhyay et al. |
| 8,423,288 B2 | 4/2013 | Stahl et al. |
| 8,428,758 B2 | 4/2013 | Naik et al. |
| 8,433,572 B2 | 4/2013 | Caskey et al. |
| 8,433,778 B1 | 4/2013 | Shreesha et al. |
| 8,442,821 B1 | 5/2013 | Vanhoucke |
| 8,447,612 B2 | 5/2013 | Gazdzinski |
| 8,452,597 B2 | 5/2013 | Bringert et al. |
| 8,457,959 B2 | 6/2013 | Kaiser |
| 8,458,115 B2 | 6/2013 | Cai et al. |
| 8,458,278 B2 | 6/2013 | Christie et al. |
| 8,464,150 B2 | 6/2013 | Davidson et al. |
| 8,473,289 B2 | 6/2013 | Jitkoff et al. |
| 8,479,122 B2 | 7/2013 | Hotelling et al. |
| 8,484,027 B1 | 7/2013 | Murphy |
| 8,489,599 B2 | 7/2013 | Bellotti |
| 8,498,857 B2 | 7/2013 | Kopparapu et al. |
| 8,514,197 B2 | 8/2013 | Shahraray et al. |
| 8,515,750 B1 | 8/2013 | Lei et al. |
| 8,521,513 B2 | 8/2013 | Millett et al. |
| 8,521,531 B1 | 8/2013 | Kim |
| 8,527,276 B1 | 9/2013 | Senior et al. |
| 8,537,033 B2 | 9/2013 | Gueziec |
| 8,543,375 B2 | 9/2013 | Hong |
| 8,543,397 B1 | 9/2013 | Nguyen |
| 8,543,398 B1 | 9/2013 | Strope et al. |
| 8,560,229 B1 | 10/2013 | Park et al. |
| 8,571,851 B1 | 10/2013 | Tickner et al. |
| 8,583,416 B2 | 11/2013 | Huang et al. |
| 8,583,511 B2 | 11/2013 | Hendrickson |
| 8,589,869 B2 | 11/2013 | Wolfram |
| 8,589,911 B1 | 11/2013 | Sharkey et al. |
| 8,595,004 B2 | 11/2013 | Koshinaka |
| 8,600,743 B2 | 12/2013 | Lindahl et al. |
| 8,600,746 B1 | 12/2013 | Lei et al. |
| 8,600,930 B2 | 12/2013 | Sata et al. |
| 8,606,090 B2 | 12/2013 | Eyer |
| 8,606,568 B1 | 12/2013 | Tickner et al. |
| 8,606,576 B1 | 12/2013 | Barr et al. |
| 8,620,659 B2 | 12/2013 | Di Cristo et al. |
| 8,620,662 B2 | 12/2013 | Bellegarda |
| 8,626,681 B1 | 1/2014 | Jurca et al. |
| 8,638,363 B2 | 1/2014 | King et al. |
| 8,639,516 B2 | 1/2014 | Lindahl et al. |
| 8,645,137 B2 | 2/2014 | Bellegarda et al. |
| 8,645,138 B1 | 2/2014 | Weinstein et al. |
| 8,654,936 B1 | 2/2014 | Tofighbakhsh et al. |
| 8,655,646 B2 | 2/2014 | Lee et al. |
| 8,655,901 B1 | 2/2014 | Li et al. |
| 8,660,843 B2 | 2/2014 | Falcon et al. |
| 8,660,849 B2 | 2/2014 | Gruber et al. |
| 8,660,970 B1 | 2/2014 | Fiedorowicz |
| 8,661,112 B2 | 2/2014 | Creamer et al. |
| 8,661,340 B2 | 2/2014 | Goldsmith et al. |
| 8,670,979 B2 | 3/2014 | Gruber et al. |
| 8,675,084 B2 | 3/2014 | Bolton et al. |
| 8,676,904 B2 | 3/2014 | Lindahl et al. |
| 8,677,377 B2 | 3/2014 | Cheyer et al. |
| 8,681,950 B2 | 3/2014 | Vlack et al. |
| 8,682,667 B2 | 3/2014 | Haughay et al. |
| 8,687,777 B1 | 4/2014 | Lavian et al. |
| 8,688,446 B2 | 4/2014 | Yanagihara et al. |
| 8,688,453 B1 | 4/2014 | Joshi et al. |
| 8,695,074 B2 | 4/2014 | Saraf et al. |
| 8,696,364 B2 | 4/2014 | Cohen |
| 8,706,472 B2 | 4/2014 | Ramerth et al. |
| 8,706,474 B2 | 4/2014 | Blume et al. |
| 8,706,503 B2 | 4/2014 | Cheyer et al. |
| 8,713,119 B2 | 4/2014 | Lindahl et al. |
| 8,713,418 B2 | 4/2014 | King et al. |
| 8,719,006 B2 | 5/2014 | Bellegarda et al. |
| 8,719,014 B2 | 5/2014 | Wagner et al. |
| 8,719,039 B1 | 5/2014 | Sharifi |
| 8,731,610 B2 | 5/2014 | Appaji |
| 8,731,912 B1 | 5/2014 | Tickner et al. |
| 8,731,942 B2 | 5/2014 | Cheyer et al. |
| 8,739,208 B2 | 5/2014 | Rodriguez et al. |

(56) References Cited

U.S. PATENT DOCUMENTS

| | | |
|---|---|---|
| 8,744,852 B1 | 6/2014 | Seymour et al. |
| 8,760,537 B2 | 6/2014 | Johnson et al. |
| 8,762,145 B2 | 6/2014 | Ouchi et al. |
| 8,762,156 B2 | 6/2014 | Chen et al. |
| 8,762,469 B2 | 6/2014 | Lindahl et al. |
| 8,768,693 B2 | 7/2014 | Lempel et al. |
| 8,768,702 B2 | 7/2014 | Boettcher et al. |
| 8,775,154 B2 | 7/2014 | Clinchant et al. |
| 8,775,931 B2 | 7/2014 | Fux et al. |
| 8,781,456 B2 | 7/2014 | Prociw |
| 8,781,841 B1 | 7/2014 | Wang |
| 8,798,255 B2 | 8/2014 | Lubowich et al. |
| 8,798,995 B1 | 8/2014 | Edara et al. |
| 8,799,000 B2 | 8/2014 | Guzzoni et al. |
| 8,805,690 B1 | 8/2014 | LeBeau et al. |
| 8,812,302 B2 | 8/2014 | Xiao et al. |
| 8,838,457 B2 | 9/2014 | Cerra et al. |
| 8,855,915 B2 | 10/2014 | Furuhata et al. |
| 8,861,925 B1 | 10/2014 | Ohme |
| 8,862,252 B2 | 10/2014 | Rottler et al. |
| 8,868,409 B1 | 10/2014 | Mengibar et al. |
| 8,880,405 B2 | 11/2014 | Cerra et al. |
| 8,886,534 B2 | 11/2014 | Nakano et al. |
| 8,886,540 B2 | 11/2014 | Cerra et al. |
| 8,886,541 B2 | 11/2014 | Friedlander |
| 8,892,446 B2 | 11/2014 | Cheyer et al. |
| 8,893,023 B2 | 11/2014 | Perry et al. |
| 8,898,568 B2 | 11/2014 | Bull et al. |
| 8,903,716 B2 | 12/2014 | Chen et al. |
| 8,909,693 B2 | 12/2014 | Frissora et al. |
| 8,930,176 B2 | 1/2015 | Li et al. |
| 8,930,191 B2 | 1/2015 | Gruber et al. |
| 8,938,394 B1 | 1/2015 | Faaborg et al. |
| 8,938,450 B2 | 1/2015 | Spivack et al. |
| 8,938,688 B2 | 1/2015 | Bradford et al. |
| 8,942,986 B2 | 1/2015 | Cheyer et al. |
| 8,943,423 B2 | 1/2015 | Merrill et al. |
| 8,972,240 B2 | 3/2015 | Brockett et al. |
| 8,972,432 B2 | 3/2015 | Shaw et al. |
| 8,972,878 B2 | 3/2015 | Mohler et al. |
| 8,983,383 B1 | 3/2015 | Haskin |
| 8,989,713 B2 | 3/2015 | Doulton |
| 8,990,235 B2 | 3/2015 | King et al. |
| 8,994,660 B2 | 3/2015 | Neels et al. |
| 8,996,350 B1 | 3/2015 | Dub et al. |
| 8,996,376 B2 | 3/2015 | Fleizach et al. |
| 8,996,381 B2 | 3/2015 | Mozer et al. |
| 8,996,639 B1 | 3/2015 | Faaborg et al. |
| 9,009,046 B1 | 4/2015 | Stewart |
| 9,020,804 B2 | 4/2015 | Barbaiani et al. |
| 9,026,425 B2 | 5/2015 | Nikoulina et al. |
| 9,031,834 B2 | 5/2015 | Coorman et al. |
| 9,037,967 B1 | 5/2015 | Al-Jefri et al. |
| 9,043,208 B2 | 5/2015 | Koch et al. |
| 9,049,255 B2 | 6/2015 | MacFarlane et al. |
| 9,049,295 B1 | 6/2015 | Cooper et al. |
| 9,053,706 B2 | 6/2015 | Jitkoff et al. |
| 9,058,811 B2 | 6/2015 | Wang et al. |
| 9,063,979 B2 | 6/2015 | Chiu et al. |
| 9,070,366 B1 | 6/2015 | Mathias et al. |
| 9,071,701 B2 | 6/2015 | Donaldson et al. |
| 9,076,448 B2 | 7/2015 | Bennett et al. |
| 9,076,450 B1 | 7/2015 | Sadek et al. |
| 9,081,411 B2 | 7/2015 | Kalns et al. |
| 9,081,482 B1 | 7/2015 | Zhai et al. |
| 9,082,402 B2 | 7/2015 | Yadgar et al. |
| 9,098,467 B1 | 8/2015 | Blanksteen et al. |
| 9,101,279 B2 | 8/2015 | Ritchey et al. |
| 9,112,984 B2 | 8/2015 | Sejnoha et al. |
| 9,117,447 B2 | 8/2015 | Gruber et al. |
| 9,123,338 B1 | 9/2015 | Sanders et al. |
| 9,164,983 B2 | 10/2015 | Liu et al. |
| 9,171,541 B2 | 10/2015 | Kennewick et al. |
| 9,171,546 B1 | 10/2015 | Pike |
| 9,190,062 B2 | 11/2015 | Haughay |
| 9,208,153 B1 | 12/2015 | Zaveri et al. |
| 9,218,809 B2 | 12/2015 | Bellegarda |
| 9,218,819 B1 | 12/2015 | Stekkelpak et al. |
| 9,223,537 B2 | 12/2015 | Brown et al. |
| 9,255,812 B2 | 2/2016 | Maeoka et al. |
| 9,258,604 B1 | 2/2016 | Bilobrov et al. |
| 9,262,612 B2 | 2/2016 | Cheyer |
| 9,280,535 B2 | 3/2016 | Varma et al. |
| 9,286,910 B1 | 3/2016 | Li et al. |
| 9,292,487 B1 | 3/2016 | Weber |
| 9,292,489 B1 | 3/2016 | Sak et al. |
| 9,299,344 B2 | 3/2016 | Braho et al. |
| 9,300,718 B2 | 3/2016 | Khanna |
| 9,305,543 B2 | 4/2016 | Fleizach et al. |
| 9,305,548 B2 | 4/2016 | Kennewick et al. |
| 9,311,912 B1 | 4/2016 | Swietlinski et al. |
| 9,313,317 B1 | 4/2016 | LeBeau et al. |
| 9,318,108 B2 | 4/2016 | Gruber et al. |
| 9,325,809 B1 | 4/2016 | Barros et al. |
| 9,325,842 B1 * | 4/2016 | Siddiqi ............... H04M 3/4931 |
| 9,330,659 B2 | 5/2016 | Ju et al. |
| 9,330,720 B2 | 5/2016 | Lee |
| 9,338,493 B2 | 5/2016 | Van Os et al. |
| 9,349,368 B1 | 5/2016 | LeBeau et al. |
| 9,361,084 B1 | 6/2016 | Costa |
| 9,367,541 B1 | 6/2016 | Servan et al. |
| 9,377,871 B2 | 6/2016 | Waddell et al. |
| 9,378,740 B1 | 6/2016 | Rosen et al. |
| 9,380,155 B1 | 6/2016 | Reding et al. |
| 9,383,827 B1 | 7/2016 | Faaborg et al. |
| 9,390,726 B1 | 7/2016 | Smus et al. |
| 9,396,722 B2 | 7/2016 | Chung et al. |
| 9,401,147 B2 | 7/2016 | Jitkoff et al. |
| 9,406,224 B1 | 8/2016 | Sanders et al. |
| 9,412,392 B2 | 8/2016 | Lindahl |
| 9,423,266 B2 | 8/2016 | Clark et al. |
| 9,424,840 B1 | 8/2016 | Hart et al. |
| 9,436,918 B2 | 9/2016 | Pantel et al. |
| 9,437,186 B1 | 9/2016 | Liu et al. |
| 9,437,189 B2 | 9/2016 | Epstein et al. |
| 9,454,957 B1 | 9/2016 | Mathias et al. |
| 9,465,833 B2 | 10/2016 | Aravamudan et al. |
| 9,471,566 B1 | 10/2016 | Zhang et al. |
| 9,484,021 B1 | 11/2016 | Mairesse et al. |
| 9,495,129 B2 | 11/2016 | Fleizach et al. |
| 9,501,741 B2 | 11/2016 | Cheyer et al. |
| 9,502,025 B2 | 11/2016 | Kennewick et al. |
| 9,508,028 B2 | 11/2016 | Bannister et al. |
| 9,510,044 B1 | 11/2016 | Pereira et al. |
| 9,535,906 B2 | 1/2017 | Lee et al. |
| 9,536,527 B1 | 1/2017 | Carlson |
| 9,547,647 B2 | 1/2017 | Badaskar |
| 9,548,050 B2 | 1/2017 | Gruber et al. |
| 9,569,549 B1 | 2/2017 | Jenkins et al. |
| 9,575,964 B2 | 2/2017 | Yadgar et al. |
| 9,578,173 B2 * | 2/2017 | Sanghavi ............ H04M 3/5183 |
| 9,607,612 B2 | 3/2017 | Deleeuw |
| 9,620,113 B2 | 4/2017 | Kennewick et al. |
| 9,620,126 B2 | 4/2017 | Chiba |
| 9,626,955 B2 | 4/2017 | Fleizach et al. |
| 9,633,004 B2 | 4/2017 | Giuli et al. |
| 9,633,660 B2 | 4/2017 | Haughay |
| 9,652,453 B2 | 5/2017 | Mathur et al. |
| 9,658,746 B2 | 5/2017 | Cohn et al. |
| 9,665,567 B2 | 5/2017 | Liu et al. |
| 9,668,121 B2 | 5/2017 | Naik et al. |
| 9,672,725 B2 | 6/2017 | Dotan-Cohen et al. |
| 9,691,378 B1 | 6/2017 | Meyers et al. |
| 9,697,827 B1 | 7/2017 | Lilly et al. |
| 9,720,907 B2 | 8/2017 | Bangalore et al. |
| 9,721,566 B2 | 8/2017 | Newendorp et al. |
| 9,734,839 B1 | 8/2017 | Adams |
| 9,741,343 B1 | 8/2017 | Miles et al. |
| 9,747,083 B1 | 8/2017 | Roman et al. |
| 9,755,605 B1 | 9/2017 | Li et al. |
| 9,823,811 B2 * | 11/2017 | Brown ............... G06F 3/04817 |
| 9,830,044 B2 * | 11/2017 | Brown ............... G06F 3/04817 |
| 9,842,584 B1 | 12/2017 | Hart et al. |
| 9,934,785 B1 | 4/2018 | Hulaud |

(56) References Cited

U.S. PATENT DOCUMENTS

| | | | |
|---|---|---|---|
| 9,948,728 B2 | 4/2018 | Linn et al. | |
| 9,966,068 B2 | 5/2018 | Cash et al. | |
| 9,967,381 B1 | 5/2018 | Kashimba et al. | |
| 9,990,176 B1 | 6/2018 | Gray | |
| 10,037,758 B2 | 7/2018 | Jing et al. | |
| 10,049,663 B2 | 8/2018 | Orr et al. | |
| 10,074,360 B2 | 9/2018 | Kim | |
| 10,088,972 B2* | 10/2018 | Brown | G06F 3/04817 |
| 10,096,319 B1 | 10/2018 | Jin et al. | |
| 10,102,359 B2 | 10/2018 | Cheyer | |
| 10,356,243 B2* | 7/2019 | Sanghavi | H04M 1/72552 |
| 2003/0003609 A1* | 1/2003 | Sauer | B01L 3/502761 438/14 |
| 2007/0088952 A1* | 4/2007 | Hewitt | H04L 9/3271 713/171 |
| 2009/0003115 A1 | 1/2009 | Lindahl et al. | |
| 2009/0005012 A1 | 1/2009 | Van Heugten | |
| 2009/0005891 A1 | 1/2009 | Batson et al. | |
| 2009/0006096 A1 | 1/2009 | Li et al. | |
| 2009/0006097 A1 | 1/2009 | Etezadi et al. | |
| 2009/0006099 A1 | 1/2009 | Sharpe et al. | |
| 2009/0006100 A1 | 1/2009 | Badger et al. | |
| 2009/0006343 A1 | 1/2009 | Platt et al. | |
| 2009/0006345 A1 | 1/2009 | Platt et al. | |
| 2009/0006488 A1 | 1/2009 | Lindahl et al. | |
| 2009/0006671 A1 | 1/2009 | Batson et al. | |
| 2009/0007001 A1 | 1/2009 | Morin et al. | |
| 2009/0011709 A1 | 1/2009 | Akasaka et al. | |
| 2009/0012748 A1 | 1/2009 | Beish et al. | |
| 2009/0012775 A1 | 1/2009 | El Hady et al. | |
| 2009/0018828 A1 | 1/2009 | Nakadai et al. | |
| 2009/0018829 A1 | 1/2009 | Kuperstein | |
| 2009/0018834 A1* | 1/2009 | Cooper | H04M 3/527 704/257 |
| 2009/0018835 A1 | 1/2009 | Cooper et al. | |
| 2009/0018839 A1 | 1/2009 | Cooper et al. | |
| 2009/0018840 A1 | 1/2009 | Lutz et al. | |
| 2009/0022329 A1 | 1/2009 | Mahowald | |
| 2009/0024595 A1 | 1/2009 | Chen | |
| 2009/0028435 A1 | 1/2009 | Wu et al. | |
| 2009/0030685 A1 | 1/2009 | Cerra et al. | |
| 2009/0030800 A1 | 1/2009 | Grois | |
| 2009/0030978 A1 | 1/2009 | Johnson et al. | |
| 2009/0043580 A1 | 2/2009 | Mozer et al. | |
| 2009/0043583 A1 | 2/2009 | Agapi et al. | |
| 2009/0043763 A1 | 2/2009 | Peng | |
| 2009/0044094 A1 | 2/2009 | Rapp et al. | |
| 2009/0048821 A1 | 2/2009 | Yam et al. | |
| 2009/0048841 A1 | 2/2009 | Pollet et al. | |
| 2009/0048845 A1 | 2/2009 | Burckart et al. | |
| 2009/0049067 A1 | 2/2009 | Murray | |
| 2009/0055168 A1 | 2/2009 | Wu et al. | |
| 2009/0055175 A1 | 2/2009 | Terrell et al. | |
| 2009/0055179 A1 | 2/2009 | Cho et al. | |
| 2009/0055186 A1 | 2/2009 | Lance et al. | |
| 2009/0055380 A1 | 2/2009 | Peng et al. | |
| 2009/0055381 A1 | 2/2009 | Wu et al. | |
| 2009/0055648 A1 | 2/2009 | Kim et al. | |
| 2009/0058823 A1 | 3/2009 | Kocienda | |
| 2009/0058860 A1 | 3/2009 | Fong et al. | |
| 2009/0060351 A1 | 3/2009 | Li et al. | |
| 2009/0060472 A1 | 3/2009 | Bull et al. | |
| 2009/0063974 A1 | 3/2009 | Bull et al. | |
| 2009/0064031 A1 | 3/2009 | Bull et al. | |
| 2009/0070097 A1 | 3/2009 | Wu et al. | |
| 2009/0070102 A1 | 3/2009 | Maegawa | |
| 2009/0070109 A1 | 3/2009 | Didcock et al. | |
| 2009/0070114 A1 | 3/2009 | Staszak | |
| 2009/0074214 A1 | 3/2009 | Bradford et al. | |
| 2009/0076792 A1 | 3/2009 | Lawson-Tancred | |
| 2009/0076796 A1 | 3/2009 | Daraselia | |
| 2009/0076798 A1 | 3/2009 | Oh et al. | |
| 2009/0076819 A1 | 3/2009 | Wouters et al. | |
| 2009/0076821 A1 | 3/2009 | Brenner et al. | |
| 2009/0076825 A1 | 3/2009 | Bradford et al. | |
| 2009/0077047 A1 | 3/2009 | Cooper et al. | |
| 2009/0077165 A1 | 3/2009 | Rhodes et al. | |
| 2009/0077464 A1 | 3/2009 | Goldsmith et al. | |
| 2009/0079622 A1 | 3/2009 | Seshadri et al. | |
| 2009/0083034 A1 | 3/2009 | Hernandez et al. | |
| 2009/0083035 A1 | 3/2009 | Huang et al. | |
| 2009/0083036 A1 | 3/2009 | Zhao et al. | |
| 2009/0083037 A1 | 3/2009 | Gleason et al. | |
| 2009/0083047 A1 | 3/2009 | Lindahl et al. | |
| 2009/0089058 A1 | 4/2009 | Bellegarda | |
| 2009/0091537 A1 | 4/2009 | Huang et al. | |
| 2009/0092239 A1 | 4/2009 | Macwan et al. | |
| 2009/0092260 A1 | 4/2009 | Powers | |
| 2009/0092261 A1 | 4/2009 | Bard | |
| 2009/0092262 A1 | 4/2009 | Costa et al. | |
| 2009/0094029 A1 | 4/2009 | Koch et al. | |
| 2009/0094033 A1 | 4/2009 | Mozer et al. | |
| 2009/0097634 A1 | 4/2009 | Nambiar et al. | |
| 2009/0097637 A1 | 4/2009 | Boscher et al. | |
| 2009/0098903 A1 | 4/2009 | Donaldson et al. | |
| 2009/0100049 A1 | 4/2009 | Cao | |
| 2009/0100454 A1 | 4/2009 | Weber | |
| 2009/0104898 A1 | 4/2009 | Harris | |
| 2009/0106026 A1 | 4/2009 | Ferrieux | |
| 2009/0106376 A1 | 4/2009 | Tom et al. | |
| 2009/0106397 A1 | 4/2009 | O'Keefe | |
| 2009/0112572 A1 | 4/2009 | Thorn | |
| 2009/0112576 A1 | 4/2009 | Jackson et al. | |
| 2009/0112592 A1 | 4/2009 | Candelore et al. | |
| 2009/0112596 A1 | 4/2009 | Syrdal et al. | |
| 2009/0112677 A1 | 4/2009 | Rhett | |
| 2009/0112892 A1 | 4/2009 | Cardie et al. | |
| 2009/0119587 A1 | 5/2009 | Allen et al. | |
| 2009/0123021 A1 | 5/2009 | Jung et al. | |
| 2009/0123071 A1 | 5/2009 | Iwasaki | |
| 2009/0125477 A1 | 5/2009 | Lu et al. | |
| 2009/0125602 A1 | 5/2009 | Bhatia et al. | |
| 2009/0125813 A1 | 5/2009 | Shen et al. | |
| 2009/0125947 A1 | 5/2009 | Ibaraki | |
| 2009/0128505 A1 | 5/2009 | Partridge et al. | |
| 2009/0132253 A1 | 5/2009 | Bellegarda | |
| 2009/0132255 A1 | 5/2009 | Lu | |
| 2009/0137286 A1 | 5/2009 | Luke et al. | |
| 2009/0138263 A1 | 5/2009 | Shozakai et al. | |
| 2009/0138430 A1 | 5/2009 | Nambiar et al. | |
| 2009/0138736 A1 | 5/2009 | Chin | |
| 2009/0138828 A1 | 5/2009 | Schultz et al. | |
| 2009/0144036 A1 | 6/2009 | Jorgensen et al. | |
| 2009/0144049 A1 | 6/2009 | Haddad et al. | |
| 2009/0144428 A1 | 6/2009 | Bowater et al. | |
| 2009/0144609 A1 | 6/2009 | Liang et al. | |
| 2009/0146848 A1 | 6/2009 | Ghassabian | |
| 2009/0150147 A1 | 6/2009 | Jacoby et al. | |
| 2009/0150156 A1 | 6/2009 | Kennewick et al. | |
| 2009/0152349 A1 | 6/2009 | Bonev et al. | |
| 2009/0153288 A1 | 6/2009 | Hope et al. | |
| 2009/0154669 A1 | 6/2009 | Wood et al. | |
| 2009/0157382 A1 | 6/2009 | Bar | |
| 2009/0157384 A1 | 6/2009 | Toutanova et al. | |
| 2009/0157401 A1 | 6/2009 | Bennett | |
| 2009/0158200 A1 | 6/2009 | Palahnuk et al. | |
| 2009/0158323 A1 | 6/2009 | Bober et al. | |
| 2009/0158423 A1 | 6/2009 | Orlassino et al. | |
| 2009/0160761 A1 | 6/2009 | Moosavi et al. | |
| 2009/0160803 A1 | 6/2009 | Hashimoto | |
| 2009/0163243 A1 | 6/2009 | Barbera | |
| 2009/0164301 A1 | 6/2009 | O'Sullivan et al. | |
| 2009/0164441 A1 | 6/2009 | Cheyer | |
| 2009/0164655 A1 | 6/2009 | Pettersson et al. | |
| 2009/0164937 A1 | 6/2009 | Alviar et al. | |
| 2009/0167508 A1 | 7/2009 | Fadell et al. | |
| 2009/0167509 A1 | 7/2009 | Fadell et al. | |
| 2009/0171578 A1 | 7/2009 | Kim et al. | |
| 2009/0171662 A1 | 7/2009 | Huang et al. | |
| 2009/0171664 A1 | 7/2009 | Kennewick et al. | |
| 2009/0172108 A1 | 7/2009 | Singh | |
| 2009/0172542 A1 | 7/2009 | Girish et al. | |
| 2009/0174667 A1 | 7/2009 | Kocienda et al. | |
| 2009/0174677 A1 | 7/2009 | Gehani et al. | |

(56) References Cited

U.S. PATENT DOCUMENTS

| | | |
|---|---|---|
| 2009/0177300 A1 | 7/2009 | Lee |
| 2009/0177461 A1 | 7/2009 | Ehsani et al. |
| 2009/0177966 A1 | 7/2009 | Chaudhri |
| 2009/0182445 A1 | 7/2009 | Girish et al. |
| 2009/0182549 A1 | 7/2009 | Anisimovich et al. |
| 2009/0182702 A1 | 7/2009 | Miller |
| 2009/0183070 A1 | 7/2009 | Robbins |
| 2009/0187402 A1 | 7/2009 | Scholl |
| 2009/0187577 A1 | 7/2009 | Reznik et al. |
| 2009/0187950 A1 | 7/2009 | Nicas et al. |
| 2009/0190774 A1 | 7/2009 | Wang et al. |
| 2009/0191895 A1 | 7/2009 | Singh et al. |
| 2009/0192782 A1 | 7/2009 | Drewes |
| 2009/0192787 A1 | 7/2009 | Roon |
| 2009/0192798 A1 | 7/2009 | Basson et al. |
| 2009/0198497 A1 | 8/2009 | Kwon |
| 2009/0204402 A1 | 8/2009 | Marhawa et al. |
| 2009/0204409 A1 | 8/2009 | Mozer et al. |
| 2009/0204478 A1 | 8/2009 | Kaib et al. |
| 2009/0204596 A1 | 8/2009 | Brun et al. |
| 2009/0204601 A1 | 8/2009 | Grasset |
| 2009/0204620 A1 | 8/2009 | Thione et al. |
| 2009/0210230 A1 | 8/2009 | Schwarz et al. |
| 2009/0210232 A1 | 8/2009 | Sanchez et al. |
| 2009/0213134 A1 | 8/2009 | Stephanick et al. |
| 2009/0215466 A1 | 8/2009 | Ahl et al. |
| 2009/0215503 A1 | 8/2009 | Zhang et al. |
| 2009/0216396 A1 | 8/2009 | Yamagata |
| 2009/0216528 A1 | 8/2009 | Gemello et al. |
| 2009/0216540 A1 | 8/2009 | Tessel et al. |
| 2009/0216704 A1 | 8/2009 | Zheng et al. |
| 2009/0219166 A1 | 9/2009 | MacFarlane et al. |
| 2009/0221274 A1 | 9/2009 | Venkatakrishnan et al. |
| 2009/0222257 A1 | 9/2009 | Sumita et al. |
| 2009/0222270 A2 | 9/2009 | Likens et al. |
| 2009/0222488 A1 | 9/2009 | Boerries et al. |
| 2009/0228126 A1 | 9/2009 | Spielberg et al. |
| 2009/0228273 A1 | 9/2009 | Wang et al. |
| 2009/0228277 A1 | 9/2009 | Bonforte et al. |
| 2009/0228281 A1 | 9/2009 | Singleton et al. |
| 2009/0228439 A1 | 9/2009 | Manolescu et al. |
| 2009/0228792 A1 | 9/2009 | Van Os et al. |
| 2009/0228842 A1 | 9/2009 | Westerman et al. |
| 2009/0233264 A1 | 9/2009 | Rogers et al. |
| 2009/0234638 A1 | 9/2009 | Ranjan et al. |
| 2009/0234651 A1 | 9/2009 | Basir et al. |
| 2009/0234655 A1 | 9/2009 | Kwon |
| 2009/0235280 A1 | 9/2009 | Tannier et al. |
| 2009/0239202 A1 | 9/2009 | Stone |
| 2009/0239552 A1 | 9/2009 | Churchill et al. |
| 2009/0240485 A1 | 9/2009 | Dalal et al. |
| 2009/0241054 A1 | 9/2009 | Hendricks |
| 2009/0241760 A1 | 10/2009 | Georges |
| 2009/0247237 A1 | 10/2009 | Mittleman et al. |
| 2009/0248182 A1 | 10/2009 | Logan et al. |
| 2009/0248395 A1 | 10/2009 | Alewine et al. |
| 2009/0248402 A1 | 10/2009 | Ito et al. |
| 2009/0248420 A1 | 10/2009 | Basir et al. |
| 2009/0248422 A1 | 10/2009 | Li et al. |
| 2009/0248456 A1 | 10/2009 | Fahmy et al. |
| 2009/0249198 A1 | 10/2009 | Davis et al. |
| 2009/0249247 A1 | 10/2009 | Tseng et al. |
| 2009/0252350 A1 | 10/2009 | Seguin |
| 2009/0253457 A1 | 10/2009 | Seguin |
| 2009/0253463 A1 | 10/2009 | Shin et al. |
| 2009/0254339 A1 | 10/2009 | Seguin |
| 2009/0254345 A1 | 10/2009 | Fleizach et al. |
| 2009/0254819 A1 | 10/2009 | Song et al. |
| 2009/0254823 A1 | 10/2009 | Barrett |
| 2009/0259472 A1 | 10/2009 | Schroeter |
| 2009/0259475 A1 | 10/2009 | Yamagami et al. |
| 2009/0259969 A1 | 10/2009 | Pallakoff |
| 2009/0265171 A1 | 10/2009 | Davis |
| 2009/0265368 A1 | 10/2009 | Crider et al. |
| 2009/0271109 A1 | 10/2009 | Lee et al. |
| 2009/0271175 A1 | 10/2009 | Bodin et al. |
| 2009/0271176 A1 | 10/2009 | Bodin et al. |
| 2009/0271178 A1 | 10/2009 | Bodin et al. |
| 2009/0271188 A1 | 10/2009 | Agapi et al. |
| 2009/0271189 A1 | 10/2009 | Agapi et al. |
| 2009/0274315 A1 | 11/2009 | Carnes et al. |
| 2009/0274376 A1 | 11/2009 | Selvaraj et al. |
| 2009/0278804 A1 | 11/2009 | Rubanovich et al. |
| 2009/0281789 A1 | 11/2009 | Weibel et al. |
| 2009/0284471 A1 | 11/2009 | Longe et al. |
| 2009/0284482 A1 | 11/2009 | Chin |
| 2009/0286514 A1 | 11/2009 | Lichorowic et al. |
| 2009/0287583 A1 | 11/2009 | Holmes |
| 2009/0290718 A1 | 11/2009 | Kahn et al. |
| 2009/0292987 A1 | 11/2009 | Sorenson |
| 2009/0296552 A1 | 12/2009 | Hicks et al. |
| 2009/0298474 A1 | 12/2009 | George |
| 2009/0298529 A1 | 12/2009 | Mahajan |
| 2009/0299745 A1 | 12/2009 | Kennewick et al. |
| 2009/0299849 A1 | 12/2009 | Cao et al. |
| 2009/0300391 A1 | 12/2009 | Jessup et al. |
| 2009/0300488 A1 | 12/2009 | Salamon et al. |
| 2009/0304198 A1 | 12/2009 | Herre et al. |
| 2009/0305203 A1 | 12/2009 | Okumura et al. |
| 2009/0306967 A1 | 12/2009 | Nicolov et al. |
| 2009/0306969 A1 | 12/2009 | Goud et al. |
| 2009/0306979 A1 | 12/2009 | Jaiswal et al. |
| 2009/0306980 A1 | 12/2009 | Shin |
| 2009/0306981 A1 | 12/2009 | Cromack et al. |
| 2009/0306985 A1 | 12/2009 | Roberts et al. |
| 2009/0306988 A1 | 12/2009 | Chen et al. |
| 2009/0306989 A1 | 12/2009 | Kaji |
| 2009/0307162 A1 | 12/2009 | Bui et al. |
| 2009/0307201 A1 | 12/2009 | Dunning et al. |
| 2009/0307584 A1 | 12/2009 | Davidson et al. |
| 2009/0307594 A1 | 12/2009 | Kosonen et al. |
| 2009/0309352 A1 | 12/2009 | Walker et al. |
| 2009/0313014 A1 | 12/2009 | Shin et al. |
| 2009/0313020 A1 | 12/2009 | Koivunen |
| 2009/0313023 A1 | 12/2009 | Jones |
| 2009/0313026 A1 | 12/2009 | Coffman et al. |
| 2009/0313544 A1 | 12/2009 | Wood et al. |
| 2009/0313564 A1 | 12/2009 | Rottler et al. |
| 2009/0316943 A1 | 12/2009 | Frigola Munoz et al. |
| 2009/0318119 A1 | 12/2009 | Basir et al. |
| 2009/0318198 A1 | 12/2009 | Carroll |
| 2009/0319257 A1 | 12/2009 | Blume et al. |
| 2009/0319266 A1 | 12/2009 | Brown et al. |
| 2009/0319342 A1 | 12/2009 | Shilman et al. |
| 2009/0326923 A1 | 12/2009 | Yan et al. |
| 2009/0326936 A1 | 12/2009 | Nagashima |
| 2009/0326938 A1 | 12/2009 | Marila et al. |
| 2009/0326949 A1 | 12/2009 | Douthitt et al. |
| 2009/0327977 A1 | 12/2009 | Bachfischer et al. |
| 2010/0004918 A1 | 1/2010 | Lee et al. |
| 2010/0004930 A1 | 1/2010 | Strope et al. |
| 2010/0004931 A1 | 1/2010 | Ma et al. |
| 2010/0005081 A1 | 1/2010 | Bennett |
| 2010/0010803 A1 | 1/2010 | Ishikawa et al. |
| 2010/0010814 A1 | 1/2010 | Patel |
| 2010/0010948 A1 | 1/2010 | Ito et al. |
| 2010/0013760 A1 | 1/2010 | Hirai et al. |
| 2010/0013796 A1 | 1/2010 | Abileah et al. |
| 2010/0017212 A1 | 1/2010 | Attwater et al. |
| 2010/0017382 A1 | 1/2010 | Katragadda et al. |
| 2010/0019834 A1 | 1/2010 | Zerbe et al. |
| 2010/0020035 A1 | 1/2010 | Ryu et al. |
| 2010/0023318 A1 | 1/2010 | Lemoine |
| 2010/0023320 A1 | 1/2010 | Di Cristo et al. |
| 2010/0023331 A1 | 1/2010 | Duta et al. |
| 2010/0026526 A1 | 2/2010 | Yokota |
| 2010/0030549 A1 | 2/2010 | Lee et al. |
| 2010/0030928 A1 | 2/2010 | Conroy et al. |
| 2010/0031143 A1 | 2/2010 | Rao et al. |
| 2010/0036653 A1 | 2/2010 | Kim et al. |
| 2010/0036655 A1 | 2/2010 | Cecil et al. |
| 2010/0036660 A1 | 2/2010 | Bennett |
| 2010/0036829 A1 | 2/2010 | Leyba |
| 2010/0036928 A1 | 2/2010 | Granito et al. |

(56) References Cited

U.S. PATENT DOCUMENTS

| | | |
|---|---|---|
| 2010/0037183 A1 | 2/2010 | Miyashita et al. |
| 2010/0042400 A1 | 2/2010 | Block et al. |
| 2010/0042576 A1 | 2/2010 | Roettger et al. |
| 2010/0046842 A1 | 2/2010 | Conwell et al. |
| 2010/0049498 A1 | 2/2010 | Cao et al. |
| 2010/0049514 A1 | 2/2010 | Kennewick et al. |
| 2010/0050064 A1 | 2/2010 | Liu et al. |
| 2010/0054512 A1 | 3/2010 | Solum |
| 2010/0057435 A1 | 3/2010 | Kent et al. |
| 2010/0057443 A1 | 3/2010 | Di Cristo et al. |
| 2010/0057457 A1 | 3/2010 | Ogata et al. |
| 2010/0057461 A1 | 3/2010 | Neubacher et al. |
| 2010/0057643 A1 | 3/2010 | Yang |
| 2010/0058200 A1 | 3/2010 | Jablokov et al. |
| 2010/0060646 A1 | 3/2010 | Unsal et al. |
| 2010/0063804 A1 | 3/2010 | Sato et al. |
| 2010/0063825 A1 | 3/2010 | Williams et al. |
| 2010/0063961 A1 | 3/2010 | Guiheneuf et al. |
| 2010/0064113 A1 | 3/2010 | Lindahl et al. |
| 2010/0064218 A1 | 3/2010 | Bull et al. |
| 2010/0064226 A1 | 3/2010 | Stefaniak et al. |
| 2010/0066546 A1 | 3/2010 | Aaron |
| 2010/0066684 A1 | 3/2010 | Shahraray et al. |
| 2010/0067723 A1 | 3/2010 | Bergmann et al. |
| 2010/0067867 A1 | 3/2010 | Lin et al. |
| 2010/0070281 A1 | 3/2010 | Conkie et al. |
| 2010/0070517 A1 | 3/2010 | Ghosh et al. |
| 2010/0070521 A1 | 3/2010 | Clinchant et al. |
| 2010/0070899 A1 | 3/2010 | Hunt et al. |
| 2010/0071003 A1 | 3/2010 | Bychkov et al. |
| 2010/0076760 A1 | 3/2010 | Kraenzel et al. |
| 2010/0076993 A1 | 3/2010 | Klawitter et al. |
| 2010/0077350 A1 | 3/2010 | Lim et al. |
| 2010/0079501 A1 | 4/2010 | Ikeda et al. |
| 2010/0080398 A1 | 4/2010 | Waldmann |
| 2010/0080470 A1 | 4/2010 | Deluca et al. |
| 2010/0081456 A1 | 4/2010 | Singh et al. |
| 2010/0081487 A1 | 4/2010 | Chen et al. |
| 2010/0082286 A1 | 4/2010 | Leung |
| 2010/0082327 A1 | 4/2010 | Rogers et al. |
| 2010/0082328 A1 | 4/2010 | Rogers et al. |
| 2010/0082329 A1 | 4/2010 | Silverman et al. |
| 2010/0082333 A1 | 4/2010 | Al-Shammari |
| 2010/0082346 A1 | 4/2010 | Rogers et al. |
| 2010/0082347 A1 | 4/2010 | Rogers et al. |
| 2010/0082348 A1 | 4/2010 | Silverman et al. |
| 2010/0082349 A1 | 4/2010 | Bellegarda et al. |
| 2010/0082376 A1 | 4/2010 | Levitt |
| 2010/0082567 A1 | 4/2010 | Rosenblatt et al. |
| 2010/0082970 A1 | 4/2010 | Lindahl et al. |
| 2010/0086152 A1 | 4/2010 | Rank et al. |
| 2010/0086153 A1 | 4/2010 | Hagen et al. |
| 2010/0086156 A1 | 4/2010 | Rank et al. |
| 2010/0088020 A1 | 4/2010 | Sano et al. |
| 2010/0088093 A1 | 4/2010 | Lee et al. |
| 2010/0088100 A1 | 4/2010 | Lindahl |
| 2010/0094632 A1 | 4/2010 | Davis et al. |
| 2010/0098231 A1 | 4/2010 | Wohlert et al. |
| 2010/0100212 A1 | 4/2010 | Lindahl et al. |
| 2010/0100384 A1 | 4/2010 | Ju et al. |
| 2010/0100385 A1 | 4/2010 | Davis et al. |
| 2010/0100816 A1 | 4/2010 | Mccloskey et al. |
| 2010/0103776 A1 | 4/2010 | Chan |
| 2010/0106486 A1 | 4/2010 | Hua et al. |
| 2010/0106498 A1 | 4/2010 | Morrison et al. |
| 2010/0106500 A1 | 4/2010 | McKee et al. |
| 2010/0106503 A1 | 4/2010 | Farrell et al. |
| 2010/0114856 A1 | 5/2010 | Kuboyama |
| 2010/0114887 A1 | 5/2010 | Conway et al. |
| 2010/0121637 A1 | 5/2010 | Roy et al. |
| 2010/0125456 A1 | 5/2010 | Weng et al. |
| 2010/0125458 A1 | 5/2010 | Franco et al. |
| 2010/0125460 A1 | 5/2010 | Mellott et al. |
| 2010/0125811 A1 | 5/2010 | Moore et al. |
| 2010/0128701 A1 | 5/2010 | Nagaraja |
| 2010/0131269 A1 | 5/2010 | Park et al. |
| 2010/0131273 A1 | 5/2010 | Aley-Raz et al. |
| 2010/0131498 A1 | 5/2010 | Linthicum et al. |
| 2010/0131899 A1 | 5/2010 | Hubert |
| 2010/0138215 A1 | 6/2010 | Williams |
| 2010/0138224 A1 | 6/2010 | Bedingfield, Sr. |
| 2010/0138416 A1 | 6/2010 | Bellotti |
| 2010/0138680 A1 | 6/2010 | Brisebois et al. |
| 2010/0138759 A1 | 6/2010 | Roy |
| 2010/0138798 A1 | 6/2010 | Wilson et al. |
| 2010/0142740 A1 | 6/2010 | Roerup |
| 2010/0145694 A1 | 6/2010 | Ju et al. |
| 2010/0145700 A1 | 6/2010 | Kennewick et al. |
| 2010/0145707 A1 | 6/2010 | Ljolje et al. |
| 2010/0146442 A1 | 6/2010 | Nagasaka et al. |
| 2010/0150321 A1 | 6/2010 | Harris et al. |
| 2010/0153114 A1 | 6/2010 | Shih et al. |
| 2010/0153115 A1 | 6/2010 | Klee et al. |
| 2010/0153448 A1 | 6/2010 | Harpur et al. |
| 2010/0161311 A1 | 6/2010 | Massuh |
| 2010/0161313 A1 | 6/2010 | Karttunen |
| 2010/0161337 A1 | 6/2010 | Pulz et al. |
| 2010/0161554 A1 | 6/2010 | Datuashvili et al. |
| 2010/0164897 A1 | 7/2010 | Morin et al. |
| 2010/0169075 A1 | 7/2010 | Raffa et al. |
| 2010/0169093 A1 | 7/2010 | Washio |
| 2010/0169097 A1 | 7/2010 | Nachman et al. |
| 2010/0169098 A1 | 7/2010 | Patch |
| 2010/0171713 A1 | 7/2010 | Kwok et al. |
| 2010/0174544 A1 | 7/2010 | Heifets |
| 2010/0175066 A1 | 7/2010 | Paik |
| 2010/0179932 A1 | 7/2010 | Yoon et al. |
| 2010/0179991 A1 | 7/2010 | Lorch et al. |
| 2010/0180218 A1 | 7/2010 | Boston et al. |
| 2010/0185448 A1 | 7/2010 | Meisel |
| 2010/0185949 A1 | 7/2010 | Jaeger |
| 2010/0191520 A1 | 7/2010 | Gruhn et al. |
| 2010/0197359 A1 | 8/2010 | Harris |
| 2010/0199180 A1 | 8/2010 | Brichter et al. |
| 2010/0199215 A1 | 8/2010 | Seymour et al. |
| 2010/0204986 A1 | 8/2010 | Kennewick et al. |
| 2010/0211199 A1 | 8/2010 | Naik et al. |
| 2010/0211379 A1 | 8/2010 | Gorman et al. |
| 2010/0211644 A1 | 8/2010 | Lavoie et al. |
| 2010/0216509 A1 | 8/2010 | Riemer et al. |
| 2010/0217604 A1 | 8/2010 | Baldwin et al. |
| 2010/0222033 A1 | 9/2010 | Scott et al. |
| 2010/0222098 A1 | 9/2010 | Garg |
| 2010/0223055 A1 | 9/2010 | Mclean |
| 2010/0223056 A1 | 9/2010 | Kadirkamanathan et al. |
| 2010/0223131 A1 | 9/2010 | Scott et al. |
| 2010/0225599 A1 | 9/2010 | Danielsson et al. |
| 2010/0225809 A1 | 9/2010 | Connors et al. |
| 2010/0227642 A1 | 9/2010 | Kim et al. |
| 2010/0228540 A1 | 9/2010 | Bennett |
| 2010/0228549 A1 | 9/2010 | Herman et al. |
| 2010/0228691 A1 | 9/2010 | Yang et al. |
| 2010/0229082 A1 | 9/2010 | Karmarkar et al. |
| 2010/0229100 A1 | 9/2010 | Miller et al. |
| 2010/0231474 A1 | 9/2010 | Yamagajo et al. |
| 2010/0235167 A1 | 9/2010 | Bourdon |
| 2010/0235341 A1 | 9/2010 | Bennett |
| 2010/0235729 A1 | 9/2010 | Kocienda et al. |
| 2010/0235732 A1 | 9/2010 | Bergman |
| 2010/0235770 A1 | 9/2010 | Ording et al. |
| 2010/0235780 A1 | 9/2010 | Westerman et al. |
| 2010/0241418 A1 | 9/2010 | Maeda et al. |
| 2010/0250542 A1 | 9/2010 | Fujimaki |
| 2010/0250599 A1 | 9/2010 | Schmidt et al. |
| 2010/0255858 A1 | 10/2010 | Juhasz |
| 2010/0257160 A1 | 10/2010 | Cao |
| 2010/0257478 A1 | 10/2010 | Longe et al. |
| 2010/0262599 A1 | 10/2010 | Nitz |
| 2010/0263015 A1 | 10/2010 | Pandey et al. |
| 2010/0268537 A1 | 10/2010 | Al-Telmissani |
| 2010/0268539 A1 | 10/2010 | Xu et al. |
| 2010/0269040 A1 | 10/2010 | Lee |
| 2010/0274753 A1 | 10/2010 | Liberty et al. |
| 2010/0277579 A1 | 11/2010 | Cho et al. |

(56) References Cited

U.S. PATENT DOCUMENTS

| | | |
|---|---|---|
| 2010/0278320 A1 | 11/2010 | Arsenault et al. |
| 2010/0278453 A1 | 11/2010 | King |
| 2010/0280983 A1 | 11/2010 | Cho et al. |
| 2010/0281034 A1 | 11/2010 | Petrou et al. |
| 2010/0286984 A1 | 11/2010 | Wandinger et al. |
| 2010/0286985 A1 | 11/2010 | Kennewick et al. |
| 2010/0287514 A1 | 11/2010 | Cragun et al. |
| 2010/0290632 A1 | 11/2010 | Lin |
| 2010/0293460 A1 | 11/2010 | Budelli |
| 2010/0295645 A1 | 11/2010 | Falldin et al. |
| 2010/0299133 A1 | 11/2010 | Kopparapu et al. |
| 2010/0299138 A1 | 11/2010 | Kim |
| 2010/0299142 A1 | 11/2010 | Freeman et al. |
| 2010/0302056 A1 | 12/2010 | Dutton et al. |
| 2010/0304342 A1 | 12/2010 | Zilber |
| 2010/0304705 A1 | 12/2010 | Hursey et al. |
| 2010/0305807 A1 | 12/2010 | Basir et al. |
| 2010/0305947 A1 | 12/2010 | Schwarz et al. |
| 2010/0312547 A1 | 12/2010 | Van Os et al. |
| 2010/0312566 A1 | 12/2010 | Odinak et al. |
| 2010/0318366 A1 | 12/2010 | Sullivan et al. |
| 2010/0318576 A1 | 12/2010 | Kim |
| 2010/0322438 A1 | 12/2010 | Siotis |
| 2010/0324709 A1 | 12/2010 | Starmen |
| 2010/0324895 A1 | 12/2010 | Kurzweil et al. |
| 2010/0324896 A1 | 12/2010 | Attwater et al. |
| 2010/0324905 A1 | 12/2010 | Kurzweil et al. |
| 2010/0325131 A1 | 12/2010 | Dumais et al. |
| 2010/0325158 A1 | 12/2010 | Oral et al. |
| 2010/0325573 A1 | 12/2010 | Estrada et al. |
| 2010/0325588 A1 | 12/2010 | Reddy et al. |
| 2010/0330908 A1 | 12/2010 | Maddern et al. |
| 2010/0332220 A1 | 12/2010 | Hursey et al. |
| 2010/0332224 A1 | 12/2010 | Mäkelä et al. |
| 2010/0332235 A1 | 12/2010 | David |
| 2010/0332236 A1 | 12/2010 | Tan |
| 2010/0332280 A1 | 12/2010 | Bradley et al. |
| 2010/0332348 A1 | 12/2010 | Cao |
| 2010/0332428 A1 | 12/2010 | Mchenry et al. |
| 2010/0332976 A1 | 12/2010 | Fux et al. |
| 2010/0333030 A1 | 12/2010 | Johns |
| 2010/0333163 A1 | 12/2010 | Daly |
| 2011/0002487 A1 | 1/2011 | Panther et al. |
| 2011/0004475 A1 | 1/2011 | Bellegarda |
| 2011/0006876 A1 | 1/2011 | Moberg et al. |
| 2011/0009107 A1 | 1/2011 | Guba et al. |
| 2011/0010178 A1 | 1/2011 | Lee et al. |
| 2011/0010644 A1 | 1/2011 | Merrill et al. |
| 2011/0015928 A1 | 1/2011 | Odell et al. |
| 2011/0016150 A1 | 1/2011 | Engstrom et al. |
| 2011/0016421 A1 | 1/2011 | Krupka et al. |
| 2011/0018695 A1 | 1/2011 | Bells et al. |
| 2011/0021211 A1 | 1/2011 | Ohki |
| 2011/0021213 A1 | 1/2011 | Carr |
| 2011/0022292 A1 | 1/2011 | Shen et al. |
| 2011/0022388 A1 | 1/2011 | Wu et al. |
| 2011/0022393 A1 | 1/2011 | Waller et al. |
| 2011/0022394 A1 | 1/2011 | Wide et al. |
| 2011/0022472 A1 | 1/2011 | Zon et al. |
| 2011/0022952 A1 | 1/2011 | Wu et al. |
| 2011/0029616 A1 | 2/2011 | Wang et al. |
| 2011/0030067 A1 | 2/2011 | Wilson |
| 2011/0033064 A1 | 2/2011 | Johnson et al. |
| 2011/0034183 A1 | 2/2011 | Haag et al. |
| 2011/0035144 A1 | 2/2011 | Okamoto et al. |
| 2011/0035434 A1 | 2/2011 | Lockwood |
| 2011/0038489 A1 | 2/2011 | Visser et al. |
| 2011/0040707 A1 | 2/2011 | Theisen et al. |
| 2011/0045841 A1 | 2/2011 | Kuhlke et al. |
| 2011/0047072 A1 | 2/2011 | Ciurea |
| 2011/0047149 A1 | 2/2011 | Vaananen |
| 2011/0047161 A1 | 2/2011 | Myaeng et al. |
| 2011/0047246 A1* | 2/2011 | Frissora ............... G06F 9/543 709/219 |
| 2011/0047266 A1 | 2/2011 | Yu et al. |
| 2011/0047605 A1 | 2/2011 | Sontag et al. |
| 2011/0050591 A1 | 3/2011 | Kim et al. |
| 2011/0050592 A1 | 3/2011 | Kim et al. |
| 2011/0054647 A1 | 3/2011 | Chipchase |
| 2011/0054894 A1 | 3/2011 | Phillips et al. |
| 2011/0054901 A1 | 3/2011 | Qin et al. |
| 2011/0055256 A1 | 3/2011 | Phillips et al. |
| 2011/0060584 A1 | 3/2011 | Ferrucci et al. |
| 2011/0060587 A1 | 3/2011 | Phillips et al. |
| 2011/0060589 A1 | 3/2011 | Weinberg et al. |
| 2011/0060807 A1 | 3/2011 | Martin et al. |
| 2011/0064387 A1 | 3/2011 | Mendeloff et al. |
| 2011/0065456 A1 | 3/2011 | Brennan et al. |
| 2011/0066366 A1 | 3/2011 | Ellanti et al. |
| 2011/0066436 A1 | 3/2011 | Bezar |
| 2011/0066468 A1 | 3/2011 | Huang et al. |
| 2011/0066634 A1 | 3/2011 | Phillips et al. |
| 2011/0072033 A1 | 3/2011 | White et al. |
| 2011/0072492 A1 | 3/2011 | Mohler et al. |
| 2011/0076994 A1 | 3/2011 | Kim et al. |
| 2011/0077943 A1 | 3/2011 | Miki et al. |
| 2011/0080260 A1 | 4/2011 | Wang et al. |
| 2011/0081889 A1 | 4/2011 | Gao et al. |
| 2011/0082688 A1 | 4/2011 | Kim et al. |
| 2011/0083079 A1 | 4/2011 | Farrell et al. |
| 2011/0087491 A1 | 4/2011 | Wittenstein et al. |
| 2011/0087685 A1 | 4/2011 | Lin et al. |
| 2011/0090078 A1 | 4/2011 | Kim et al. |
| 2011/0092187 A1 | 4/2011 | Miller |
| 2011/0093261 A1 | 4/2011 | Angott |
| 2011/0093265 A1 | 4/2011 | Stent et al. |
| 2011/0093271 A1 | 4/2011 | Bernard et al. |
| 2011/0093272 A1 | 4/2011 | Isobe et al. |
| 2011/0099000 A1 | 4/2011 | Rai et al. |
| 2011/0103682 A1 | 5/2011 | Chidlovskii et al. |
| 2011/0105097 A1 | 5/2011 | Tadayon et al. |
| 2011/0106736 A1 | 5/2011 | Aharonson et al. |
| 2011/0106892 A1 | 5/2011 | Nelson et al. |
| 2011/0110502 A1 | 5/2011 | Daye et al. |
| 2011/0111724 A1 | 5/2011 | Baptiste |
| 2011/0112825 A1 | 5/2011 | Bellegarda |
| 2011/0112827 A1 | 5/2011 | Kennewick et al. |
| 2011/0112837 A1 | 5/2011 | Kurki-Suonio et al. |
| 2011/0112838 A1 | 5/2011 | Adibi |
| 2011/0112921 A1 | 5/2011 | Kennewick et al. |
| 2011/0116610 A1 | 5/2011 | Shaw et al. |
| 2011/0119049 A1 | 5/2011 | Ylonen |
| 2011/0119051 A1 | 5/2011 | Li et al. |
| 2011/0119623 A1 | 5/2011 | Kim |
| 2011/0119715 A1 | 5/2011 | Chang et al. |
| 2011/0123004 A1 | 5/2011 | Chang et al. |
| 2011/0125498 A1 | 5/2011 | Pickering et al. |
| 2011/0125540 A1 | 5/2011 | Jang et al. |
| 2011/0125701 A1 | 5/2011 | Nair et al. |
| 2011/0130958 A1 | 6/2011 | Stahl et al. |
| 2011/0131036 A1 | 6/2011 | DiCristo et al. |
| 2011/0131038 A1 | 6/2011 | Oyaizu et al. |
| 2011/0131045 A1 | 6/2011 | Cristo et al. |
| 2011/0137636 A1 | 6/2011 | Srihari et al. |
| 2011/0137664 A1 | 6/2011 | Kho et al. |
| 2011/0141141 A1 | 6/2011 | Kankainen |
| 2011/0143726 A1 | 6/2011 | de Silva |
| 2011/0143811 A1 | 6/2011 | Rodriguez |
| 2011/0144857 A1 | 6/2011 | Wingrove et al. |
| 2011/0144901 A1 | 6/2011 | Wang |
| 2011/0144973 A1 | 6/2011 | Bocchieri et al. |
| 2011/0144999 A1 | 6/2011 | Jang et al. |
| 2011/0145718 A1 | 6/2011 | Ketola et al. |
| 2011/0151830 A1 | 6/2011 | Blanda et al. |
| 2011/0153209 A1 | 6/2011 | Geelen |
| 2011/0153322 A1 | 6/2011 | Kwak et al. |
| 2011/0153324 A1 | 6/2011 | Ballinger et al. |
| 2011/0153329 A1 | 6/2011 | Moorer |
| 2011/0153330 A1 | 6/2011 | Yazdani et al. |
| 2011/0153373 A1 | 6/2011 | Dantzig et al. |
| 2011/0154193 A1 | 6/2011 | Creutz et al. |
| 2011/0157029 A1 | 6/2011 | Tseng |
| 2011/0161072 A1 | 6/2011 | Terao et al. |
| 2011/0161076 A1 | 6/2011 | Davis et al. |

(56) References Cited

U.S. PATENT DOCUMENTS

| | | |
|---|---|---|
| 2011/0161079 A1 | 6/2011 | Gruhn et al. |
| 2011/0161309 A1 | 6/2011 | Lung et al. |
| 2011/0161852 A1 | 6/2011 | Vainio et al. |
| 2011/0166851 A1 | 7/2011 | LeBeau et al. |
| 2011/0167350 A1 | 7/2011 | Hoellwarth |
| 2011/0175810 A1 | 7/2011 | Markovic et al. |
| 2011/0178804 A1 | 7/2011 | Inoue et al. |
| 2011/0179002 A1 | 7/2011 | Dumitru et al. |
| 2011/0179372 A1 | 7/2011 | Moore et al. |
| 2011/0183650 A1 | 7/2011 | Mckee et al. |
| 2011/0184721 A1 | 7/2011 | Subramanian et al. |
| 2011/0184730 A1 | 7/2011 | LeBeau et al. |
| 2011/0184736 A1 | 7/2011 | Slotznick |
| 2011/0184737 A1 | 7/2011 | Nakano et al. |
| 2011/0184768 A1 | 7/2011 | Norton et al. |
| 2011/0185288 A1 | 7/2011 | Gupta et al. |
| 2011/0191108 A1 | 8/2011 | Friedlander |
| 2011/0191271 A1 | 8/2011 | Baker et al. |
| 2011/0191344 A1 | 8/2011 | Jin et al. |
| 2011/0195758 A1 | 8/2011 | Damale et al. |
| 2011/0196670 A1 | 8/2011 | Dang et al. |
| 2011/0197128 A1 | 8/2011 | Assadollahi et al. |
| 2011/0199312 A1 | 8/2011 | Okuta |
| 2011/0201385 A1 | 8/2011 | Higginbotham et al. |
| 2011/0201387 A1 | 8/2011 | Paek et al. |
| 2011/0202526 A1 | 8/2011 | Lee et al. |
| 2011/0205149 A1 | 8/2011 | Tom et al. |
| 2011/0208511 A1 | 8/2011 | Sikstrom et al. |
| 2011/0208524 A1 | 8/2011 | Haughay |
| 2011/0209088 A1 | 8/2011 | Hinckley et al. |
| 2011/0212717 A1 | 9/2011 | Rhoads et al. |
| 2011/0216093 A1 | 9/2011 | Griffin |
| 2011/0218806 A1 | 9/2011 | Alewine et al. |
| 2011/0218855 A1 | 9/2011 | Cao et al. |
| 2011/0219018 A1 | 9/2011 | Bailey et al. |
| 2011/0223893 A1 | 9/2011 | Lau et al. |
| 2011/0224972 A1 | 9/2011 | Millett et al. |
| 2011/0228913 A1 | 9/2011 | Cochinwala et al. |
| 2011/0231182 A1 | 9/2011 | Weider et al. |
| 2011/0231184 A1 | 9/2011 | Kerr |
| 2011/0231188 A1 | 9/2011 | Kennewick et al. |
| 2011/0231432 A1 | 9/2011 | Sata et al. |
| 2011/0231474 A1 | 9/2011 | Locker et al. |
| 2011/0238191 A1 | 9/2011 | Kristjansson et al. |
| 2011/0238407 A1 | 9/2011 | Kent |
| 2011/0238408 A1 | 9/2011 | Larcheveque et al. |
| 2011/0238676 A1 | 9/2011 | Liu et al. |
| 2011/0239111 A1 | 9/2011 | Grover |
| 2011/0242007 A1 | 10/2011 | Gray et al. |
| 2011/0244888 A1 | 10/2011 | Ohki |
| 2011/0246471 A1 | 10/2011 | Rakib et al. |
| 2011/0249144 A1 | 10/2011 | Chang |
| 2011/0250570 A1 | 10/2011 | Mack et al. |
| 2011/0257966 A1 | 10/2011 | Rychlik |
| 2011/0258188 A1 | 10/2011 | Abdalmageed et al. |
| 2011/0260829 A1 | 10/2011 | Lee |
| 2011/0260861 A1 | 10/2011 | Singh et al. |
| 2011/0264643 A1 | 10/2011 | Cao |
| 2011/0264999 A1 | 10/2011 | Bells et al. |
| 2011/0274303 A1 | 11/2011 | Filson et al. |
| 2011/0276595 A1 | 11/2011 | Kirkland et al. |
| 2011/0276598 A1 | 11/2011 | Kozempel |
| 2011/0276944 A1 | 11/2011 | Bergman et al. |
| 2011/0279368 A1 | 11/2011 | Klein et al. |
| 2011/0282663 A1 | 11/2011 | Talwar et al. |
| 2011/0282888 A1 | 11/2011 | Koperski et al. |
| 2011/0282906 A1 | 11/2011 | Wong |
| 2011/0283189 A1 | 11/2011 | McCarty |
| 2011/0288852 A1 | 11/2011 | Dymetman et al. |
| 2011/0288855 A1 | 11/2011 | Roy |
| 2011/0288861 A1 | 11/2011 | Kurzweil et al. |
| 2011/0288863 A1 | 11/2011 | Rasmussen |
| 2011/0288866 A1 | 11/2011 | Rasmussen |
| 2011/0298585 A1 | 12/2011 | Barry |
| 2011/0301943 A1 | 12/2011 | Patch |
| 2011/0302162 A1 | 12/2011 | Xiao et al. |
| 2011/0302645 A1 | 12/2011 | Headley |
| 2011/0306426 A1 | 12/2011 | Novak et al. |
| 2011/0307241 A1 | 12/2011 | Waibel et al. |
| 2011/0307254 A1 | 12/2011 | Hunt et al. |
| 2011/0307491 A1 | 12/2011 | Fisk et al. |
| 2011/0307810 A1 | 12/2011 | Hilerio et al. |
| 2011/0313775 A1 | 12/2011 | Laligand et al. |
| 2011/0314003 A1 | 12/2011 | Ju et al. |
| 2011/0314032 A1 | 12/2011 | Bennett et al. |
| 2011/0314404 A1 | 12/2011 | Kotler et al. |
| 2011/0314539 A1 | 12/2011 | Horton |
| 2011/0320187 A1 | 12/2011 | Motik et al. |
| 2012/0002820 A1 | 1/2012 | Leichter |
| 2012/0005602 A1 | 1/2012 | Anttila et al. |
| 2012/0008754 A1 | 1/2012 | Mukherjee et al. |
| 2012/0010886 A1 | 1/2012 | Razavilar |
| 2012/0011138 A1 | 1/2012 | Dunning et al. |
| 2012/0013609 A1 | 1/2012 | Reponen et al. |
| 2012/0015629 A1 | 1/2012 | Olsen et al. |
| 2012/0016658 A1 | 1/2012 | Wu et al. |
| 2012/0016678 A1 | 1/2012 | Gruber et al. |
| 2012/0019400 A1 | 1/2012 | Patel et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022872 A1 | 1/2012 | Gruber et al. |
| 2012/0022874 A1 | 1/2012 | Lloyd et al. |
| 2012/0022876 A1 | 1/2012 | LeBeau et al. |
| 2012/0022967 A1 | 1/2012 | Bachman et al. |
| 2012/0023088 A1 | 1/2012 | Cheng et al. |
| 2012/0023095 A1 | 1/2012 | Wadycki et al. |
| 2012/0023462 A1 | 1/2012 | Rosing et al. |
| 2012/0029661 A1 | 2/2012 | Jones et al. |
| 2012/0029910 A1 | 2/2012 | Medlock et al. |
| 2012/0034904 A1 | 2/2012 | LeBeau et al. |
| 2012/0035907 A1 | 2/2012 | Lebeau et al. |
| 2012/0035908 A1 | 2/2012 | Lebeau et al. |
| 2012/0035924 A1 | 2/2012 | Jitkoff et al. |
| 2012/0035925 A1 | 2/2012 | Friend et al. |
| 2012/0035926 A1 | 2/2012 | Ambler |
| 2012/0035931 A1 | 2/2012 | LeBeau et al. |
| 2012/0035932 A1 | 2/2012 | Jitkoff et al. |
| 2012/0035935 A1 | 2/2012 | Park et al. |
| 2012/0036556 A1 | 2/2012 | LeBeau et al. |
| 2012/0039539 A1 | 2/2012 | Boiman et al. |
| 2012/0041752 A1 | 2/2012 | Wang et al. |
| 2012/0042014 A1 | 2/2012 | Desai et al. |
| 2012/0042343 A1 | 2/2012 | Laligand et al. |
| 2012/0053815 A1 | 3/2012 | Montanari et al. |
| 2012/0053829 A1 | 3/2012 | Agarwal et al. |
| 2012/0053945 A1 | 3/2012 | Gupta et al. |
| 2012/0056815 A1 | 3/2012 | Mehra |
| 2012/0059655 A1 | 3/2012 | Cartales |
| 2012/0059813 A1 | 3/2012 | Sejnoha et al. |
| 2012/0062473 A1 | 3/2012 | Xiao et al. |
| 2012/0066212 A1 | 3/2012 | Jennings |
| 2012/0066581 A1 | 3/2012 | Spalink |
| 2012/0075054 A1 | 3/2012 | Ge et al. |
| 2012/0077479 A1 | 3/2012 | Sabotta et al. |
| 2012/0078611 A1 | 3/2012 | Soltani et al. |
| 2012/0078624 A1 | 3/2012 | Yook et al. |
| 2012/0078627 A1 | 3/2012 | Wagner |
| 2012/0078635 A1 | 3/2012 | Rothkopf et al. |
| 2012/0078747 A1 | 3/2012 | Chakrabarti et al. |
| 2012/0082317 A1 | 4/2012 | Pance et al. |
| 2012/0083286 A1 | 4/2012 | Kim et al. |
| 2012/0084086 A1 | 4/2012 | Gilbert et al. |
| 2012/0084634 A1 | 4/2012 | Wong et al. |
| 2012/0088219 A1 | 4/2012 | Briscoe et al. |
| 2012/0089331 A1 | 4/2012 | Schmidt et al. |
| 2012/0101823 A1 | 4/2012 | Weng et al. |
| 2012/0108166 A1 | 5/2012 | Hymel |
| 2012/0108221 A1 | 5/2012 | Thomas et al. |
| 2012/0110456 A1 | 5/2012 | Larco et al. |

(56) References Cited

U.S. PATENT DOCUMENTS

| | | |
|---|---|---|
| 2012/0116770 A1 | 5/2012 | Chen et al. |
| 2012/0117499 A1 | 5/2012 | Mori et al. |
| 2012/0124126 A1 | 5/2012 | Alcazar et al. |
| 2012/0128322 A1 | 5/2012 | Shaffer et al. |
| 2012/0130709 A1 | 5/2012 | Bocchieri et al. |
| 2012/0136572 A1 | 5/2012 | Norton |
| 2012/0136649 A1 | 5/2012 | Freising et al. |
| 2012/0136855 A1 | 5/2012 | Ni et al. |
| 2012/0136985 A1 | 5/2012 | Popescu et al. |
| 2012/0137367 A1 | 5/2012 | Dupont et al. |
| 2012/0149342 A1 | 6/2012 | Cohen et al. |
| 2012/0149394 A1 | 6/2012 | Singh et al. |
| 2012/0150544 A1 | 6/2012 | McLoughlin et al. |
| 2012/0150580 A1 | 6/2012 | Norton |
| 2012/0158293 A1 | 6/2012 | Burnham |
| 2012/0158399 A1 | 6/2012 | Tremblay et al. |
| 2012/0158422 A1 | 6/2012 | Burnham et al. |
| 2012/0159380 A1 | 6/2012 | Kocienda et al. |
| 2012/0163710 A1 | 6/2012 | Skaff et al. |
| 2012/0166196 A1 | 6/2012 | Ju et al. |
| 2012/0173222 A1 | 7/2012 | Wang et al. |
| 2012/0173244 A1 | 7/2012 | Kwak et al. |
| 2012/0173464 A1 | 7/2012 | Tur et al. |
| 2012/0174121 A1 | 7/2012 | Treat et al. |
| 2012/0179457 A1 | 7/2012 | Newman et al. |
| 2012/0179467 A1 | 7/2012 | Williams |
| 2012/0185237 A1 | 7/2012 | Gajic et al. |
| 2012/0185480 A1 | 7/2012 | Ni et al. |
| 2012/0185781 A1 | 7/2012 | Guzman et al. |
| 2012/0191461 A1 | 7/2012 | Lin et al. |
| 2012/0192096 A1 | 7/2012 | Bowman et al. |
| 2012/0197743 A1 | 8/2012 | Grigg et al. |
| 2012/0197995 A1 | 8/2012 | Caruso |
| 2012/0197998 A1 | 8/2012 | Kessel et al. |
| 2012/0201362 A1 | 8/2012 | Crossan et al. |
| 2012/0209853 A1 | 8/2012 | Desai et al. |
| 2012/0209874 A1 | 8/2012 | Wong et al. |
| 2012/0210266 A1 | 8/2012 | Jiang et al. |
| 2012/0214141 A1 | 8/2012 | Raya et al. |
| 2012/0214517 A1 | 8/2012 | Singh et al. |
| 2012/0215762 A1 | 8/2012 | Hall et al. |
| 2012/0221339 A1 | 8/2012 | Wang et al. |
| 2012/0221552 A1 | 8/2012 | Reponen et al. |
| 2012/0223889 A1 | 9/2012 | Medlock et al. |
| 2012/0223936 A1 | 9/2012 | Aughey et al. |
| 2012/0232885 A1 | 9/2012 | Barbosa et al. |
| 2012/0232886 A1 | 9/2012 | Capuozzo et al. |
| 2012/0232906 A1 | 9/2012 | Lindahl et al. |
| 2012/0233207 A1 | 9/2012 | Mohajer |
| 2012/0233266 A1 | 9/2012 | Hassan et al. |
| 2012/0239661 A1 | 9/2012 | Giblin |
| 2012/0239761 A1 | 9/2012 | Linner et al. |
| 2012/0242482 A1 | 9/2012 | Elumalai et al. |
| 2012/0245719 A1 | 9/2012 | Story, Jr. et al. |
| 2012/0245939 A1 | 9/2012 | Braho et al. |
| 2012/0245941 A1 | 9/2012 | Cheyer |
| 2012/0245944 A1 | 9/2012 | Gruber et al. |
| 2012/0246064 A1 | 9/2012 | Balkow |
| 2012/0250858 A1 | 10/2012 | Iqbal et al. |
| 2012/0252367 A1 | 10/2012 | Gaglio et al. |
| 2012/0252540 A1 | 10/2012 | Kirigaya |
| 2012/0253785 A1 | 10/2012 | Hamid et al. |
| 2012/0253791 A1 | 10/2012 | Heck et al. |
| 2012/0254143 A1 | 10/2012 | Varma et al. |
| 2012/0254152 A1 | 10/2012 | Park et al. |
| 2012/0254290 A1 | 10/2012 | Naaman |
| 2012/0259615 A1 | 10/2012 | Morin et al. |
| 2012/0262296 A1 | 10/2012 | Bezar |
| 2012/0265528 A1 | 10/2012 | Gruber et al. |
| 2012/0265535 A1 | 10/2012 | Bryant-Rich et al. |
| 2012/0265806 A1 | 10/2012 | Blanchflower et al. |
| 2012/0271625 A1 | 10/2012 | Bernard |
| 2012/0271634 A1 | 10/2012 | Lenke |
| 2012/0271635 A1 | 10/2012 | Ljolje |
| 2012/0271640 A1 | 10/2012 | Basir |
| 2012/0271676 A1 | 10/2012 | Aravamudan et al. |
| 2012/0275377 A1 | 11/2012 | Lehane et al. |
| 2012/0284015 A1 | 11/2012 | Drewes |
| 2012/0284027 A1 | 11/2012 | Mallett et al. |
| 2012/0290291 A1 | 11/2012 | Shelley et al. |
| 2012/0290300 A1 | 11/2012 | Lee et al. |
| 2012/0295708 A1 | 11/2012 | Hernandez-Abrego et al. |
| 2012/0296638 A1 | 11/2012 | Patwa |
| 2012/0296649 A1 | 11/2012 | Bansal et al. |
| 2012/0296654 A1 | 11/2012 | Hendrickson et al. |
| 2012/0296891 A1 | 11/2012 | Rangan |
| 2012/0297348 A1 | 11/2012 | Santoro |
| 2012/0303369 A1 | 11/2012 | Brush et al. |
| 2012/0303371 A1 | 11/2012 | Labsky et al. |
| 2012/0304124 A1 | 11/2012 | Chen et al. |
| 2012/0309363 A1 | 12/2012 | Gruber et al. |
| 2012/0310642 A1 | 12/2012 | Cao et al. |
| 2012/0310649 A1 | 12/2012 | Cannistraro et al. |
| 2012/0310652 A1 | 12/2012 | O'Sullivan |
| 2012/0310922 A1 | 12/2012 | Johnson et al. |
| 2012/0311478 A1 | 12/2012 | Van Os et al. |
| 2012/0311583 A1 | 12/2012 | Gruber et al. |
| 2012/0311584 A1 | 12/2012 | Gruber et al. |
| 2012/0311585 A1 | 12/2012 | Gruber et al. |
| 2012/0316862 A1 | 12/2012 | Sultan et al. |
| 2012/0316875 A1 | 12/2012 | Nyquist et al. |
| 2012/0316878 A1 | 12/2012 | Singleton et al. |
| 2012/0317194 A1 | 12/2012 | Tian |
| 2012/0317498 A1 | 12/2012 | Logan et al. |
| 2012/0321112 A1 | 12/2012 | Schubert et al. |
| 2012/0324391 A1 | 12/2012 | Tocci et al. |
| 2012/0327009 A1 | 12/2012 | Fleizach |
| 2012/0329529 A1 | 12/2012 | van der Raadt |
| 2012/0330660 A1 | 12/2012 | Jaiswal |
| 2012/0330661 A1 | 12/2012 | Lindahl |
| 2012/0330990 A1 | 12/2012 | Chen et al. |
| 2013/0002716 A1 | 1/2013 | Walker et al. |
| 2013/0005405 A1 | 1/2013 | Prociw |
| 2013/0006633 A1 | 1/2013 | Grokop et al. |
| 2013/0006637 A1 | 1/2013 | Kanevsky et al. |
| 2013/0006638 A1 | 1/2013 | Lindahl |
| 2013/0007648 A1 | 1/2013 | Gamon et al. |
| 2013/0009858 A1 | 1/2013 | Lacey |
| 2013/0010575 A1 | 1/2013 | He et al. |
| 2013/0013313 A1 | 1/2013 | Shechtman et al. |
| 2013/0013319 A1 | 1/2013 | Grant et al. |
| 2013/0014026 A1 | 1/2013 | Beringer et al. |
| 2013/0018659 A1 | 1/2013 | Chi |
| 2013/0024576 A1 | 1/2013 | Dishneau et al. |
| 2013/0027875 A1 | 1/2013 | Zhu et al. |
| 2013/0030787 A1 | 1/2013 | Cancedda et al. |
| 2013/0030789 A1 | 1/2013 | Dalce |
| 2013/0030804 A1 | 1/2013 | Zavaliagko et al. |
| 2013/0030815 A1 | 1/2013 | Madhvanath et al. |
| 2013/0030913 A1 | 1/2013 | Zhu et al. |
| 2013/0030955 A1 | 1/2013 | David |
| 2013/0031162 A1 | 1/2013 | Willis et al. |
| 2013/0031476 A1 | 1/2013 | Coin et al. |
| 2013/0033643 A1 | 2/2013 | Kim et al. |
| 2013/0035086 A1 | 2/2013 | Chardon et al. |
| 2013/0035942 A1 | 2/2013 | Kim et al. |
| 2013/0035961 A1 | 2/2013 | Yegnanarayanan |
| 2013/0041647 A1 | 2/2013 | Ramerth et al. |
| 2013/0041654 A1 | 2/2013 | Walker et al. |
| 2013/0041661 A1 | 2/2013 | Lee et al. |
| 2013/0041665 A1 | 2/2013 | Jang et al. |
| 2013/0041667 A1 | 2/2013 | Longe et al. |
| 2013/0041968 A1 | 2/2013 | Cohen et al. |
| 2013/0046544 A1 | 2/2013 | Kay et al. |
| 2013/0050089 A1 | 2/2013 | Neels et al. |
| 2013/0054550 A1 | 2/2013 | Bolohan |
| 2013/0054609 A1 | 2/2013 | Rajput et al. |
| 2013/0054613 A1 | 2/2013 | Bishop |
| 2013/0054675 A1 | 2/2013 | Jenkins et al. |
| 2013/0054706 A1 | 2/2013 | Graham et al. |
| 2013/0055099 A1 | 2/2013 | Yao et al. |
| 2013/0055147 A1 | 2/2013 | Vasudev et al. |
| 2013/0063611 A1 | 3/2013 | Papakipos et al. |
| 2013/0066832 A1 | 3/2013 | Sheehan et al. |

(56) References Cited

U.S. PATENT DOCUMENTS

| | | |
|---|---|---|
| 2013/0067307 A1 | 3/2013 | Tian et al. |
| 2013/0073286 A1 | 3/2013 | Bastea-Forte et al. |
| 2013/0073346 A1 | 3/2013 | Chun et al. |
| 2013/0080152 A1 | 3/2013 | Brun et al. |
| 2013/0080162 A1 | 3/2013 | Chang et al. |
| 2013/0080167 A1 | 3/2013 | Mozer |
| 2013/0080177 A1 | 3/2013 | Chen |
| 2013/0080251 A1 | 3/2013 | Dempski |
| 2013/0082967 A1 | 4/2013 | Hillis et al. |
| 2013/0085755 A1 | 4/2013 | Bringert et al. |
| 2013/0085761 A1 | 4/2013 | Bringert et al. |
| 2013/0090921 A1 | 4/2013 | Liu et al. |
| 2013/0091090 A1 | 4/2013 | Spivack et al. |
| 2013/0095805 A1 | 4/2013 | Lebeau et al. |
| 2013/0096909 A1 | 4/2013 | Brun et al. |
| 2013/0096917 A1 | 4/2013 | Edgar et al. |
| 2013/0097566 A1 | 4/2013 | Berglund |
| 2013/0097682 A1* | 4/2013 | Zeljkovic ............... H04L 9/3231 726/7 |
| 2013/0100268 A1 | 4/2013 | Mihailidis et al. |
| 2013/0103391 A1 | 4/2013 | Millmore et al. |
| 2013/0103405 A1 | 4/2013 | Namba et al. |
| 2013/0106742 A1 | 5/2013 | Lee et al. |
| 2013/0110505 A1 | 5/2013 | Gruber et al. |
| 2013/0110515 A1 | 5/2013 | Guzzoni et al. |
| 2013/0110518 A1 | 5/2013 | Gruber et al. |
| 2013/0110519 A1 | 5/2013 | Cheyer et al. |
| 2013/0110520 A1 | 5/2013 | Cheyer et al. |
| 2013/0110943 A1 | 5/2013 | Menon et al. |
| 2013/0111330 A1 | 5/2013 | Staikos et al. |
| 2013/0111348 A1 | 5/2013 | Gruber et al. |
| 2013/0111365 A1 | 5/2013 | Chen et al. |
| 2013/0111487 A1 | 5/2013 | Cheyer et al. |
| 2013/0111581 A1 | 5/2013 | Griffin et al. |
| 2013/0115927 A1 | 5/2013 | Gruber et al. |
| 2013/0117022 A1 | 5/2013 | Chen et al. |
| 2013/0124189 A1 | 5/2013 | Baldwin et al. |
| 2013/0132084 A1 | 5/2013 | Stonehocker et al. |
| 2013/0132089 A1 | 5/2013 | Fanty et al. |
| 2013/0132871 A1 | 5/2013 | Zeng et al. |
| 2013/0141551 A1 | 6/2013 | Kim |
| 2013/0142317 A1 | 6/2013 | Reynolds |
| 2013/0142345 A1 | 6/2013 | Waldmann |
| 2013/0144594 A1 | 6/2013 | Bangalore et al. |
| 2013/0144616 A1 | 6/2013 | Bangalore et al. |
| 2013/0151339 A1 | 6/2013 | Kim et al. |
| 2013/0152092 A1 | 6/2013 | Yadgar et al. |
| 2013/0154811 A1 | 6/2013 | Ferren et al. |
| 2013/0157629 A1 | 6/2013 | Lee et al. |
| 2013/0158977 A1 | 6/2013 | Senior |
| 2013/0159847 A1 | 6/2013 | Banke et al. |
| 2013/0165232 A1 | 6/2013 | Nelson et al. |
| 2013/0166303 A1 | 6/2013 | Chang et al. |
| 2013/0166442 A1 | 6/2013 | Nakajima et al. |
| 2013/0170738 A1 | 7/2013 | Capuozzo et al. |
| 2013/0172022 A1 | 7/2013 | Seymour et al. |
| 2013/0173258 A1 | 7/2013 | Liu et al. |
| 2013/0174034 A1 | 7/2013 | Brown et al. |
| 2013/0176244 A1 | 7/2013 | Yamamoto et al. |
| 2013/0176592 A1 | 7/2013 | Sasaki |
| 2013/0179172 A1 | 7/2013 | Nakamura et al. |
| 2013/0179440 A1 | 7/2013 | Gordon |
| 2013/0183944 A1 | 7/2013 | Mozer et al. |
| 2013/0185059 A1 | 7/2013 | Riccardi et al. |
| 2013/0185074 A1 | 7/2013 | Gruber et al. |
| 2013/0185081 A1 | 7/2013 | Cheyer et al. |
| 2013/0185336 A1 | 7/2013 | Singh et al. |
| 2013/0187850 A1 | 7/2013 | Schulz et al. |
| 2013/0187857 A1 | 7/2013 | Griffin et al. |
| 2013/0191117 A1 | 7/2013 | Atti et al. |
| 2013/0197911 A1 | 8/2013 | Wei et al. |
| 2013/0204813 A1 | 8/2013 | Master et al. |
| 2013/0204897 A1 | 8/2013 | McDougall |
| 2013/0207898 A1 | 8/2013 | Sullivan et al. |
| 2013/0218553 A1 | 8/2013 | Fujii et al. |
| 2013/0218560 A1 | 8/2013 | Hsiao et al. |
| 2013/0219333 A1 | 8/2013 | Palwe et al. |
| 2013/0222249 A1 | 8/2013 | Pasquero et al. |
| 2013/0225128 A1* | 8/2013 | Gomar ................. H04W 12/06 455/411 |
| 2013/0226935 A1 | 8/2013 | Bai et al. |
| 2013/0231917 A1 | 9/2013 | Naik |
| 2013/0234947 A1 | 9/2013 | Kristensson et al. |
| 2013/0235987 A1 | 9/2013 | Arroniz-Escobar et al. |
| 2013/0238326 A1 | 9/2013 | Kim et al. |
| 2013/0238647 A1 | 9/2013 | Thompson |
| 2013/0238729 A1* | 9/2013 | Holzman .............. H04L 51/066 709/206 |
| 2013/0244615 A1 | 9/2013 | Miller et al. |
| 2013/0246048 A1 | 9/2013 | Nagase et al. |
| 2013/0246050 A1 | 9/2013 | Yu et al. |
| 2013/0246329 A1 | 9/2013 | Pasquero et al. |
| 2013/0253911 A1 | 9/2013 | Petri et al. |
| 2013/0253912 A1 | 9/2013 | Medlock et al. |
| 2013/0262168 A1* | 10/2013 | Makanawala .......... H04L 51/32 705/7.14 |
| 2013/0268263 A1 | 10/2013 | Park et al. |
| 2013/0275117 A1 | 10/2013 | Winer |
| 2013/0275138 A1 | 10/2013 | Gruber et al. |
| 2013/0275164 A1 | 10/2013 | Gruber et al. |
| 2013/0275199 A1 | 10/2013 | Proctor, Jr. et al. |
| 2013/0275625 A1 | 10/2013 | Taivalsaari et al. |
| 2013/0275875 A1 | 10/2013 | Gruber et al. |
| 2013/0275899 A1 | 10/2013 | Schubert et al. |
| 2013/0282709 A1 | 10/2013 | Zhu et al. |
| 2013/0283168 A1 | 10/2013 | Brown et al. |
| 2013/0285913 A1 | 10/2013 | Griffin et al. |
| 2013/0289991 A1 | 10/2013 | Eshwar et al. |
| 2013/0289993 A1 | 10/2013 | Rao et al. |
| 2013/0289994 A1 | 10/2013 | Newman et al. |
| 2013/0291015 A1 | 10/2013 | Pan |
| 2013/0297317 A1 | 11/2013 | Lee et al. |
| 2013/0297319 A1 | 11/2013 | Kim |
| 2013/0297348 A1 | 11/2013 | Cardoza et al. |
| 2013/0300645 A1 | 11/2013 | Fedorov |
| 2013/0300648 A1 | 11/2013 | Kim et al. |
| 2013/0303106 A1 | 11/2013 | Martin |
| 2013/0304479 A1 | 11/2013 | Teller et al. |
| 2013/0304758 A1 | 11/2013 | Gruber et al. |
| 2013/0304815 A1 | 11/2013 | Puente et al. |
| 2013/0305119 A1 | 11/2013 | Kern et al. |
| 2013/0307855 A1 | 11/2013 | Lamb et al. |
| 2013/0307997 A1 | 11/2013 | O'Keefe et al. |
| 2013/0308922 A1 | 11/2013 | Sano et al. |
| 2013/0311184 A1 | 11/2013 | Badavne et al. |
| 2013/0311997 A1 | 11/2013 | Gruber et al. |
| 2013/0316746 A1 | 11/2013 | Miller et al. |
| 2013/0322634 A1 | 12/2013 | Bennett et al. |
| 2013/0325436 A1 | 12/2013 | Wang et al. |
| 2013/0325443 A1 | 12/2013 | Begeja et al. |
| 2013/0325447 A1 | 12/2013 | Levien et al. |
| 2013/0325448 A1 | 12/2013 | Levien et al. |
| 2013/0325481 A1 | 12/2013 | Van Os et al. |
| 2013/0325484 A1 | 12/2013 | Chakladar et al. |
| 2013/0325967 A1 | 12/2013 | Parks et al. |
| 2013/0325970 A1 | 12/2013 | Roberts et al. |
| 2013/0325979 A1 | 12/2013 | Mansfield et al. |
| 2013/0329023 A1 | 12/2013 | Suplee, III et al. |
| 2013/0331127 A1 | 12/2013 | Sabatelli et al. |
| 2013/0332159 A1 | 12/2013 | Federighi et al. |
| 2013/0332162 A1 | 12/2013 | Keen |
| 2013/0332164 A1 | 12/2013 | Nalk |
| 2013/0332168 A1 | 12/2013 | Kim et al. |
| 2013/0332172 A1 | 12/2013 | Prakash et al. |
| 2013/0332400 A1 | 12/2013 | González |
| 2013/0339256 A1 | 12/2013 | Shroff |
| 2013/0346068 A1 | 12/2013 | Solem et al. |
| 2013/0346347 A1 | 12/2013 | Patterson et al. |
| 2014/0006012 A1 | 1/2014 | Zhou et al. |
| 2014/0006025 A1 | 1/2014 | Krishnan et al. |
| 2014/0006027 A1 | 1/2014 | Kim et al. |
| 2014/0006030 A1 | 1/2014 | Fleizach et al. |
| 2014/0006153 A1 | 1/2014 | Thangam et al. |
| 2014/0012574 A1 | 1/2014 | Pasupalak et al. |

(56) References Cited

U.S. PATENT DOCUMENTS

| | | |
|---|---|---|
| 2014/0012580 A1 | 1/2014 | Ganong et al. |
| 2014/0012586 A1 | 1/2014 | Rubin et al. |
| 2014/0019116 A1 | 1/2014 | Lundberg et al. |
| 2014/0019133 A1 | 1/2014 | Bao et al. |
| 2014/0019460 A1 | 1/2014 | Sambrani et al. |
| 2014/0028735 A1 | 1/2014 | Williams et al. |
| 2014/0032453 A1 | 1/2014 | Eustice et al. |
| 2014/0033071 A1 | 1/2014 | Gruber et al. |
| 2014/0035823 A1 | 2/2014 | Khoe et al. |
| 2014/0039893 A1 | 2/2014 | Weiner |
| 2014/0039894 A1 | 2/2014 | Shostak |
| 2014/0040274 A1 | 2/2014 | Aravamudan et al. |
| 2014/0040748 A1 | 2/2014 | Lemay et al. |
| 2014/0040801 A1 | 2/2014 | Patel et al. |
| 2014/0040918 A1 | 2/2014 | Li et al. |
| 2014/0046934 A1 | 2/2014 | Zhou et al. |
| 2014/0047001 A1 | 2/2014 | Phillips et al. |
| 2014/0052680 A1 | 2/2014 | Nitz et al. |
| 2014/0052791 A1 | 2/2014 | Chakra et al. |
| 2014/0053082 A1 | 2/2014 | Park et al. |
| 2014/0053210 A1 | 2/2014 | Cheong et al. |
| 2014/0057610 A1 | 2/2014 | Olincy et al. |
| 2014/0059030 A1 | 2/2014 | Hakkani-Tur et al. |
| 2014/0067361 A1 | 3/2014 | Nikoulina et al. |
| 2014/0067371 A1 | 3/2014 | Liensberger |
| 2014/0067402 A1 | 3/2014 | Kim |
| 2014/0068751 A1 | 3/2014 | Last et al. |
| 2014/0074454 A1 | 3/2014 | Brown et al. |
| 2014/0074466 A1 | 3/2014 | Sharifi et al. |
| 2014/0074470 A1 | 3/2014 | Jansche et al. |
| 2014/0074472 A1 | 3/2014 | Lin et al. |
| 2014/0074483 A1 | 3/2014 | Van Os |
| 2014/0074589 A1* | 3/2014 | Nielsen ............... G06Q 30/0271 705/14.43 |
| 2014/0074815 A1 | 3/2014 | Plimton |
| 2014/0078065 A1 | 3/2014 | Akkok et al. |
| 2014/0079195 A1 | 3/2014 | Srivastava et al. |
| 2014/0080428 A1 | 3/2014 | Rhoads et al. |
| 2014/0081619 A1 | 3/2014 | Solntseva et al. |
| 2014/0081633 A1 | 3/2014 | Badaskar et al. |
| 2014/0082501 A1 | 3/2014 | Bae et al. |
| 2014/0086458 A1 | 3/2014 | Rogers et al. |
| 2014/0087711 A1 | 3/2014 | Geyer et al. |
| 2014/0088961 A1 | 3/2014 | Woodward et al. |
| 2014/0095171 A1 | 4/2014 | Lynch et al. |
| 2014/0095172 A1 | 4/2014 | Cabaco et al. |
| 2014/0095173 A1 | 4/2014 | Lynch et al. |
| 2014/0096209 A1 | 4/2014 | Saraf et al. |
| 2014/0098247 A1 | 4/2014 | Rao et al. |
| 2014/0108017 A1 | 4/2014 | Mason et al. |
| 2014/0114554 A1 | 4/2014 | Lagassey |
| 2014/0118155 A1 | 5/2014 | Bowers et al. |
| 2014/0122059 A1 | 5/2014 | Patel et al. |
| 2014/0122086 A1 | 5/2014 | Kapur et al. |
| 2014/0122136 A1 | 5/2014 | Jayanthi |
| 2014/0122153 A1 | 5/2014 | Truitt |
| 2014/0134983 A1 | 5/2014 | Jung et al. |
| 2014/0135036 A1 | 5/2014 | Bonanni et al. |
| 2014/0136187 A1 | 5/2014 | Wolverton et al. |
| 2014/0136195 A1 | 5/2014 | Abdossalami et al. |
| 2014/0136212 A1 | 5/2014 | Kwon et al. |
| 2014/0136946 A1 | 5/2014 | Matas |
| 2014/0136987 A1 | 5/2014 | Rodriguez |
| 2014/0142922 A1 | 5/2014 | Liang et al. |
| 2014/0142923 A1 | 5/2014 | Jones et al. |
| 2014/0142935 A1 | 5/2014 | Lindahl et al. |
| 2014/0143550 A1 | 5/2014 | Ganong, III et al. |
| 2014/0143721 A1 | 5/2014 | Suzuki et al. |
| 2014/0146200 A1 | 5/2014 | Scott et al. |
| 2014/0152577 A1 | 6/2014 | Yuen et al. |
| 2014/0153709 A1 | 6/2014 | Byrd et al. |
| 2014/0155031 A1 | 6/2014 | Lee et al. |
| 2014/0156262 A1 | 6/2014 | Yuen et al. |
| 2014/0156279 A1 | 6/2014 | Okamoto et al. |
| 2014/0157422 A1 | 6/2014 | Livshits et al. |
| 2014/0163951 A1 | 6/2014 | Nikoulina et al. |
| 2014/0163953 A1 | 6/2014 | Parikh |
| 2014/0163954 A1 | 6/2014 | Joshi et al. |
| 2014/0163976 A1 | 6/2014 | Park et al. |
| 2014/0163977 A1 | 6/2014 | Hoffmeister et al. |
| 2014/0163981 A1 | 6/2014 | Cook et al. |
| 2014/0163995 A1 | 6/2014 | Burns et al. |
| 2014/0164476 A1 | 6/2014 | Thomson |
| 2014/0164532 A1 | 6/2014 | Lynch et al. |
| 2014/0164533 A1 | 6/2014 | Lynch et al. |
| 2014/0169795 A1 | 6/2014 | Clough |
| 2014/0172878 A1 | 6/2014 | Clark et al. |
| 2014/0173460 A1 | 6/2014 | Kim |
| 2014/0180499 A1 | 6/2014 | Cooper et al. |
| 2014/0180689 A1 | 6/2014 | Kim et al. |
| 2014/0180697 A1 | 6/2014 | Torok et al. |
| 2014/0181865 A1 | 6/2014 | Koganei |
| 2014/0188477 A1 | 7/2014 | Zhang |
| 2014/0195226 A1 | 7/2014 | Yun et al. |
| 2014/0195230 A1 | 7/2014 | Han et al. |
| 2014/0195233 A1 | 7/2014 | Bapat |
| 2014/0195244 A1 | 7/2014 | Cha et al. |
| 2014/0195251 A1 | 7/2014 | Zeinstra et al. |
| 2014/0195252 A1 | 7/2014 | Gruber et al. |
| 2014/0198048 A1 | 7/2014 | Unruh et al. |
| 2014/0203939 A1 | 7/2014 | Harrington et al. |
| 2014/0205076 A1 | 7/2014 | Kumar et al. |
| 2014/0207439 A1 | 7/2014 | Venkatapathy et al. |
| 2014/0207446 A1 | 7/2014 | Klein et al. |
| 2014/0207466 A1 | 7/2014 | Smadi et al. |
| 2014/0207468 A1 | 7/2014 | Bartnik |
| 2014/0207582 A1 | 7/2014 | Flinn et al. |
| 2014/0211944 A1* | 7/2014 | Hayward ............... H04L 9/0866 380/281 |
| 2014/0214429 A1 | 7/2014 | Pantel |
| 2014/0214537 A1 | 7/2014 | Yoo et al. |
| 2014/0218372 A1 | 8/2014 | Missig et al. |
| 2014/0222436 A1 | 8/2014 | Binder et al. |
| 2014/0222678 A1 | 8/2014 | Sheets et al. |
| 2014/0223377 A1 | 8/2014 | Shaw et al. |
| 2014/0223481 A1 | 8/2014 | Fundament |
| 2014/0230055 A1 | 8/2014 | Boehl |
| 2014/0232656 A1 | 8/2014 | Pasquero et al. |
| 2014/0236595 A1 | 8/2014 | Gray |
| 2014/0236986 A1 | 8/2014 | Guzman |
| 2014/0237042 A1 | 8/2014 | Ahmed et al. |
| 2014/0244248 A1 | 8/2014 | Arisoy et al. |
| 2014/0244249 A1 | 8/2014 | Mohamed et al. |
| 2014/0244254 A1 | 8/2014 | Ju et al. |
| 2014/0244257 A1 | 8/2014 | Colibro et al. |
| 2014/0244258 A1 | 8/2014 | Song et al. |
| 2014/0244263 A1 | 8/2014 | Pontual et al. |
| 2014/0244266 A1 | 8/2014 | Brown et al. |
| 2014/0244268 A1 | 8/2014 | Abdelsamie et al. |
| 2014/0244271 A1 | 8/2014 | Lindahl |
| 2014/0244712 A1 | 8/2014 | Walters et al. |
| 2014/0245140 A1 | 8/2014 | Brown et al. |
| 2014/0247383 A1 | 9/2014 | Dave et al. |
| 2014/0247926 A1 | 9/2014 | Gainsboro et al. |
| 2014/0249817 A1 | 9/2014 | Hart et al. |
| 2014/0249821 A1 | 9/2014 | Kennewick et al. |
| 2014/0250046 A1 | 9/2014 | Winn et al. |
| 2014/0257809 A1 | 9/2014 | Goel et al. |
| 2014/0257815 A1 | 9/2014 | Zhao et al. |
| 2014/0258857 A1 | 9/2014 | Dykstra-Erickson et al. |
| 2014/0267022 A1 | 9/2014 | Kim |
| 2014/0267599 A1 | 9/2014 | Drouin et al. |
| 2014/0272821 A1 | 9/2014 | Pitschel et al. |
| 2014/0274005 A1 | 9/2014 | Luna et al. |
| 2014/0274203 A1 | 9/2014 | Ganong et al. |
| 2014/0274211 A1 | 9/2014 | Sejnoha et al. |
| 2014/0278343 A1 | 9/2014 | Tran |
| 2014/0278349 A1 | 9/2014 | Grieves et al. |
| 2014/0278379 A1 | 9/2014 | Coccaro et al. |
| 2014/0278390 A1 | 9/2014 | Kingsbury et al. |
| 2014/0278391 A1 | 9/2014 | Braho et al. |
| 2014/0278394 A1 | 9/2014 | Bastyr et al. |
| 2014/0278406 A1 | 9/2014 | Tsumura et al. |
| 2014/0278413 A1 | 9/2014 | Pitschel et al. |

(56) References Cited

U.S. PATENT DOCUMENTS

| | | |
|---|---|---|
| 2014/0278429 A1 | 9/2014 | Ganong, III |
| 2014/0278435 A1 | 9/2014 | Ganong et al. |
| 2014/0278436 A1 | 9/2014 | Khanna et al. |
| 2014/0278443 A1 | 9/2014 | Gunn et al. |
| 2014/0278513 A1 | 9/2014 | Prakash et al. |
| 2014/0280138 A1 | 9/2014 | Li et al. |
| 2014/0280292 A1 | 9/2014 | Skinder |
| 2014/0280353 A1 | 9/2014 | Delaney et al. |
| 2014/0280450 A1 | 9/2014 | Luna |
| 2014/0281983 A1 | 9/2014 | Xian et al. |
| 2014/0282003 A1 | 9/2014 | Gruber et al. |
| 2014/0282007 A1 | 9/2014 | Fleizach |
| 2014/0282045 A1 | 9/2014 | Ayanam et al. |
| 2014/0282201 A1 | 9/2014 | Pasquero et al. |
| 2014/0282203 A1 | 9/2014 | Pasquero et al. |
| 2014/0282586 A1 | 9/2014 | Shear et al. |
| 2014/0282743 A1 | 9/2014 | Howard et al. |
| 2014/0288990 A1 | 9/2014 | Moore et al. |
| 2014/0289508 A1* | 9/2014 | Wang .................. H04L 63/0853 713/155 |
| 2014/0297267 A1 | 10/2014 | Spencer et al. |
| 2014/0297281 A1 | 10/2014 | Togawa et al. |
| 2014/0297284 A1 | 10/2014 | Gruber et al. |
| 2014/0297288 A1 | 10/2014 | Yu et al. |
| 2014/0304605 A1 | 10/2014 | Ohmura et al. |
| 2014/0309996 A1 | 10/2014 | Zhang |
| 2014/0310001 A1 | 10/2014 | Kalns et al. |
| 2014/0310002 A1 | 10/2014 | Nitz et al. |
| 2014/0310365 A1* | 10/2014 | Sample .................. H04L 51/16 709/206 |
| 2014/0316585 A1 | 10/2014 | Boesveld et al. |
| 2014/0317030 A1 | 10/2014 | Shen et al. |
| 2014/0317502 A1 | 10/2014 | Brown et al. |
| 2014/0324884 A1 | 10/2014 | Lindahl et al. |
| 2014/0330569 A1 | 11/2014 | Kolavennu et al. |
| 2014/0337048 A1 | 11/2014 | Brown et al. |
| 2014/0337266 A1 | 11/2014 | Wolverton et al. |
| 2014/0337371 A1 | 11/2014 | Li |
| 2014/0337438 A1 | 11/2014 | Govande et al. |
| 2014/0337751 A1 | 11/2014 | Lim et al. |
| 2014/0337814 A1 | 11/2014 | Kalns et al. |
| 2014/0342762 A1 | 11/2014 | Hajdu et al. |
| 2014/0344627 A1 | 11/2014 | Schaub et al. |
| 2014/0344687 A1 | 11/2014 | Durham et al. |
| 2014/0350924 A1 | 11/2014 | Zurek et al. |
| 2014/0350933 A1 | 11/2014 | Bak et al. |
| 2014/0351741 A1 | 11/2014 | Medlock et al. |
| 2014/0351760 A1 | 11/2014 | Skory et al. |
| 2014/0358519 A1 | 12/2014 | Mirkin et al. |
| 2014/0358523 A1 | 12/2014 | Sheth et al. |
| 2014/0361973 A1 | 12/2014 | Raux et al. |
| 2014/0365209 A1 | 12/2014 | Evermann |
| 2014/0365214 A1 | 12/2014 | Bayley |
| 2014/0365216 A1 | 12/2014 | Gruber et al. |
| 2014/0365226 A1 | 12/2014 | Sinha |
| 2014/0365227 A1 | 12/2014 | Cash et al. |
| 2014/0365407 A1 | 12/2014 | Brown et al. |
| 2014/0365880 A1 | 12/2014 | Bellegarda |
| 2014/0365885 A1 | 12/2014 | Carson et al. |
| 2014/0365895 A1 | 12/2014 | Paulson et al. |
| 2014/0365922 A1 | 12/2014 | Yang |
| 2014/0370817 A1 | 12/2014 | Luna |
| 2014/0370841 A1 | 12/2014 | Roberts et al. |
| 2014/0372112 A1 | 12/2014 | Xue et al. |
| 2014/0372356 A1 | 12/2014 | Bilal et al. |
| 2014/0372931 A1 | 12/2014 | Zhai et al. |
| 2014/0379334 A1 | 12/2014 | Fry |
| 2014/0379341 A1 | 12/2014 | Seo et al. |
| 2014/0380285 A1 | 12/2014 | Gabel et al. |
| 2015/0003797 A1 | 1/2015 | Schmidt |
| 2015/0006148 A1 | 1/2015 | Goldszmit et al. |
| 2015/0006157 A1 | 1/2015 | Andrade Silva et al. |
| 2015/0006176 A1 | 1/2015 | Pogue et al. |
| 2015/0006178 A1 | 1/2015 | Peng et al. |
| 2015/0006184 A1 | 1/2015 | Marti et al. |
| 2015/0006199 A1 | 1/2015 | Snider et al. |
| 2015/0012271 A1 | 1/2015 | Peng et al. |
| 2015/0019219 A1 | 1/2015 | Tzirkel-hancock et al. |
| 2015/0019221 A1 | 1/2015 | Lee et al. |
| 2015/0019944 A1* | 1/2015 | Kalgi .................... G06F 16/958 715/205 |
| 2015/0019974 A1 | 1/2015 | Doi et al. |
| 2015/0031416 A1 | 1/2015 | Wells et al. |
| 2015/0033219 A1 | 1/2015 | Breiner et al. |
| 2015/0033275 A1 | 1/2015 | Natani et al. |
| 2015/0039292 A1 | 2/2015 | Suleman et al. |
| 2015/0039299 A1 | 2/2015 | Weinstein et al. |
| 2015/0039305 A1 | 2/2015 | Huang |
| 2015/0040012 A1 | 2/2015 | Faaborg et al. |
| 2015/0045003 A1 | 2/2015 | Vora et al. |
| 2015/0045068 A1 | 2/2015 | Soffer et al. |
| 2015/0046537 A1 | 2/2015 | Rakib |
| 2015/0050633 A1 | 2/2015 | Christmas et al. |
| 2015/0053779 A1 | 2/2015 | Adamek et al. |
| 2015/0058013 A1 | 2/2015 | Pakhomov et al. |
| 2015/0058018 A1 | 2/2015 | Georges et al. |
| 2015/0058785 A1 | 2/2015 | Ookawara |
| 2015/0065200 A1 | 3/2015 | Namgung et al. |
| 2015/0066494 A1 | 3/2015 | Salvador et al. |
| 2015/0066496 A1 | 3/2015 | Deoras et al. |
| 2015/0066506 A1 | 3/2015 | Romano et al. |
| 2015/0066516 A1 | 3/2015 | Nishikawa et al. |
| 2015/0067485 A1 | 3/2015 | Kim et al. |
| 2015/0067822 A1 | 3/2015 | Randall |
| 2015/0071121 A1 | 3/2015 | Patil et al. |
| 2015/0073788 A1 | 3/2015 | Allauzen et al. |
| 2015/0073804 A1 | 3/2015 | Senior et al. |
| 2015/0074524 A1 | 3/2015 | Nicholson et al. |
| 2015/0074615 A1 | 3/2015 | Han et al. |
| 2015/0082229 A1 | 3/2015 | Ouyang et al. |
| 2015/0088511 A1 | 3/2015 | Bharadwaj et al. |
| 2015/0088514 A1 | 3/2015 | Typrin |
| 2015/0088522 A1 | 3/2015 | Hendrickson et al. |
| 2015/0088523 A1 | 3/2015 | Schuster |
| 2015/0088998 A1* | 3/2015 | Isensee .................. H04L 51/02 709/206 |
| 2015/0095031 A1 | 4/2015 | Conkie et al. |
| 2015/0095278 A1 | 4/2015 | Flinn et al. |
| 2015/0100316 A1 | 4/2015 | Williams et al. |
| 2015/0100537 A1 | 4/2015 | Grieves et al. |
| 2015/0100983 A1 | 4/2015 | Pan |
| 2015/0106093 A1 | 4/2015 | Weeks et al. |
| 2015/0113407 A1 | 4/2015 | Hoffert et al. |
| 2015/0120723 A1 | 4/2015 | Deshmukh et al. |
| 2015/0121216 A1* | 4/2015 | Brown .................... G06N 3/006 715/707 |
| 2015/0127348 A1 | 5/2015 | Follis |
| 2015/0127350 A1 | 5/2015 | Agiomyrgiannakis |
| 2015/0133109 A1 | 5/2015 | Freeman et al. |
| 2015/0134334 A1 | 5/2015 | Sachidanandam et al. |
| 2015/0135085 A1 | 5/2015 | Shoham et al. |
| 2015/0135123 A1 | 5/2015 | Carr et al. |
| 2015/0142420 A1 | 5/2015 | Sarikaya et al. |
| 2015/0142438 A1 | 5/2015 | Dai et al. |
| 2015/0142447 A1 | 5/2015 | Kennewick et al. |
| 2015/0142851 A1 | 5/2015 | Gupta et al. |
| 2015/0148013 A1 | 5/2015 | Baldwin et al. |
| 2015/0149177 A1 | 5/2015 | Kalns et al. |
| 2015/0149182 A1 | 5/2015 | Kalns et al. |
| 2015/0149354 A1 | 5/2015 | Mccoy |
| 2015/0149469 A1 | 5/2015 | Xu et al. |
| 2015/0154185 A1 | 6/2015 | Waibel |
| 2015/0154976 A1 | 6/2015 | Mutagi |
| 2015/0160855 A1 | 6/2015 | Bi |
| 2015/0161370 A1 | 6/2015 | North et al. |
| 2015/0161521 A1 | 6/2015 | Shah et al. |
| 2015/0161989 A1 | 6/2015 | Hsu et al. |
| 2015/0162001 A1 | 6/2015 | Kar et al. |
| 2015/0163558 A1 | 6/2015 | Wheatley |
| 2015/0169284 A1 | 6/2015 | Quast et al. |
| 2015/0169336 A1 | 6/2015 | Harper et al. |
| 2015/0170073 A1* | 6/2015 | Baker .................... G06F 3/167 705/348 |
| 2015/0170664 A1 | 6/2015 | Doherty et al. |

(56) References Cited

U.S. PATENT DOCUMENTS

| | | | |
|---|---|---|---|
| 2015/0172463 A1 | 6/2015 | Quast et al. | |
| 2015/0178388 A1 | 6/2015 | Winnemoeller et al. | |
| 2015/0178785 A1* | 6/2015 | Salonen | G06Q 30/0267 705/14.64 |
| 2015/0179176 A1 | 6/2015 | Ryu et al. | |
| 2015/0185964 A1 | 7/2015 | Stout | |
| 2015/0185996 A1* | 7/2015 | Brown | G06F 3/04817 715/706 |
| 2015/0186012 A1 | 7/2015 | Coleman et al. | |
| 2015/0186110 A1 | 7/2015 | Kannan | |
| 2015/0186154 A1* | 7/2015 | Brown | G06F 3/04817 715/706 |
| 2015/0186155 A1* | 7/2015 | Brown | G06F 3/04817 715/706 |
| 2015/0186156 A1* | 7/2015 | Brown | G06F 3/04817 715/706 |
| 2015/0186351 A1 | 7/2015 | Hicks et al. | |
| 2015/0187355 A1 | 7/2015 | Parkinson et al. | |
| 2015/0187369 A1 | 7/2015 | Dadu et al. | |
| 2015/0189362 A1 | 7/2015 | Lee et al. | |
| 2015/0193379 A1 | 7/2015 | Mehta | |
| 2015/0193391 A1 | 7/2015 | Khvostichenko et al. | |
| 2015/0193392 A1 | 7/2015 | Greenblatt et al. | |
| 2015/0194152 A1 | 7/2015 | Katuri et al. | |
| 2015/0195379 A1 | 7/2015 | Zhang et al. | |
| 2015/0195606 A1 | 7/2015 | McDevitt | |
| 2015/0199077 A1 | 7/2015 | Zuger et al. | |
| 2015/0199960 A1 | 7/2015 | Huo et al. | |
| 2015/0199965 A1 | 7/2015 | Leak et al. | |
| 2015/0199967 A1 | 7/2015 | Reddy et al. | |
| 2015/0201064 A1 | 7/2015 | Bells et al. | |
| 2015/0205858 A1 | 7/2015 | Xie et al. | |
| 2015/0208226 A1 | 7/2015 | Kuusilinna et al. | |
| 2015/0212791 A1 | 7/2015 | Kumar et al. | |
| 2015/0213796 A1 | 7/2015 | Waltermann et al. | |
| 2015/0220507 A1 | 8/2015 | Mohajer et al. | |
| 2015/0221304 A1 | 8/2015 | Stewart | |
| 2015/0221307 A1 | 8/2015 | Shah et al. | |
| 2015/0227505 A1 | 8/2015 | Morimoto | |
| 2015/0227633 A1 | 8/2015 | Shapira | |
| 2015/0228281 A1 | 8/2015 | Raniere | |
| 2015/0230095 A1 | 8/2015 | Smith et al. | |
| 2015/0234636 A1 | 8/2015 | Barnes, Jr. | |
| 2015/0234800 A1 | 8/2015 | Patrick et al. | |
| 2015/0242091 A1 | 8/2015 | Lu et al. | |
| 2015/0243278 A1 | 8/2015 | Kibre et al. | |
| 2015/0243283 A1 | 8/2015 | Halash et al. | |
| 2015/0245154 A1 | 8/2015 | Dadu et al. | |
| 2015/0248651 A1 | 9/2015 | Akutagawa et al. | |
| 2015/0248886 A1 | 9/2015 | Sarikaya et al. | |
| 2015/0254057 A1 | 9/2015 | Klein et al. | |
| 2015/0254058 A1 | 9/2015 | Klein et al. | |
| 2015/0254333 A1 | 9/2015 | Fife et al. | |
| 2015/0255071 A1 | 9/2015 | Chiba | |
| 2015/0256873 A1 | 9/2015 | Klein et al. | |
| 2015/0261496 A1 | 9/2015 | Faaborg et al. | |
| 2015/0261850 A1 | 9/2015 | Mittal | |
| 2015/0269139 A1 | 9/2015 | McAteer et al. | |
| 2015/0277574 A1 | 10/2015 | Jain et al. | |
| 2015/0278370 A1 | 10/2015 | Stratvert et al. | |
| 2015/0279358 A1 | 10/2015 | Kingsbury et al. | |
| 2015/0279360 A1 | 10/2015 | Mengibar et al. | |
| 2015/0281380 A1 | 10/2015 | Wang et al. | |
| 2015/0286627 A1 | 10/2015 | Chang et al. | |
| 2015/0287401 A1 | 10/2015 | Lee et al. | |
| 2015/0287409 A1 | 10/2015 | Jang | |
| 2015/0288629 A1 | 10/2015 | Choi et al. | |
| 2015/0294086 A1 | 10/2015 | Kare et al. | |
| 2015/0294377 A1 | 10/2015 | Chow | |
| 2015/0294516 A1 | 10/2015 | Chiang | |
| 2015/0295915 A1* | 10/2015 | Xiu | H04L 67/2814 726/7 |
| 2015/0302855 A1 | 10/2015 | Kim et al. | |
| 2015/0302856 A1 | 10/2015 | Kim et al. | |
| 2015/0302857 A1 | 10/2015 | Yamada | |
| 2015/0309997 A1 | 10/2015 | Lee et al. | |
| 2015/0310858 A1 | 10/2015 | Li et al. | |
| 2015/0310862 A1 | 10/2015 | Dauphin et al. | |
| 2015/0310879 A1 | 10/2015 | Buchanan et al. | |
| 2015/0312182 A1 | 10/2015 | Langholz | |
| 2015/0317069 A1 | 11/2015 | Clements et al. | |
| 2015/0317310 A1 | 11/2015 | Eiche et al. | |
| 2015/0324041 A1 | 11/2015 | Varley et al. | |
| 2015/0324334 A1 | 11/2015 | Lee et al. | |
| 2015/0331664 A1 | 11/2015 | Osawa et al. | |
| 2015/0331711 A1 | 11/2015 | Huang et al. | |
| 2015/0332667 A1 | 11/2015 | Mason | |
| 2015/0339049 A1 | 11/2015 | Kasemset et al. | |
| 2015/0339391 A1 | 11/2015 | Kang et al. | |
| 2015/0340033 A1 | 11/2015 | Di Fabbrizio et al. | |
| 2015/0340040 A1 | 11/2015 | Mun et al. | |
| 2015/0340042 A1 | 11/2015 | Sejnoha et al. | |
| 2015/0341717 A1 | 11/2015 | Song et al. | |
| 2015/0347086 A1 | 12/2015 | Liedholm et al. | |
| 2015/0347381 A1 | 12/2015 | Bellegarda | |
| 2015/0347382 A1 | 12/2015 | Dolfing et al. | |
| 2015/0347385 A1 | 12/2015 | Flor et al. | |
| 2015/0347393 A1 | 12/2015 | Futrell et al. | |
| 2015/0347733 A1 | 12/2015 | Tsou et al. | |
| 2015/0347985 A1 | 12/2015 | Gross et al. | |
| 2015/0348547 A1 | 12/2015 | Paulik et al. | |
| 2015/0348548 A1 | 12/2015 | Piernot et al. | |
| 2015/0348549 A1 | 12/2015 | Giuli et al. | |
| 2015/0348551 A1 | 12/2015 | Gruber et al. | |
| 2015/0348554 A1 | 12/2015 | Orr et al. | |
| 2015/0350031 A1 | 12/2015 | Burks et al. | |
| 2015/0352999 A1 | 12/2015 | Bando et al. | |
| 2015/0355879 A1 | 12/2015 | Beckhardt et al. | |
| 2015/0363587 A1 | 12/2015 | Ahn et al. | |
| 2015/0364140 A1 | 12/2015 | Thorn | |
| 2015/0370531 A1 | 12/2015 | Faaborg | |
| 2015/0370780 A1 | 12/2015 | Wang et al. | |
| 2015/0371639 A1 | 12/2015 | Foerster et al. | |
| 2015/0371665 A1 | 12/2015 | Naik et al. | |
| 2015/0373183 A1 | 12/2015 | Woolsey et al. | |
| 2015/0379993 A1 | 12/2015 | Subhojit et al. | |
| 2015/0382047 A1 | 12/2015 | Napolitano et al. | |
| 2015/0382079 A1 | 12/2015 | Lister et al. | |
| 2016/0004690 A1 | 1/2016 | Bangalore et al. | |
| 2016/0005320 A1 | 1/2016 | deCharms et al. | |
| 2016/0012038 A1 | 1/2016 | Edwards et al. | |
| 2016/0014476 A1 | 1/2016 | Caliendo, Jr. et al. | |
| 2016/0018900 A1 | 1/2016 | Tu et al. | |
| 2016/0019886 A1 | 1/2016 | Hong | |
| 2016/0026258 A1 | 1/2016 | Ou et al. | |
| 2016/0027431 A1 | 1/2016 | Kurzweil et al. | |
| 2016/0028666 A1 | 1/2016 | Li | |
| 2016/0029316 A1 | 1/2016 | Mohan et al. | |
| 2016/0034042 A1 | 2/2016 | Joo | |
| 2016/0034811 A1 | 2/2016 | Paulik et al. | |
| 2016/0042735 A1 | 2/2016 | Vibbert et al. | |
| 2016/0042748 A1 | 2/2016 | Jain et al. | |
| 2016/0048666 A1 | 2/2016 | Dey et al. | |
| 2016/0055422 A1 | 2/2016 | Li | |
| 2016/0062605 A1 | 3/2016 | Agarwal et al. | |
| 2016/0063998 A1 | 3/2016 | Krishnamoorthy et al. | |
| 2016/0070581 A1 | 3/2016 | Soon-Shiong | |
| 2016/0071516 A1 | 3/2016 | Lee et al. | |
| 2016/0071521 A1 | 3/2016 | Haughay | |
| 2016/0072940 A1 | 3/2016 | Cronin | |
| 2016/0077794 A1 | 3/2016 | Kim et al. | |
| 2016/0078860 A1 | 3/2016 | Paulik et al. | |
| 2016/0080165 A1 | 3/2016 | Ehsani et al. | |
| 2016/0086116 A1 | 3/2016 | Rao et al. | |
| 2016/0091967 A1 | 3/2016 | Prokofieva et al. | |
| 2016/0092447 A1 | 3/2016 | Venkataraman et al. | |
| 2016/0092766 A1 | 3/2016 | Sainath et al. | |
| 2016/0093291 A1 | 3/2016 | Kim | |
| 2016/0093298 A1 | 3/2016 | Naik et al. | |
| 2016/0093301 A1 | 3/2016 | Bellegarda et al. | |
| 2016/0093304 A1 | 3/2016 | Kim et al. | |
| 2016/0094700 A1 | 3/2016 | Lee et al. | |
| 2016/0094979 A1 | 3/2016 | Naik et al. | |

(56) References Cited

U.S. PATENT DOCUMENTS

| | | |
|---|---|---|
| 2016/0098991 A1 | 4/2016 | Luo et al. |
| 2016/0099892 A1* | 4/2016 | Palakovich ............ H04L 51/04 709/206 |
| 2016/0104486 A1 | 4/2016 | Penilla et al. |
| 2016/0111091 A1 | 4/2016 | Bakish |
| 2016/0117386 A1 | 4/2016 | Ajmera et al. |
| 2016/0118048 A1 | 4/2016 | Heide |
| 2016/0119338 A1 | 4/2016 | Cheyer |
| 2016/0125048 A1 | 5/2016 | Hamada |
| 2016/0125071 A1 | 5/2016 | Gabbai |
| 2016/0132484 A1 | 5/2016 | Nauze et al. |
| 2016/0132488 A1 | 5/2016 | Clark et al. |
| 2016/0133254 A1 | 5/2016 | Vogel et al. |
| 2016/0139662 A1 | 5/2016 | Dabhade |
| 2016/0140951 A1 | 5/2016 | Agiomyrgiannakis et al. |
| 2016/0147725 A1 | 5/2016 | Patten et al. |
| 2016/0148610 A1 | 5/2016 | Kennewick, Jr. et al. |
| 2016/0155442 A1 | 6/2016 | Kannan et al. |
| 2016/0155443 A1 | 6/2016 | Khan et al. |
| 2016/0162456 A1 | 6/2016 | Munro et al. |
| 2016/0163311 A1 | 6/2016 | Crook et al. |
| 2016/0163312 A1 | 6/2016 | Naik et al. |
| 2016/0170966 A1 | 6/2016 | Kolo |
| 2016/0173578 A1 | 6/2016 | Sharma et al. |
| 2016/0173960 A1 | 6/2016 | Snibbe et al. |
| 2016/0179462 A1 | 6/2016 | Bjorkengren |
| 2016/0180844 A1 | 6/2016 | Vanblon et al. |
| 2016/0182410 A1 | 6/2016 | Janakiraman et al. |
| 2016/0182709 A1 | 6/2016 | Kim et al. |
| 2016/0188181 A1 | 6/2016 | Smith |
| 2016/0188738 A1 | 6/2016 | Gruber et al. |
| 2016/0189717 A1 | 6/2016 | Kannan et al. |
| 2016/0198319 A1 | 7/2016 | Huang et al. |
| 2016/0210981 A1 | 7/2016 | Lee |
| 2016/0212488 A1 | 7/2016 | Os et al. |
| 2016/0217784 A1 | 7/2016 | Gelfenbeyn et al. |
| 2016/0224540 A1 | 8/2016 | Stewart et al. |
| 2016/0224774 A1* | 8/2016 | Pender .................... G06F 21/32 |
| 2016/0225372 A1 | 8/2016 | Cheung et al. |
| 2016/0240187 A1 | 8/2016 | Fleizach et al. |
| 2016/0247061 A1 | 8/2016 | Trask et al. |
| 2016/0253312 A1 | 9/2016 | Rhodes |
| 2016/0253528 A1 | 9/2016 | Gao et al. |
| 2016/0259623 A1 | 9/2016 | Sumner et al. |
| 2016/0259656 A1 | 9/2016 | Sumner et al. |
| 2016/0259779 A1 | 9/2016 | Labsk et al. |
| 2016/0260431 A1 | 9/2016 | Newendorp et al. |
| 2016/0260433 A1 | 9/2016 | Sumner et al. |
| 2016/0260434 A1 | 9/2016 | Gelfenbeyn et al. |
| 2016/0260436 A1 | 9/2016 | Lemay et al. |
| 2016/0266871 A1 | 9/2016 | Schmid et al. |
| 2016/0267904 A1 | 9/2016 | Biadsy et al. |
| 2016/0275941 A1 | 9/2016 | Bellegarda et al. |
| 2016/0275947 A1 | 9/2016 | Li et al. |
| 2016/0282956 A1 | 9/2016 | Ouyang et al. |
| 2016/0284005 A1 | 9/2016 | Daniel et al. |
| 2016/0284199 A1 | 9/2016 | Dotan-Cohen et al. |
| 2016/0286045 A1 | 9/2016 | Sheltiel et al. |
| 2016/0293168 A1 | 10/2016 | Chen |
| 2016/0299685 A1 | 10/2016 | Zhai et al. |
| 2016/0299882 A1 | 10/2016 | Hegerty et al. |
| 2016/0299883 A1 | 10/2016 | Zhu et al. |
| 2016/0307566 A1 | 10/2016 | Bellegarda |
| 2016/0308799 A1* | 10/2016 | Schubert ............... H04L 51/046 |
| 2016/0313906 A1 | 10/2016 | Kilchenko et al. |
| 2016/0314788 A1 | 10/2016 | Jitkoff et al. |
| 2016/0314792 A1 | 10/2016 | Alvarez et al. |
| 2016/0321261 A1 | 11/2016 | Spasojevic et al. |
| 2016/0322045 A1 | 11/2016 | Hatfeild et al. |
| 2016/0322050 A1 | 11/2016 | Wang et al. |
| 2016/0328205 A1 | 11/2016 | Agrawal et al. |
| 2016/0328893 A1 | 11/2016 | Cordova et al. |
| 2016/0334973 A1* | 11/2016 | Reckhow ............... G06T 13/80 |
| 2016/0336007 A1 | 11/2016 | Hanazawa |
| 2016/0336010 A1 | 11/2016 | Lindahl |
| 2016/0336024 A1 | 11/2016 | Choi et al. |
| 2016/0337299 A1 | 11/2016 | Lane et al. |
| 2016/0337301 A1 | 11/2016 | Rollins et al. |
| 2016/0342685 A1 | 11/2016 | Basu et al. |
| 2016/0342781 A1 | 11/2016 | Jeon |
| 2016/0351190 A1 | 12/2016 | Binder et al. |
| 2016/0352567 A1 | 12/2016 | Robbins et al. |
| 2016/0357304 A1 | 12/2016 | Hatori et al. |
| 2016/0357728 A1 | 12/2016 | Bellegarda et al. |
| 2016/0357861 A1 | 12/2016 | Carlhian et al. |
| 2016/0357870 A1 | 12/2016 | Hentschel et al. |
| 2016/0358598 A1 | 12/2016 | Williams et al. |
| 2016/0358600 A1 | 12/2016 | Nallasamy et al. |
| 2016/0358619 A1 | 12/2016 | Ramprashad et al. |
| 2016/0359771 A1 | 12/2016 | Sridhar |
| 2016/0360039 A1* | 12/2016 | Sanghavi ............ H04M 3/5183 |
| 2016/0360336 A1 | 12/2016 | Gross et al. |
| 2016/0360382 A1 | 12/2016 | Gross et al. |
| 2016/0364378 A1 | 12/2016 | Futrell et al. |
| 2016/0365101 A1 | 12/2016 | Foy et al. |
| 2016/0371250 A1 | 12/2016 | Rhodes |
| 2016/0372112 A1 | 12/2016 | Miller et al. |
| 2016/0378747 A1 | 12/2016 | Orr et al. |
| 2016/0379091 A1 | 12/2016 | Lin et al. |
| 2016/0379626 A1 | 12/2016 | Deisher et al. |
| 2016/0379633 A1 | 12/2016 | Lehman et al. |
| 2016/0379641 A1 | 12/2016 | Liu et al. |
| 2017/0004824 A1 | 1/2017 | Yoo et al. |
| 2017/0011303 A1 | 1/2017 | Annapureddy et al. |
| 2017/0011742 A1 | 1/2017 | Jing et al. |
| 2017/0018271 A1 | 1/2017 | Khan et al. |
| 2017/0019987 A1 | 1/2017 | Dragone et al. |
| 2017/0025124 A1 | 1/2017 | Mixter et al. |
| 2017/0031576 A1 | 2/2017 | Saoji et al. |
| 2017/0032783 A1 | 2/2017 | Lord et al. |
| 2017/0032791 A1 | 2/2017 | Elson et al. |
| 2017/0040002 A1 | 2/2017 | Basson et al. |
| 2017/0055895 A1 | 3/2017 | Des Jardins et al. |
| 2017/0060853 A1 | 3/2017 | Lee et al. |
| 2017/0068423 A1 | 3/2017 | Napolitano et al. |
| 2017/0068513 A1 | 3/2017 | Stasior et al. |
| 2017/0068550 A1 | 3/2017 | Zeitlin |
| 2017/0068670 A1 | 3/2017 | Orr et al. |
| 2017/0076720 A1 | 3/2017 | Gopalan et al. |
| 2017/0076721 A1 | 3/2017 | Bargetzi et al. |
| 2017/0083179 A1 | 3/2017 | Gruber et al. |
| 2017/0083285 A1 | 3/2017 | Meyers et al. |
| 2017/0090569 A1 | 3/2017 | Levesque |
| 2017/0091168 A1 | 3/2017 | Bellegarda et al. |
| 2017/0092270 A1 | 3/2017 | Newendorp et al. |
| 2017/0092278 A1 | 3/2017 | Evermann et al. |
| 2017/0102915 A1 | 4/2017 | Kuscher et al. |
| 2017/0103749 A1 | 4/2017 | Zhao et al. |
| 2017/0105190 A1 | 4/2017 | Logan et al. |
| 2017/0116177 A1 | 4/2017 | Walia |
| 2017/0116989 A1 | 4/2017 | Yadgar et al. |
| 2017/0124190 A1 | 5/2017 | Wang et al. |
| 2017/0125016 A1 | 5/2017 | Wang |
| 2017/0127124 A9 | 5/2017 | Wilson et al. |
| 2017/0131778 A1 | 5/2017 | Iyer |
| 2017/0132199 A1 | 5/2017 | Vescovi et al. |
| 2017/0140644 A1 | 5/2017 | Hwang et al. |
| 2017/0154033 A1 | 6/2017 | Lee |
| 2017/0154055 A1 | 6/2017 | Dimson et al. |
| 2017/0161018 A1 | 6/2017 | Lemay et al. |
| 2017/0161268 A1 | 6/2017 | Badaskar |
| 2017/0169818 A1 | 6/2017 | VanBlon et al. |
| 2017/0169819 A1 | 6/2017 | Mese et al. |
| 2017/0178619 A1 | 6/2017 | Naik et al. |
| 2017/0178626 A1 | 6/2017 | Gruber et al. |
| 2017/0180499 A1 | 6/2017 | Gelfenbeyn et al. |
| 2017/0185375 A1 | 6/2017 | Martel et al. |
| 2017/0185581 A1 | 6/2017 | Bojja et al. |
| 2017/0186429 A1 | 6/2017 | Giuli et al. |
| 2017/0193083 A1 | 7/2017 | Bhatt et al. |
| 2017/0199874 A1 | 7/2017 | Patel et al. |
| 2017/0200066 A1 | 7/2017 | Wang et al. |
| 2017/0221486 A1 | 8/2017 | Kurata et al. |
| 2017/0227935 A1 | 8/2017 | Su et al. |

(56) References Cited

U.S. PATENT DOCUMENTS

| | | |
|---|---|---|
| 2017/0228382 A1 | 8/2017 | Haviv et al. |
| 2017/0230709 A1 | 8/2017 | Van Os et al. |
| 2017/0242653 A1 | 8/2017 | Lang et al. |
| 2017/0243468 A1 | 8/2017 | Dotan-Cohen et al. |
| 2017/0256256 A1 | 9/2017 | Wang et al. |
| 2017/0263247 A1 | 9/2017 | Kang et al. |
| 2017/0263248 A1 | 9/2017 | Gruber et al. |
| 2017/0263249 A1 | 9/2017 | Akbacak et al. |
| 2017/0264451 A1 | 9/2017 | Yu et al. |
| 2017/0278514 A1 | 9/2017 | Mathias et al. |
| 2017/0285915 A1 | 10/2017 | Napolitano et al. |
| 2017/0286397 A1 | 10/2017 | Gonzalez |
| 2017/0295446 A1 | 10/2017 | Thagadur Shivappa |
| 2017/0316775 A1 | 11/2017 | Le et al. |
| 2017/0316782 A1 | 11/2017 | Haughay et al. |
| 2017/0323637 A1 | 11/2017 | Naik |
| 2017/0345411 A1 | 11/2017 | Raitio et al. |
| 2017/0346949 A1* | 11/2017 | Sanghavi ............ H04M 3/5183 |
| 2017/0352346 A1 | 12/2017 | Paulik et al. |
| 2017/0352350 A1 | 12/2017 | Booker et al. |
| 2017/0357478 A1 | 12/2017 | Piersol et al. |
| 2017/0357632 A1 | 12/2017 | Pagallo et al. |
| 2017/0357633 A1 | 12/2017 | Wang et al. |
| 2017/0357637 A1 | 12/2017 | Nell et al. |
| 2017/0357640 A1 | 12/2017 | Bellegarda et al. |
| 2017/0357716 A1 | 12/2017 | Bellegarda et al. |
| 2017/0358300 A1 | 12/2017 | Laurens et al. |
| 2017/0358301 A1 | 12/2017 | Raitio et al. |
| 2017/0358302 A1 | 12/2017 | Orr et al. |
| 2017/0358303 A1 | 12/2017 | Walker, II et al. |
| 2017/0358304 A1 | 12/2017 | Castillo et al. |
| 2017/0358305 A1 | 12/2017 | Kudurshian et al. |
| 2017/0371885 A1 | 12/2017 | Aggarwal et al. |
| 2018/0007060 A1 | 1/2018 | Leblang et al. |
| 2018/0007538 A1 | 1/2018 | Naik et al. |
| 2018/0012596 A1 | 1/2018 | Piernot et al. |
| 2018/0033431 A1 | 2/2018 | Newendorp et al. |
| 2018/0054505 A1 | 2/2018 | Hart et al. |
| 2018/0060312 A1 | 3/2018 | Won |
| 2018/0063624 A1 | 3/2018 | Boesen |
| 2018/0067914 A1 | 3/2018 | Chen et al. |
| 2018/0090143 A1 | 3/2018 | Saddler et al. |
| 2018/0107945 A1 | 4/2018 | Gao et al. |
| 2018/0108346 A1 | 4/2018 | Paulik et al. |
| 2018/0130470 A1 | 5/2018 | Lemay et al. |
| 2018/0137856 A1 | 5/2018 | Gilbert |
| 2018/0137857 A1 | 5/2018 | Zhou et al. |
| 2018/0144748 A1 | 5/2018 | Leong |
| 2018/0190273 A1 | 7/2018 | Karimli et al. |
| 2018/0196683 A1 | 7/2018 | Radebaugh et al. |
| 2018/0213448 A1 | 7/2018 | Segal et al. |
| 2018/0218735 A1 | 8/2018 | Hunt et al. |
| 2018/0232203 A1 | 8/2018 | Gelfenbeyn et al. |
| 2018/0308485 A1 | 10/2018 | Kudurshian et al. |
| 2018/0308486 A1 | 10/2018 | Saddler et al. |
| 2018/0322112 A1 | 11/2018 | Bellegarda et al. |
| 2018/0329677 A1 | 11/2018 | Gruber et al. |
| 2018/0329957 A1 | 11/2018 | Frazzingaro et al. |
| 2018/0329982 A1 | 11/2018 | Patel et al. |
| 2018/0330714 A1 | 11/2018 | Paulik et al. |
| 2018/0330723 A1 | 11/2018 | Acero et al. |
| 2018/0330730 A1 | 11/2018 | Garg et al. |
| 2018/0330731 A1 | 11/2018 | Zeitlin et al. |
| 2018/0330737 A1 | 11/2018 | Paulik et al. |
| 2018/0332118 A1 | 11/2018 | Phipps et al. |
| 2018/0336275 A1 | 11/2018 | Graham et al. |
| 2018/0336892 A1 | 11/2018 | Kim et al. |
| 2018/0336894 A1 | 11/2018 | Graham et al. |
| 2018/0336905 A1 | 11/2018 | Kim et al. |
| 2019/0116264 A1* | 4/2019 | Sanghavi ............ H04M 3/5183 |

FOREIGN PATENT DOCUMENTS

| | | |
|---|---|---|
| CA | 2792412 A1 | 7/2011 |
| CA | 2666438 C | 6/2013 |
| CN | 101416471 A | 4/2009 |
| CN | 101427244 A | 5/2009 |
| CN | 101448340 A | 6/2009 |
| CN | 101453498 A | 6/2009 |
| CN | 101499156 A | 8/2009 |
| CN | 101500041 A | 8/2009 |
| CN | 101515952 A | 8/2009 |
| CN | 101535983 A | 9/2009 |
| CN | 101547396 A | 9/2009 |
| CN | 101557432 A | 10/2009 |
| CN | 101601088 A | 12/2009 |
| CN | 101604521 A | 12/2009 |
| CN | 101632316 A | 1/2010 |
| CN | 101636736 A | 1/2010 |
| CN | 101673544 A | 3/2010 |
| CN | 101751387 A | 6/2010 |
| CN | 101833286 A | 9/2010 |
| CN | 101847405 A | 9/2010 |
| CN | 101894547 A | 11/2010 |
| CN | 101939740 A | 1/2011 |
| CN | 101951553 A | 1/2011 |
| CN | 102137193 A | 7/2011 |
| CN | 102160043 A | 8/2011 |
| CN | 102201235 A | 9/2011 |
| CN | 102246136 A | 11/2011 |
| CN | 202035047 U | 11/2011 |
| CN | 102282609 A | 12/2011 |
| CN | 202092650 U | 12/2011 |
| CN | 102368256 A | 3/2012 |
| CN | 102405463 A | 4/2012 |
| CN | 102498457 A | 6/2012 |
| CN | 102629246 A | 8/2012 |
| CN | 102682769 A | 9/2012 |
| CN | 102682771 A | 9/2012 |
| CN | 102685295 A | 9/2012 |
| CN | 102693725 A | 9/2012 |
| CN | 102792320 A | 11/2012 |
| CN | 102801853 A | 11/2012 |
| CN | 102870065 A | 1/2013 |
| CN | 102917004 A | 2/2013 |
| CN | 102918493 A | 2/2013 |
| CN | 103035240 A | 4/2013 |
| CN | 103038728 A | 4/2013 |
| CN | 103093334 A | 5/2013 |
| CN | 103135916 A | 6/2013 |
| CN | 103365279 A | 10/2013 |
| CN | 103744761 A | 4/2014 |
| CN | 103795850 A | 5/2014 |
| CN | 103930945 A | 7/2014 |
| CN | 104038621 A | 9/2014 |
| CN | 104090652 A | 10/2014 |
| CN | 104144377 A | 11/2014 |
| CN | 104281259 A | 1/2015 |
| CN | 104284257 A | 1/2015 |
| CN | 104335234 A | 2/2015 |
| CN | 104423625 A | 3/2015 |
| CN | 104463552 A | 3/2015 |
| CN | 104516522 A | 4/2015 |
| CN | 104854583 A | 8/2015 |
| CN | 104951077 A | 9/2015 |
| CN | 105247511 A | 1/2016 |
| CN | 105264524 A | 1/2016 |
| CN | 105471705 A | 4/2016 |
| CN | 107919123 A | 4/2018 |
| DE | 102008024258 A1 | 11/2009 |
| DE | 202016008226 U1 | 5/2017 |
| EP | 1909263 B1 | 1/2009 |
| EP | 1335620 B1 | 3/2009 |
| EP | 2069895 A1 | 6/2009 |
| EP | 2081185 A1 | 7/2009 |
| EP | 2094032 A1 | 8/2009 |
| EP | 2096840 A1 | 9/2009 |
| EP | 2107553 A1 | 10/2009 |
| EP | 2109295 A1 | 10/2009 |
| EP | 1720375 B1 | 7/2010 |
| EP | 2205010 A1 | 7/2010 |
| EP | 2309491 A1 | 4/2011 |
| EP | 2329348 | 6/2011 |
| EP | 2339576 A2 | 6/2011 |

(56) References Cited

FOREIGN PATENT DOCUMENTS

| | | |
|---|---|---|
| EP | 2400373 A1 | 12/2011 |
| EP | 2431842 A2 | 3/2012 |
| EP | 2523188 A1 | 11/2012 |
| EP | 2551784 A1 | 1/2013 |
| EP | 2555536 A1 | 2/2013 |
| EP | 2575128 A2 | 4/2013 |
| EP | 2632129 A1 | 8/2013 |
| EP | 2669889 A2 | 12/2013 |
| EP | 2683175 A1 | 1/2014 |
| EP | 2733598 A2 | 5/2014 |
| EP | 2760015 A1 | 7/2014 |
| EP | 2801890 A1 | 11/2014 |
| EP | 2801972 A1 | 11/2014 |
| EP | 2824564 A1 | 1/2015 |
| EP | 2849177 A1 | 3/2015 |
| EP | 2930715 A1 | 10/2015 |
| EP | 2938022 A1 | 10/2015 |
| EP | 2940556 A1 | 11/2015 |
| EP | 2950307 A1 | 12/2015 |
| EP | 3035329 A1 | 6/2016 |
| EP | 3224708 A1 | 10/2017 |
| EP | 3246916 A1 | 11/2017 |
| EP | 3300074 A1 | 3/2018 |
| EP | 2983065 B1 | 8/2018 |
| JP | 2009-2850 A | 1/2009 |
| JP | 2009-503623 A | 1/2009 |
| JP | 2009-36999 A | 2/2009 |
| JP | 2009-505142 A | 2/2009 |
| JP | 2009-47920 A | 3/2009 |
| JP | 2009-069062 A | 4/2009 |
| JP | 2009-98490 A | 5/2009 |
| JP | 2009-110300 A | 5/2009 |
| JP | 2009-134409 A | 6/2009 |
| JP | 2009-140444 A | 6/2009 |
| JP | 2009-186989 A | 8/2009 |
| JP | 2009-193448 A | 8/2009 |
| JP | 2009-193457 A | 8/2009 |
| JP | 2009-193532 A | 8/2009 |
| JP | 2009-205367 A | 9/2009 |
| JP | 2009-223840 A | 10/2009 |
| JP | 2009-294913 A | 12/2009 |
| JP | 2009-294946 A | 12/2009 |
| JP | 2009-543166 A | 12/2009 |
| JP | 2010-66519 A | 3/2010 |
| JP | 2010-78979 A | 4/2010 |
| JP | 2010-108378 A | 5/2010 |
| JP | 2010-518475 A | 5/2010 |
| JP | 2010-518526 A | 5/2010 |
| JP | 2010-146347 A | 7/2010 |
| JP | 2010-157207 A | 7/2010 |
| JP | 2010-166478 A | 7/2010 |
| JP | 2010-205111 A | 9/2010 |
| JP | 2010-224236 A | 10/2010 |
| JP | 4563106 B2 | 10/2010 |
| JP | 2010-535377 A | 11/2010 |
| JP | 2010-287063 A | 12/2010 |
| JP | 2011-33874 A | 2/2011 |
| JP | 2011-41026 A | 2/2011 |
| JP | 2011-45005 A | 3/2011 |
| JP | 2011-59659 A | 3/2011 |
| JP | 2011-81541 A | 4/2011 |
| JP | 2011-525045 A | 9/2011 |
| JP | 2011-238022 A | 11/2011 |
| JP | 2011-250027 A | 12/2011 |
| JP | 2012-014394 A | 1/2012 |
| JP | 2012-33997 A | 2/2012 |
| JP | 2012-508530 A | 4/2012 |
| JP | 2012-089020 A | 5/2012 |
| JP | 2012-116442 A | 6/2012 |
| JP | 2012-142744 A | 7/2012 |
| JP | 2012-147063 A | 8/2012 |
| JP | 2012-518847 A | 8/2012 |
| JP | 2013-37688 A | 2/2013 |
| JP | 2013-511214 A | 3/2013 |
| JP | 2013-65284 A | 4/2013 |
| JP | 2013-73240 A | 4/2013 |
| JP | 2013-513315 A | 4/2013 |
| JP | 2013-080476 A | 5/2013 |
| JP | 2013-517566 A | 5/2013 |
| JP | 2013-134430 A | 7/2013 |
| JP | 2013/140520 A | 7/2013 |
| JP | 2013-527947 A | 7/2013 |
| JP | 2013-528012 A | 7/2013 |
| JP | 2013-156349 A | 8/2013 |
| JP | 2013-200423 A | 10/2013 |
| JP | 2013-205999 A | 10/2013 |
| JP | 2013-238936 A | 11/2013 |
| JP | 2014-10688 A | 1/2014 |
| JP | 2014-026629 A | 2/2014 |
| JP | 2014-60600 A | 4/2014 |
| JP | 2014-72586 A | 4/2014 |
| JP | 2014-077969 A | 5/2014 |
| JP | 2014/109889 A | 6/2014 |
| JP | 2014-124332 A | 7/2014 |
| JP | 2014-126600 A | 7/2014 |
| JP | 2014-145842 A | 8/2014 |
| JP | 2014-150323 A | 8/2014 |
| JP | 2014-222514 A | 11/2014 |
| JP | 2015-8001 A | 1/2015 |
| JP | 2015-501022 A | 1/2015 |
| JP | 2015-41845 A | 3/2015 |
| JP | 2015-94848 A | 5/2015 |
| JP | 2015-519675 A | 7/2015 |
| JP | 2015-524974 A | 8/2015 |
| JP | 2015-526776 A | 9/2015 |
| JP | 2015-528140 A | 9/2015 |
| JP | 2015-528918 A | 10/2015 |
| JP | 2016-119615 A | 6/2016 |
| JP | 2016-151928 A | 8/2016 |
| KR | 10-2009-0001716 A | 1/2009 |
| KR | 10-2009-0028464 A | 3/2009 |
| KR | 10-2009-0030117 A | 3/2009 |
| KR | 10-2009-0086805 A | 8/2009 |
| KR | 10-0920267 B1 | 10/2009 |
| KR | 10-2009-0122944 A | 12/2009 |
| KR | 10-2009-0127961 A | 12/2009 |
| KR | 10-2009-0129192 A | 12/2009 |
| KR | 10-2010-0015958 A | 2/2010 |
| KR | 10-2010-0048571 A | 5/2010 |
| KR | 10-2010-0053149 A | 5/2010 |
| KR | 10-2010-0119519 A | 11/2010 |
| KR | 10-2011-0043644 A | 4/2011 |
| KR | 10-1032792 B1 | 5/2011 |
| KR | 10-2011-0068490 A | 6/2011 |
| KR | 10-2011-0072847 A | 6/2011 |
| KR | 10-2011-0086492 A | 7/2011 |
| KR | 10-2011-0100620 A | 9/2011 |
| KR | 10-2011-0113414 A | 10/2011 |
| KR | 10-2011-0115134 A | 10/2011 |
| KR | 10-2012-0020164 A | 3/2012 |
| KR | 10-2012-0031722 A | 4/2012 |
| KR | 10-1178310 B1 | 8/2012 |
| KR | 10-2012-0120316 A | 11/2012 |
| KR | 10-2012-0137435 A | 12/2012 |
| KR | 10-2012-0137440 A | 12/2012 |
| KR | 10-2012-0138826 A | 12/2012 |
| KR | 10-2012-0139827 A | 12/2012 |
| KR | 10-1193668 B1 | 12/2012 |
| KR | 10-2013-0035983 A | 4/2013 |
| KR | 10-2013-0108563 A | 10/2013 |
| KR | 10-1334342 B1 | 11/2013 |
| KR | 10-2013-0131252 A | 12/2013 |
| KR | 10-2013-0133629 A | 12/2013 |
| KR | 10-2014-0031283 A | 3/2014 |
| KR | 10-2014-0033574 A | 3/2014 |
| KR | 10-2014-0147557 A | 12/2014 |
| KR | 10-2015-0013631 A | 2/2015 |
| KR | 10-2015-0043512 A | 4/2015 |
| KR | 10-2016-0010523 A | 1/2016 |
| RU | 2349970 C2 | 3/2009 |
| RU | 2353068 C2 | 4/2009 |
| RU | 2364917 C2 | 8/2009 |
| TW | M348993 U | 1/2009 |
| TW | 200943903 A | 10/2009 |

(56) References Cited

FOREIGN PATENT DOCUMENTS

| | | |
|---|---|---|
| TW | 201018258 A | 5/2010 |
| TW | 201027515 A1 | 7/2010 |
| TW | 201028996 A1 | 8/2010 |
| TW | 201110108 A1 | 3/2011 |
| TW | 2011-42823 A1 | 12/2011 |
| TW | 201227715 A1 | 7/2012 |
| TW | 201245989 A1 | 11/2012 |
| TW | 201312548 A1 | 3/2013 |
| WO | 2009/009240 A2 | 1/2009 |
| WO | 2009/016631 A2 | 2/2009 |
| WO | 2009/017280 A1 | 2/2009 |
| WO | 2009/034686 A1 | 3/2009 |
| WO | 2009/075912 A1 | 6/2009 |
| WO | 2009/104126 A1 | 8/2009 |
| WO | 2009/156438 A1 | 12/2009 |
| WO | 2009/156978 A1 | 12/2009 |
| WO | 2010/013369 A1 | 2/2010 |
| WO | 2010/054373 A2 | 5/2010 |
| WO | 2010/075623 A1 | 7/2010 |
| WO | 2010/100937 A1 | 9/2010 |
| WO | 2010/141802 A1 | 12/2010 |
| WO | 2011/057346 A1 | 5/2011 |
| WO | 2011/060106 A1 | 5/2011 |
| WO | 2011/088053 A2 | 7/2011 |
| WO | 2011/093025 A1 | 8/2011 |
| WO | 2011/116309 A1 | 9/2011 |
| WO | 2011/133543 A1 | 10/2011 |
| WO | 2011/150730 A1 | 12/2011 |
| WO | 2011/163350 A1 | 12/2011 |
| WO | 2011/088053 A3 | 1/2012 |
| WO | 2012/019637 A1 | 2/2012 |
| WO | 2012/129231 A1 | 9/2012 |
| WO | 2012/135157 A2 | 10/2012 |
| WO | 2012/154317 A1 | 11/2012 |
| WO | 2012/155079 A2 | 11/2012 |
| WO | 2012/167168 A2 | 12/2012 |
| WO | 2013/009578 A2 | 1/2013 |
| WO | 2013/022135 A1 | 2/2013 |
| WO | 2013/022223 A2 | 2/2013 |
| WO | 2013/048880 A1 | 4/2013 |
| WO | 2013/049358 A1 | 4/2013 |
| WO | 2013/163113 A1 | 10/2013 |
| WO | 2013/169842 A2 | 11/2013 |
| WO | 2013/173504 A1 | 11/2013 |
| WO | 2013/173511 A2 | 11/2013 |
| WO | 2013/176847 A1 | 11/2013 |
| WO | 2013/184953 A1 | 12/2013 |
| WO | 2013/184990 A1 | 12/2013 |
| WO | 2014/003138 A1 | 1/2014 |
| WO | 2014/021967 A1 | 2/2014 |
| WO | 2014/022148 A1 | 2/2014 |
| WO | 2014/028797 A1 | 2/2014 |
| WO | 2014/031505 A1 | 2/2014 |
| WO | 2014/047047 A1 | 3/2014 |
| WO | 2014/066352 A1 | 5/2014 |
| WO | 2014/070872 A2 | 5/2014 |
| WO | 2014/078965 A1 | 5/2014 |
| WO | 2014/096506 A1 | 6/2014 |
| WO | 2014/124332 A2 | 8/2014 |
| WO | 2014/137074 A1 | 9/2014 |
| WO | 2014/138604 A1 | 9/2014 |
| WO | 2014/143959 A2 | 9/2014 |
| WO | 2014/144579 A1 | 9/2014 |
| WO | 2014/159581 A1 | 10/2014 |
| WO | 2014/197336 A1 | 12/2014 |
| WO | 2014/200728 A1 | 12/2014 |
| WO | 2014/204659 A2 | 12/2014 |
| WO | 2015/018440 A1 | 2/2015 |
| WO | 2015/029379 A1 | 3/2015 |
| WO | 2015/030796 A1 | 3/2015 |
| WO | 2015/041892 A1 | 3/2015 |
| WO | 2015/084659 A1 | 6/2015 |
| WO | 2015/092943 A1 | 6/2015 |
| WO | 2015/094169 A1 | 6/2015 |
| WO | 2015/094369 A1 | 6/2015 |
| WO | 2015/099939 A1 | 7/2015 |
| WO | 2015/116151 A1 | 8/2015 |
| WO | 2015/151133 A1 | 10/2015 |
| WO | 2015/153310 A1 | 10/2015 |
| WO | 2015/157013 A1 | 10/2015 |
| WO | 2015/183401 A1 | 12/2015 |
| WO | 2015/183699 A1 | 12/2015 |
| WO | 2015/184186 A1 | 12/2015 |
| WO | 2015/200207 A1 | 12/2015 |
| WO | 2016/027933 A1 | 2/2016 |
| WO | 2016/028946 A1 | 2/2016 |
| WO | 2016/033257 A1 | 3/2016 |
| WO | 2016/054230 A1 | 4/2016 |
| WO | 2016/057268 A1 | 4/2016 |
| WO | 2016/075081 A1 | 5/2016 |
| WO | 2016/085775 A2 | 6/2016 |
| WO | 2016/100139 A1 | 6/2016 |
| WO | 2016/111881 A1 | 7/2016 |
| WO | 2016/144840 A1 | 9/2016 |
| WO | 2016/144982 A1 | 9/2016 |
| WO | 2016/175354 A1 | 11/2016 |
| WO | 2016/190950 A1 | 12/2016 |
| WO | 2016/209444 A1 | 12/2016 |
| WO | 2017/044260 A1 | 3/2017 |
| WO | 2017/044629 A1 | 3/2017 |
| WO | 2017/053311 A1 | 3/2017 |

OTHER PUBLICATIONS

"SmartThings +Amazon Echo", Smartthings Samsung [online], Available online at <https://web.archive.org/web/20160509231428/https://blog.smartthings.com/featured/alexa-turn-on-my-smartthings/>, Aug. 21, 2015, 3 pages.

"Ask Alexa—Things That Are Smart Wiki", Available online at <URL:http://thingsthataresmart.wiki/index.php?title=Ask_Alexa&oldid=4283>, [retrieved from internet on Aug. 2, 2017], Jun. 8, 2016, pp. 1-31.

"DIRECTV™ Voice", Now Part of the DIRECTTV Mobile App for Phones, Sep. 18, 2013, 5 pages.

"The world of Virtual Assistants—more SemTech . . . ", End of Business as Usual—Glenn's External blog, Online Available at <https://web.archive.org/web/20091101840940/http://glennas.wordpress.com/2009/10/17/the-world-of-virtual-assistants-more-semtech/>, Oct. 17, 2009, 5 pages.

Adium, "AboutAdium—Adium X—Trac", available at <http://web.archive.org/web/20070819113247/http://trac.adiumx.com/wiki/AboutAdium>, retrieved on Nov. 25, 2011, 2 pages.

Alfred App, "Alfred", available at <http://www.alfredapp.com/>, retrieved on Feb. 8, 2012, 5 pages.

Anania, Peter, "Amazon Echo with Home Automation (Smartthings)", Available online at https://www.youtube.com/watch?v=LMW6aXmsWNE, Dec. 20, 2015, 1 page.

api.ai, "Android App Review—Speaktoit Assistant", Available at <https://www.youtube.com/watch?v=myE498nyfGw>, Mar. 30, 2011, 3 pages.

Apple, "VoiceOver", available at <http://www.apple.com/accessibility/voiceover/>, May 19, 2014, 3 pages.

Berry et al., "PTIME: Personalized Assistance for Calendaring", ACM Transactions on Intelligent Systems and Technology, vol. 2, No. 4, Article 40, Jul. 2011, pp. 1-22.

Bertulucci, Jeff, "Google Adds Voice Search to Chrome Browser", PC World, Jun. 14, 2011, 5 pages.

Bocchieri et al., "Use of Geographical Meta-Data in ASR Language and Acoustic Models", IEEE International Conference on Acoustics Speech and Signal Processing, 2010, pp. 5118-5121.

Butcher, Mike, "EVI Arrives in Town to go Toe-to-Toe with Siri", TechCrunch, Jan. 23, 2012, 2 pages.

Caraballo et al., "Language Identification Based on a Discriminative Text Categorization Technique", Iberspeech 2012—Vii Jornadas En Tecnologia Del Habla and Iii Iberiansl Tech Workshop, Nov. 21, 2012, pp. 1-10.

Castleos, "Whole House Voice Control Demonstration", available online at : https://www.youtube.com/watch?v=9SRCoxrZ_W4, Jun. 2, 2012, 26 pages.

(56) References Cited

OTHER PUBLICATIONS

Chen, Yi, "Multimedia Siri Finds and Plays Whatever You Ask For", PSFK Report, Feb. 9, 2012, 9 pages.
Cheyer, Adam, "About Adam Cheyer", available at <http://www.adam.cheyer.com/about.html>, retrieved on Sep. 17, 2012, 2 pages.
Choi et al., "Acoustic and Visual Signal based Context Awareness System for Mobile Application", IEEE Transactions on Consumer Electronics, vol. 57, No. 2, May 2011, pp. 738-746.
Colt, Sam, "Here's One Way Apple's Smartwatch Could Be Better Than Anything Else", Business Insider, Aug. 21, 2014, pp. 1-4.
Deedeevuu, "Amazon Echo Alarm Feature", Available online at https://www.youtube.com/watch?v=fdjU8eRLk7c, Feb. 16, 2015, 1 page.
Evi, "Meet Evi: The One Mobile Application that Provides Solutions for your Everyday Problems", Feb. 2012, 3 pages.
Exhibit 1, "Natural Language Interface Using Constrained Intermediate Dictionary of Results", List of Publications Manually Reviewed for the Search of U.S. Pat. No. 7,177,798, Mar. 22, 2013, 1 page.
Final Office Action received for U.S. Appl. No. 15/403,906, dated Apr. 30, 2018, 19 pages.
Findlater et al., "Beyond QWERTY: Augmenting Touch-Screen Keyboards with Multi-Touch Gestures for Non-Alphanumeric Input", CHI '12, Austin, Texas, USA, May 5-10, 2012, 4 pages.
Finkel et al., "Joint Parsing and Named Entity Recognition", Human Language Technologies: The 2009 Annual Conference of the North American Chapter of the ACL, Jun. 2009, pp. 326-334.
Gannes, Liz, "Alfred App Gives Personalized Restaurant Recommendations", AllThingsD, Jul. 18, 2011, pp. 1-3.
Gomez et al., "Mouth Gesture and Voice Command Based Robot Command Interface", IEEE International Conference on Robotics and Automation, May 12-17, 2009, pp. 333-338.
Gruber, Thomas R., et al., U.S. Appl. No. 61/186,414, filed Jun. 12, 2009 titled "System and Method for Semantic Auto-Completion" 13 pages.
Gruber, Thomas R., et al., U.S. Appl. No. 61/493,201, filed Jun. 3, 2011 titled "Generating and Processing Data Items That Represent Tasks to Perform", 68 pages.
Gruber, Thomas R., et al., U.S Unpublished/U.S. Appl. No. 61/657,744, filed Jun. 9, 2012 titled "Automatically Adapting User Interfaces for Hands-Free Interaction", 40 pages.
Gruber, Tom, "Big Think Small Screen: How Semantic Computing in the Cloud will Revolutionize the Consumer Experience on the Phone", Keynote Presentation at Web 3.0 Conference, Jan. 2010, 41 pages.
Gruber, Tom, "Siri, A Virtual Personal Assistant-Bringing Intelligence to the Interface", Semantic Technologies Conference, Jun. 16, 2009, 21 pages.
Guay, Matthew, "Location-Driven Productivity with Task Ave", available at <http://iphone.appstorm.net/reviews/productivity/location-driven-productivity-with-task-ave/>, Feb. 19, 2011, 7 pages.
Guim, Mark, "How to Set a Person-Based Reminder with Cortana", available at <http://www.wpcentral.com/how-to-person-based-reminder-cortana>, Apr. 26, 2014, 15 pages.
Hardwar, Devindra, "Driving App Waze Builds its own Siri for Hands-Free Voice Control" Available online at <http://venturebeat.com/2012/02/09/driving-app-waze-builds-its-own-siri-for-hands-free-voice-control/>, retrieved on Feb. 9, 2012, 4 pages.
Hashimoto, Yoshiyuki, "Simple Guide for iPhone Siri, Which Can Be Operated with Your Voice", Shuwa System Co., Ltd., vol. 1, Jul. 5, 2012, pp. 8, 130, 131.
Headset Button Controller v7.3 APK Full APP Download for Android, Blackberry, iPhone, Jan. 27, 2014, 11 pages.
Hear voice from Google translate, Available on URL:https://www.youtube.com/watch?v=18AvMhFgD28, Jan. 28, 2011, 1 page.
id3.org, "id3v2.4.0—Frames", available at <http://id3.org/id3v2.4.0-frames?action=print>, retrieved on Jan. 22, 2015, 41 pages.
Interactive Voice, available at <http://www.helloivee.com/company/>, retrieved on Feb. 10, 2014, 2 pages.
Iowegian International, "FIR Filter Properties, DSPGuru, Digital Signal Processing Central", available at <http://www.dspguru.com/dsp/faq/fir/properties> retrieved on Jul. 28, 2010, 6 pages.
Jawaid et al., "Machine Translation with Significant Word Reordering and Rich Target-Side Morphology", WDS'11 Proceedings of Contributed Papers, Part I, 2011, pp. 161-166.
Jiang et al., "A Syllable-based Name Transliteration System", Proc. of the 2009 Named Entities Workshop, Aug. 7 2009, pp. 96-99.
Jonsson et al, "Proximity-based Reminders Using Bluetooth", 2014 IEEE International Conference on Pervasive Computing and Communications Demonstrations, 2014, pp. 151-153.
Jouvet et al., "Evaluating Grapheme-to-phoneme Converters in Automatic Speech Recognition Context", IEEE, 2012, pp. 4821-4824.
Kazmucha, Allyson, "How to Send Map Locations Using iMessage", iMore.com, Available at <http://www.imore.com/how-use-imessage-share-your-location-your-iphone>, Aug. 2, 2012, 6 pages.
Kickstarter, "Ivee Sleek: Wi-Fi Voice-Activated Assistant", available at <https://www.kickstarter.com/projects/ivee/ivee-sleek-wi-fi-voice-activated-assistant>, retrieved on Feb. 10, 2014, 13 pages.
Lewis, Cameron, "Task Ave for iPhone Review", Mac Life, Available at <http://www.maclife.com/article/reviews/task_ave_iphone_review>, Mar. 3, 2011, 5 pages.
Majerus, Wesley, "Cell Phone Accessibility for your Blind Child", Retrieved from the Internet <URL:https://web.archive.org/web/20100210001100/https://nfb.org/images/nfb/publications/fr/fr28/3/fr280314.htm>, 2010, pp. 1-5.
Meet Ivee, Your Wi-Fi Voice Activated Assistant, available at <http://www.helloivee.com/>, retrieved on Feb. 10, 2014, 8 pages.
Mel Scale, Wikipedia the Free Encyclopedia, Last modified on Oct. 13, 2009 and retrieved on Jul. 28, 2010, available at <http://en.wikipedia.org/wiki/Mel_scale>, 2 pages.
Miller, Chance, "Google Keyboard Updated with New Personalized Suggestions Feature", available at <http://9to5google.com/2014/03/19/google-keyboard-updated-with-new-personalized-suggestions-feature/>, Mar. 19, 2014, 4 pages.
Minimum Phase, Wikipedia the free Encyclopedia, Last modified on Jan. 12, 2010 and retrieved on Jul. 28, 2010, available at <http://en.wikipedia.org/wiki/Minimum_phase>, 8 pages.
Mobile Speech Solutions, Mobile Accessibility, SVOX AG Product Information Sheet, available at <http://www.svox.com/site/bra840604/con782768/mob965831936.aSQ?osLang=1>, Sep. 27, 2012, 1 page.
Morrison, Jonathan, "iPhone 5 Siri Demo", Online Available at <https://www.youtube.com/watch?v=_wHWwG5lhWc>, Sep. 21, 2012, 3 pages.
My Cool Aids, "What's New", available at <http://www.mycoolaids.com/>, 2012, 1 page.
Myers, Brad A., "Shortcutter for Palm", available at <http://www.cs.cmu.edu/~pebbles/v5/shortcutter/palm/index.html>, retrieved on Jun. 18, 2014, 10 pages.
Naone, Erica, "TR10: Intelligent Software Assistant", Technology Review, Mar.-Apr. 2009, 2 pages.
Navigli, Roberto, "Word Sense Disambiguation: A Survey", ACM Computing Surveys, vol. 41, No. 2, Feb. 2009, 69 pages.
NDTV, "Sony SmartWatch 2 Launched in India for Rs. 14,990", available at <http://gadgets.ndtv.com/others/news/sony-smartwatch-2-launched-in-india-for-rs-14990-420319>, Sep. 18, 2013, 4 pages.
Ng, Simon, "Google's Task List Now Comes to Iphone", SimonBlog, Available at <http://www.simonblog.com/2009/02/04/googles-task-list-now-comes-to-iphone/>, Feb. 4, 2009, 3 pages.
Non-Final Office Action received for U.S. Appl. No. 14/732,625, dated May 20, 2016, 14 pages.
Non-Final Office Action received for U.S. Appl. No. 15/403,906, dated Oct. 20, 2017, 24 pages.
Notice of Allowance received for U.S. Appl. No. 14/732,625, dated Oct. 13, 2016, 14 pages.
Notice of Allowance received for U.S. Appl. No. 15/403,906, dated Aug. 10, 2018, 5 pages.
Nozawa et al., "iPhone 4S Perfect Manual", vol. 1, First Edition, Nov. 11, 2011, 5 pages.
Osxdaily, "Get a List of Siri Commands Directly from Siri", Available at <http://osxdaily.com/2013/02/05/list-siri-commands/>, Feb. 5, 2013, 15 pages.

(56) References Cited

OTHER PUBLICATIONS

Pan et al., "Natural Language Aided Visual Query Building for Complex Data Access", In proceeding of: Proceedings of the Twenty-Second Conference on Innovative Applications of Artificial Intelligence, XP055114607, Jul. 11, 2010, pp. 1821-1826.
Pathak et al., "Privacy-preserving Speech Processing: Cryptographic and String-matching Frameworks Show Promise", In: IEEE signal processing magazine, retrieved from <http://www.merl.com/publications/docs/TR2013-063.pdf>, Feb. 13, 2013, 16 pages.
Patra et al., "A Kernel-Based Approach for Biomedical Named Entity Recognition", Scientific World Journal, vol. 2013, 2013, pp. 1-7.
Phoenix Solutions Inc., "Declaration of Christopher Schmandt Regarding the MIT Galaxy System", West Interactive Corp., A Delaware Corporation, Document 40, Jul. 2, 2010, 162 pages.
Powell, Josh, "Now You See Me . . . Show/Hide Performance", available at http://www.learningjguery.com/2010/05/now-you-see-me-showhide-performance, May 4, 2010, 3 pages.
Rios, Mafe, "New bar search for Facebook", Youtube, available at "https://www.youtube.com/watch?v=vwgN1WbvCas", Jul. 19, 2013, 2 pages.
Routines, "SmartThings Support", Available online at <https://web.archive.org/web/20151207165701/https://support.smartthings.com/hc/en-us/articles/205380034-Routines>, 2015, 2 pages.
Sarawagi, Sunita, "CRF Package Page", available at <http://crf.sourceforge.net/>, retrieved on Apr. 6, 2011, 2 pages.
Simonite, Tom, "One Easy Way to Make Siri Smarter", Technology Review, Oct. 18, 2011, 2 pages.
Speaker Recognition, Wikipedia, The Free Enclyclopedia, Nov. 2, 2010, 4 pages.
Spivack, Nova, "Sneak Preview of Siri—Part Two—Technical Foundations—Interview with Tom Gruber, CTO of Siri", Online Available at <https://web.archive.org/web/20100114234454/http://www.twine.com/item/12vhy39k4-22m/interview-with-tom-gruber-of-siri>, Jan. 14, 2010, 5 pages.
SRI, "SRI Speech: Products: Software Development Kits: EduSpeak", available at <http://web.archive.org/web/20090828084033/http://www.speechatsri.com/products/eduspeak>shtml, retrieved on Jun. 20, 2013, 2 pages.
Stent et al., "Geo-Centric Language Models for Local Business Voice Search", AT&T Labs—Research, 2009, pp. 389-396.
Sullivan, Danny, "How Google Instant's Autocomplete Suggestions Work", available at <http://searchengineland.com/how-google-instant-autocomplete-suggestions-work-62592>, Apr. 6, 2011, 12 pages.
Sundaram et al., "Latent Perceptual Mapping with Data-Driven Variable-Length Acoustic Units for Template-Based Speech Recognition", ICASSP 2012, Mar. 2012, pp. 4125-4128.
Textndrive, "Text'nDrive App Demo—Listen and Reply to your Messages by Voice while Driving!", YouTube Video available at <http://www.youtube.com/watch?v=WaGfzoHsAMw>, Apr. 27, 2010, 1 page.
Tofel, Kevin C., "SpeakToIt: A Personal Assistant for Older iPhones, iPads", Apple News, Tips and Reviews, Feb. 9, 2012, 7 pages.
Tucker, Joshua, "Too Lazy to Grab Your TV Remote? Use Siri Instead", Engadget, Nov. 30, 2011, 8 pages.
Tur et al., "The CALO Meeting Assistant System", IEEE Transactions on Audio, Speech and Language Processing, vol. 18, No. 6, Aug. 2010, pp. 1601-1611.
Vlingo Incar, "Distracted Driving Solution with Vlingo InCar", YouTube Video, Available online at <http://www.youtube.com/watch?v=Vgs8XfXxgz4>, Oct. 2010, 2 pages.
Vodafone Deutschland, "Samsung Galaxy S3 Tastatur Spracheingabe", Available online at—"https://www.youtube.com/watch?v=6kOd6Gr8uFE", Aug. 22, 2012, 1 page.
Voiceassist, "Send Text, Listen to and Send E-Mail by Voice", YouTube Video, Available online at <http://www.youtube.com/watch?v=0tEU61nHHA4>, Jul. 30, 2009, 1 page.
Voiceonthego, "Voice on the Go (BlackBerry)", YouTube Video, available online at <http://www.youtube.com/watch?v=pJqpWgQS98w>, Jul. 27, 2009, 1 page.
Wikipedia, "Acoustic Model", available at <http://en.wikipedia.org/wiki/AcousticModel>, retrieved on Sep. 14, 2011, 2 pages.
Wikipedia, "Language Model", available at <http://en.wikipedia.org/wiki/Language_model>, retrieved on Sep. 14, 2011, 4 pages.
Wikipedia, "Speech Recognition", available at <http://en.wikipedia.org/wiki/Speech_recognition>, retrieved on Sep. 14, 2011, 12 pages.
Wilson, Mark, "New iPod Shuffle Moves Buttons to Headphones, Adds Text to Speech", available at <http://gizmodo.com/5167946/new-ipod-shuffle-moves-buttons-to-headphones-adds-text-to-speech>, Mar. 11, 2009, 12 pages.
Xiang et al., "Correcting Phoneme Recognition Errors in Learning Word Pronunciation through Speech Interaction", Speech Communication, vol. 55, No. 1, Jan. 1, 2013, pp. 190-203.
Xu et al., "Speech-Based Interactive Games for Language Learning: Reading, Translation, and Question-Answering", Computational Linguistics and Chinese Language Processing, vol. 14, No. 2, Jun. 2009, pp. 133-160.
Yan et al., "A Scalable Approach to Using DNN-Derived Features in GMM-HMM Based Acoustic Modeling for LVCSR", InInterspeech, 2013, pp. 104-108.
Young et al., "The Hidden Information State model: A practical framework for POMDP-based spoken dialogue management", Computer Speech & Language, vol. 24, Issue 2, 2010, pp. 150-174.
Zainab, "Google Input Tools Shows Onscreen Keyboard in Multiple Languages [Chrome]", available at <http://www.addictivetips.com/internet-tips/google-input-tools-shows-multiple-language-onscreen-keyboards-chrome/>, Jan. 3, 2012, 3 pages.
Zangerle et al., "Recommending #-Tag in Twitter", Proceedings of the Workshop on Semantic Adaptive Socail Web, 2011, pp. 1-12.
Zhang et al., "Research of Text Classification Model Based on Latent Semantic Analysis and Improved HS-SVM", Intelligent Systems and Applications (ISA), 2010 2nd International Workshop, May 22-23, 2010, 5 pages.
Zhong et al., "JustSpeak: Enabling Universal Voice Control on Android", W4A'14, Proceedings of the 11th Web for All Conference, No. 36, Apr. 7-9, 2014, 8 pages.
Notice of Allowance received for U.S. Appl. No. 15/403,906, dated Mar. 20, 2019, 5 pages.
Asakura et al., "What LG thinks; How the TV should be in the Living Room", HiVi, vol. 31, No. 7 (Jul. 2013), Stereo Sound Publishing, Inc., Jun. 17, 2013, pp. 68-71 (Official Copy Only) (See Communication under 37 CFR § 1.98(a) (3)).
Ashbrook, Daniel L., "Enabling Mobile Microinteractions", Retrieved from the Internet: URL: "http://danielashbrook.com/wp-content/uploads/2012/06/2009-Ashbrook-Thesis.pdf", May 2010, 186 pages.
Ashingtondctech & Gaming, "SwipeStatusBar—Reveal the Status Bar in a Fullscreen App", Online Available at: <https://www.youtube.com/watch?v=wA_tT9IAreQ>, Jul. 1, 2013, 3 pages.
Cambria et al., "Jumping NLP Curves: A Review of Natural Language Processing Research", IEEE Computational Intelligence Magazine, 2014, vol. 9, May 2014, pp. 48-57.
Earthling1984, "Samsung Galaxy Smart Stay Feature Explained", Available online at:—"https://www.youtube.com/watch?v=RpjBNtSjupl", May 29, 2013, 1 page.
Filipowicz, Luke, "How to use the Quick Type Keyboard in iOS 8", available online at <https://www.imore.com/comment/568232>, Oct. 11, 2014, pp. 1-17.
"Galaxy S7: How to Adjust Screen Timeout & Lock Screen Timeout", Available online at:—"https://www.youtube.com/watch?v=n6e1WKUS2ww", Jun. 9, 2016, 1 page.
Google Developers, "Voice Search in Your App", Available online at:—https://www.youtube.com/watch?v=PS1FbB5qWEI, Nov. 12, 2014, 1 page.
"Hey Google: How to Create a Shopping List with Your Google Assistant", Available online at:—https://www.youtube.com/watch?v=w9NCsElax1Y, May 25, 2018, 1 page.
"How to Enable Google Assistant on Galaxy 57 and other Android Phones (No Root)", Available online at:—"https://www.youtube.com/watch?v=HeklQbWyksE", Mar. 20, 2017, 1 page.
"How to Use Ok Google Assistant Even Phone is Locked", Available online at:—"https://www.youtube.com/watch?v=9B_gP4j_SP8", Mar. 12, 2018, 1 page.

(56) References Cited

OTHER PUBLICATIONS

INews and Tech, "How to Use the QuickType Keyboard in iOS 8", Available online at:—"http://www.inewsandtech.com/how-to-use-the-quicktype-keyboard-in-ios-8/", Sep. 17, 2014, 6 pages.

IOS 8 Release, "Quick Type Keyboard on iOS 8 Makes Typing Easier", Retrieved from the Internet: URL:https://www.youtube.com/watch?v=0CidLR4fhVU, [Retrieved on Nov. 23, 2018], XP054978896, Jun. 3, 2014, 1 page.

Karn, Ujjwal, "An Intuitive Explanation of Convolutional Neural Networks", The Data Science Blog, Aug. 11, 2016, 23 pages.

Liou et al., "Autoencoder for Words", Neurocomputing, vol. 139, Sep. 2014, pp. 84-96.

Marketing Land, "Amazon Echo: Play Music", Online Available at: <https://www.youtube.com/watch?v=A7V5NPbsXi4>, Apr. 27, 2015, 3 pages.

Mhatre et al., "Donna Interactive Chat-bot acting as a Personal Assistant", International Journal of Computer Applications (0975-8887), vol. 140, No. 10, Apr. 2016, 6 pages.

Microsoft, "Turn on and Use Magnifier", available at <http://www.microsoft.com/windowsxp/using/accessibility/magnifierturnon.mspx>, retrieved on Jun. 6, 2009.

Mikolov et al., "Linguistic Regularities in Continuous Space Word Representations", Proceedings of NAACL-HLT, Jun. 9-14, 2013, pp. 746-751.

Nakamura, Satoshi, "Overcoming the Language Barrier with Speech Translation Technology, Science & Technology Trends", Quarterly Review No. 31, Apr. 2009, pp. 36-49.

Nakazawa et al., "Detection and Labeling of Significant Scenes from TV program based on Twitter Analysis", Proceedings of the 3rd Forum on Data Engineering and Information Management (DEIM 2011 proceedings), IEICE Data Engineering Technical Group. Available online at: http://db-event.jpn.org/deim2011/proceedings/pdf/f5-6.pdf, Feb. 28, 2011, 10 pages (Official Copy Only) (See Communication under 37 CFR § 1.98(a) (3)).

Okuno et al., "System for Japanese Input Method based on the Internet", Technical Report of Information Processing Society of Japan, Natural Language Processing, Japan, Information Processing Society of Japan, vol. 2009, No. 36, Mar. 18, 2009, 8 pages (Official Copy Only) (See Communication under 37 CFR § 1.98(a) (3)).

Pennington et al., "GloVe: Global Vectors for Word Representation", Proceedings of the Conference on Empirical Methods Natural Language Processing (EMNLP), Oct. 25-29, 2014, pp. 1532-1543.

Perlow, Jason, "Alexa Loop Mode With Playlist for Sleep Noise", Online Available at: <https://www.youtube.com/watch?v=nSkSuXziJSg>, Apr. 11, 2016, 3 pages.

Samsung Support, "Create a Quick Command in Bixby to Launch Custom Settings by at your Command", Retrieved from internet: https://www.facebook.com/samsungsupport/videos/10154746303151213, Nov. 13, 2017, 1 page.

Samsung, "SGH-a885 Series—Portable Quad-Band Mobile Phone-User Manual", Retrieved from the Internet: URL: "http://web.archive.org/web/20100106113758/http://www.comparecellular.com/images/phones/userguide1896.pdf", Jan. 1, 2009, 144 pages.

Seehafer, Brent, "Activate google assistant on Galaxy S7 with screen off", Available online at:—"https://productforums.google.com/forum/#!topic/websearch/lp3qlGBHLVI", Mar. 8, 2017, 4 pages.

Selfrifge et al., "Interact: Tightly-coupling Multimodal Dialog with an Interactive Virtual Assistant", International Conference on Multimodal Interaction, ACM, Nov. 9, 2015, pp. 381-382.

Sundermeyer et al., "From Feedforward to Recurrent LSTM Neural Networks for Language Modeling", IEEE Transactions to Audio, Speech, and Language Processing, 2015, vol. 23, Mar. 2015, pp. 517-529.

Sundermeyer et al., "LSTM Neural Networks for Language Modeling", Interspeech 2012, ISCA's 13 Annual Conference, Sep. 9-13, 2012, pp. 194-197.

Tanaka, Tatsuo, "Next Generation IT Channel Strategy Through "Experience Technology"", Intellectual Resource Creation, Japan, Nomura Research Institute Ltd. vol. 19, No. 1, Dec. 20, 2010, 17 pages. (Official Copy only) (See Communication under 37 CFR § 1.98(a) (3)).

X.AI, "How it Works", May 2016, 6 pages.

Xu, Yuhong, "Policy optimization of dialogue management in spoken dialogue system for out-of-domain utterances", 2016 International Conference on Asian Language Processing (IALP), IEEE, Nov. 21, 2016, pp. 10-13.

Yates, Michael C., "How can I exit Google Assistant after i'm finished with it", Available online at:—"https://productforums.google.com/forum/#!msg/phone-by-google/faECnR2RJwA/gKNtOkQgAQAJ", Jan. 11, 2016, 2 pages.

\* cited by examiner

VIRTUAL ASSISTANT AIDED COMMUNICATION WITH 3$^{rd}$ PARTY SERVICE IN A COMMUNICATION SESSION

CROSS REFERENCE TO RELATED APPLICATIONS

This application is a Continuation Application of U.S. patent application Ser. No. 15/403,906, entitled "VIRTUAL ASSISTANT AIDED COMMUNICATION WITH 3RD PARTY SERVICE IN A COMMUNICATION SESSION," filed on Jan. 11, 2017, now U.S. Pat. No. 10,356,243, which is a Continuation Application of U.S. patent application Ser. No. 14/732,625, filed on Jun. 5, 2015, now U.S. Pat. No. 9,578,173, entitled "VIRTUAL ASSISTANT AIDED COMMUNICATION WITH 3RD PARTY SERVICE IN A COMMUNICATION SESSION," both of which are hereby incorporated by reference in their entirety for all purposes.

TECHNICAL FIELD

The present technology pertains to communication sessions between a user and a third party service, and more specifically pertains to utilizing a virtual assistant to assist the user with a communication session between the user and the third party service.

BACKGROUND

Current computing devices can include functionality that enables users to communicate with each other by transmitting and receiving messages. For example, many computing devices include text and/or instant messaging functionality that enable users of the computing devices to transmit text, images, sounds, etc., to the client devices of one or more other users. Users can use this functionality to have conversations, make plans and/or perform any other number of tasks.

In addition to communicating with friends, family, etc., users can also utilize communication sessions to communicate with 3$^{rd}$ party services, such as airlines, banks, customer service departments, etc. For example, some 3$^{rd}$ party services provide users with an application and/or website that includes functionality to communicate with a representative of the 3rp party service. While this allows users to communicate with a representative, it also requires the user to access the 3$^{rd}$ part website and/or download the 3rd party service's application. Further, many 3$^{rd}$ party services require a user to navigate a series of selections and/or provide a set of information prior to connecting the user to a representative. Accordingly, improvements are needed.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for utilizing a virtual assistant to assist a user with a communication session between the user and a third party service. A communication session can be a conversation between one or more participants using a communication application such as a text and/or instant messaging application. For example, a communication application can be an application such as iMessage® available by Apple Inc., of Cupertino, Calif.

A virtual assistant can be an application, module, software, etc., capable of analyzing messages included in the communication session to identify tasks and provide assistance with completing the identified tasks. For example, a virtual assistant can be an application such as Siri® available by Apple Inc., of Cupertino, Calif., that uses semantic analysis to analyze text, recognize terms and interpret the intended meaning.

A task can be any type of action that a virtual assistant can provide assistance with. For example, a task can include facilitating communication between the user and a 3$^{rd}$ party service, performing specified actions with the 3$^{rd}$ party service, gathering and providing information to the 3rd party service, receiving information from the 3$^{rd}$ party service, etc. A 3$^{rd}$ party service can be any type of service, business, etc. For example, a 3$^{rd}$ party service can be an airline, bank, insurance company, store, etc.

In some embodiments, a user can communicate with the virtual assistant as part of the communication session. For example, a user can use the communication application to enter a message directed to the virtual assistant. The virtual assistant can analyze the entered message and determine that the message was directed to the virtual assistant and, in response, assist the user. For example, the virtual assistant can identify a task from the message and assist the user with completing the task.

In some embodiments, the virtual assistant can assist the user to communicate with a 3$^{rd}$ party service. For example, a user can use the communication application to enter a message directed to the virtual assistant that requests that the virtual assistant connect the user with a 3$^{rd}$ party service. In response, the virtual assistant can access a set of communication instructions associated with the 3$^{rd}$ party service. The set of communication instructions can include a set of commands for communicating with the 3$^{rd}$ party service, services provided by the 3$^{rd}$ party service as well as data needed by the 3$^{rd}$ party service to facilitate communication with the 3$^{rd}$ party service. The virtual assistant can use the communication instructions to gather data needed by the 3$^{rd}$ party service, communicate with the 3$^{rd}$ party service and present the user with data received from the 3$^{rd}$ party service.

Communication with the 3$^{rd}$ party service can be presented to the user as part of the communication session. For example, the virtual assistant can present messages prompting the user to provide data and make selections, as well as present the user with any data received from the 3$^{rd}$ party service. Further, the virtual assistant can connect the user to a representative of the 3$^{rd}$ party service as part of the communication session. The user can then user the communication session to communicate with the representative.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Figure 1:
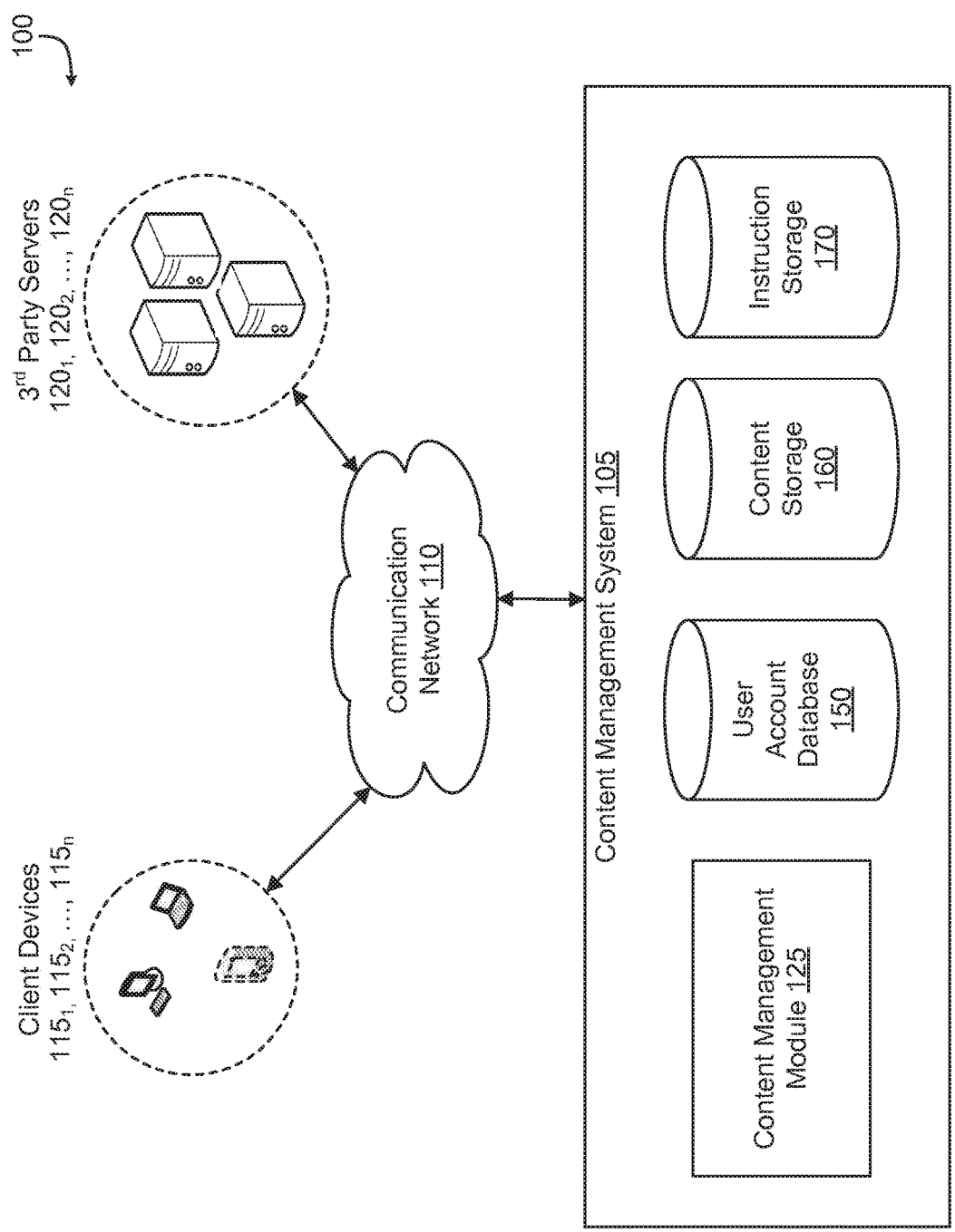
FIG. 1 shows an exemplary configuration of devices and a network in accordance with the invention.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for utilizing a virtual assistant to assist a user with a communication session between the user and a third party service. A communication session can be a conversation between one or more participants using a communication application such as a text and/or instant messaging application. For example, a communication application can be an application such as iMessage® available by Apple Inc., of Cupertino, Calif.

A virtual assistant can be an application, module, software, etc., capable of analyzing messages included in the communication session to identify tasks and provide assistance with completing the identified tasks. For example, a virtual assistant can be an application such as Siri® available by Apple Inc., of Cupertino, Calif., that uses semantic analysis to analyze text, recognize terms and interpret the intended meaning.

A task can be any type of action that a virtual assistant can provide assistance with. For example, a task can include facilitating communication between the user and a $3^{rd}$ party service, performing specified actions with the $3^{rd}$ party service, gathering and providing information to the $3^{rd}$ party service, receiving information from the $3^{rd}$ party service, etc. A $3^{rd}$ party service can be any type of service, business, etc. For example, a $3^{rd}$ party service can be an airline, bank, insurance company, store, etc.

In some embodiments, a user can communicate with the virtual assistant as part of the communication session. For example, a user can use the communication application to enter a message directed to the virtual assistant. The virtual assistant can analyze the entered message and determine that the message was directed to the virtual assistant and, in response, assist the user. For example, the virtual assistant can identify a task from the message and assist the user with completing the task.

In some embodiments, the virtual assistant can assist the user to communicate with a $3^{rd}$ party service. For example, a user can use the communication application to enter a message directed to the virtual assistant that requests that the virtual assistant connect the user with a $3^{rd}$ party service. In response, the virtual assistant can access a set of communication instructions associated with the $3^{rd}$ party service. The set of communication instructions can include a set of commands for communicating with the $3^{rd}$ party service, services provided by the $3^{rd}$ party service as well as data needed by the $3^{rd}$ party service to facilitate communication with the $3^{rd}$ party service. The virtual assistant can use the communication instructions to gather data needed by the $3^{rd}$ party service, communicate with the $3^{rd}$ party service and present the user with data received from the $3^{rd}$ party service.

Communication with the $3^{rd}$ party service can be presented to the user as part of the communication session. For example, the virtual assistant can present messages prompting the user to provide data and make selections, as well as present the user with any data received from the $3^{rd}$ party service. Further, the virtual assistant can connect the user to a representative of the $3^{rd}$ party service as part of the communication session. The user can then user the communication session to communicate with the representative.

FIG. 1 illustrates an exemplary system configuration 100, wherein electronic devices communicate via a network for purposes of exchanging content and other data. As illustrated, multiple computing devices can be connected to communication network 110 and be configured to communicate with each other through use of communication network 110. Communication network 110 can be any type of network, including a local area network ("LAN"), such as an intranet, a wide area network ("WAN"), such as the internet, or any combination thereof. Further, communication network 110 can be a public network, a private network, or a combination thereof. Communication network 110 can also be implemented using any number of communication links associated with one or more service providers, including one or more wired communication links, one or more wireless communication links, or any combination thereof. Additionally, communication network 110 can be configured to support the transmission of data formatted using any number of protocols.

Multiple computing devices can be connected to communication network 110. A computing device can be any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of computing device 500 of FIGS. 5A and 5B.

To facilitate communication with other computing devices, a computing device can also include a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

In system 100, a user can communication with other users through use of client devices $115_1$, $115_2$, . . . , $115_n$, (collectively "115") connected to communication network 110. Client devices 115 can be any type of computing device, such as a smart phone, tablet, personal computer, etc. Client devices 115 can include a communication application that enables a user of a client device $115_i$ to transmit and receive messages to and from other client devices 115. For example, a communication application can be a text and/or instant messaging application such as iMessage® available by Apple Inc., of Cupertino, Calif.

A user can also use client devices 115 to interact with $3^{rd}$ party servers $120_1$, $120_2$, ..., $120_n$, (collectively "120") connected to communication network 110. $3^{rd}$ party servers 120 can be one or more of any type of computing devices and be configured to maintain and provide data to requesting client devices 115. For example, a $3^{rd}$ party server $120_i$ can be affiliated with and managed by a $3^{rd}$ party service to store and provide data for the 3rd party service. For example, a $3^{rd}$ party server $120_i$ can store and provide web data that can be rendered by client devices 115 to present a webpage, website, etc., to a requesting user.

$3^{rd}$ party servers 120 can also provide one or more services that can be accessed by client devices 115 using specified commands, such as commands defined by an application program interface (API). A service can be any type of action or transaction, such as providing specified data, performing a financial transaction, completing a purchase, etc.

$3^{rd}$ party servers 120 can support connections from a variety of different types of client devices 115, such as desktop computers; mobile computers; mobile communications devices (e.g. mobile phones, smart phones, tablets, etc.); smart televisions; set-top boxes; and/or any other network enabled computing devices.

System 100 can also include content management system 105. Content management system 105 can include one or more computing devices configured to manage content items for multiple user accounts. A content item can include any type of digital asset such as an application, audio file, text file, video file, etc.

Content management system 105 can support connections from a variety of different types of client devices 115, such as desktop computers; mobile computers; mobile communications devices (e.g. mobile phones, smart phones, tablets, etc.); smart televisions; set-top boxes; and/or any other network enabled computing devices. Client devices 115 can be of varying type, capabilities, operating systems, etc. Furthermore, content management system 105 can concurrently accept connections from and interact with multiple client devices 115.

A user can interact with content management system 105 via a client-side application installed on client device $115_i$. In some embodiments, the client-side application can include a content management system specific component. For example, the component can be a stand-alone application, one or more application plug-ins, and/or a browser extension. However, the user can also interact with content management system 105 via a third-party application, such as a web browser, that resides on client device $115_i$ and is configured to communicate with content management system 105. In either case, the client-side application can present a user interface (UI) for the user to interact with content management system 105. For example, the user can interact with content management system 105 via a client-side application integrated with the file system or via a webpage displayed using a web browser application.

Content management system 105 can be configured to manage content items and data for multiple user accounts. For example, content management system 105 can allow users to purchase, store and access content items, calendar data, contact data, etc. Furthermore, content management system 105 can make it possible for a user to access the stored data, such as content items, calendar data, contact data, etc., from multiple client devices 115. Accessing a content item can include receiving metadata describing the content item, streaming the content item from content management system 105 and/or downloading the content item to one of client devices 115.

To facilitate the various content management services, a user can create a user account with content management system 105. The account information for each created user account can be maintained in user account database 150. User account database 150 can store profile information for each user account, including a unique account identifier identifying the user account, personal information, username, password, email address, home address, credit card information, banking information, calendar data, contact data, etc. User account database 150 can also include account management information, such as content storage locations, security settings, personal configuration settings, client devices authorized to access the user account, etc.

A user account can be used to purchase, manage and store content items, such as digital data, documents, text files, audio files, video files, etc. For example, content management system 105 can provide an online content retailer where users can purchase a variety of content items. Further, in some embodiments, a user can upload content items from one of client devices 115 to content management system 105. The purchased and uploaded content items can be assigned to the user's account and then accessed by the user from any of client devices 115. For example, a content item identifier identifying each content item assigned to a user account can be stored in user account database 150 and associated with the corresponding user account. The content item identifier can be used to identify the content item as well as the location of the content item.

The content items can be stored in content storage 160. Content storage 160 can be a storage device, multiple storage devices, or a server. Alternatively, content storage 160 can be a cloud storage provider or network storage accessible via one or more communications networks. Content management system 105 can hide the complexity and details regarding storage of the content items from client devices 115 such that the location of the content items stored by content management system 105 is not known by client devices 115. Content management system 105 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various user accounts. The metadata for a content item can be stored as part of the content item or can be stored separately. In one variation, each content item stored in content storage 160 can be assigned a system-wide unique identifier.

Content management system 105 can include content management module 125 configured to manage and access each user account and the content items assigned to the user accounts. For example, content management module 125 can be configured to communicate with user account database 150 and content storage 160 to adjust privileges with respect to content items and otherwise manage content items.

Upon a user logging into their user account from one of client devices 115, content management module 125 can access the account information associated with the user account to identify the content items assigned to the user account, as well as account configuration data dictating presentation of the content items. Content management module 125 can then present and/or provide the content items to the user according to the account configuration data. For example, content management module 125 can access a user account to identify the content item identifiers assigned to the user account. The content item identifier can then be used to identify and locate the content items assigned to the user account, which can be presented according to the account configuration data.

Presenting the content items can include transmitting metadata describing the content items to client device $115_i$ that was used to access the user account. Client device $115_i$ can then use the received metadata to present the content items that the user account can access. For example, client device $115_i$ can present information identifying the content items available to the user account in a content item library. This can include presenting the title of the content items, images such as an album or book cover, description of the content item, etc.

Content management system 105 can also maintain a set of communication instructions for one or more $3^{rd}$ party services. For example, content management system 105 can include instruction storage 170 that is configured to maintain multiple sets of communication instructions.

A set of communication instructions can include data that can be used to communicate with a $3^{rd}$ party service. For example, a set of communication instructions for a $3^{rd}$ party service can include a listing of services provided by the $3^{rd}$ party service. As an example, services provided by a $3^{rd}$ party service such as a bank can include providing an account balance, transferring money amongst accounts, depositing a check, speaking to a representative, etc. As another example, services provided by a $3^{rd}$ party service such as an airline can include purchasing an airline ticket, checking a flight arrival time, changing a schedule flight, canceling a flight, speaking to a representative, etc.

A set of communication instruction can also include a listing of data needed by the $3^{rd}$ party service to facilitate communication. For example, a $3^{rd}$ party service may require a user name, account number, etc. The listing of data can also include data needed by the $3^{rd}$ party based on service provided by the $3^{rd}$ party service. For example, to provide a service such as changing a flight, a $3^{rd}$ party service such as an airline may require an existing flight number, customer name, etc. As another example, to provide a service such as booking a flight, the airline may require data such as a departing city, destination city, desired departure and return date, etc.

A set of communication instructions can also include one or more commands for communicating with the $3^{rd}$ party service. The commands can be defined by an application program interface (API) and be used to perform the various services provided by the $3^{rd}$ party service. The commands can be labeled or identified based on the corresponding service.

Each set of communication instructions stored in instruction storage 170 can be tagged, labeled and/or otherwise identified based on the $3^{rd}$ party service associated with the set of communication instructions. For example, a set of communications instructions can be tagged with a unique $3^{rd}$ party identifier for the corresponding $3^{rd}$ party service.

Content management system 105 can provide one or more sets of communication instructions to any requesting client device 115. For example, content management system 105 can receive an instruction request from a client device $115_i$ and, in response, provide the client device $115_i$ with the set of communication instructions. An instruction request can include an identifier identifying a $3^{rd}$ party service. Content management system 105 can use the received identifier to identify the corresponding set of communication instructions from instruction storage 170.

Figure 2:
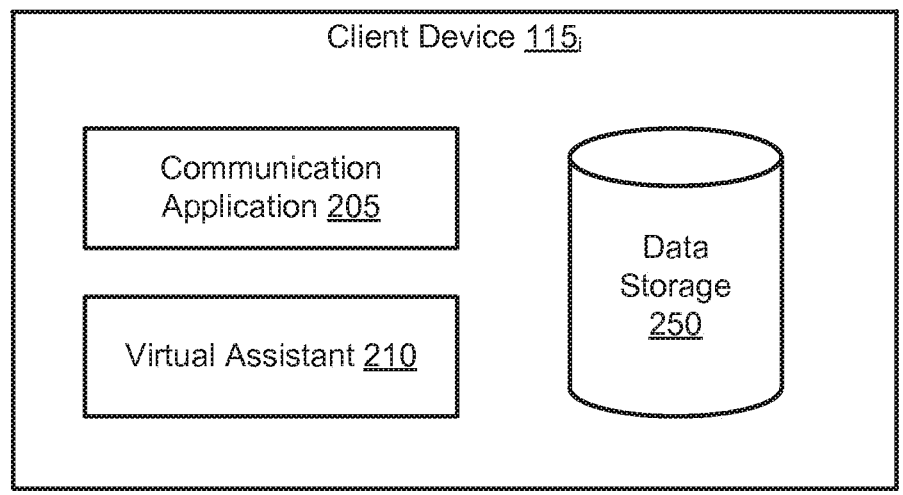
FIG. 2 shows an embodiment of a client device configured to enable a user to utilize a virtual assistant to perform tasks during a communication session.

FIG. 2 shows an embodiment of a client device 115i configured to enable a user to utilize a virtual assistant to communicate with a 3rd party service during a communication session. FIG. 2 is described in view of the system shown in FIG. 1. As shown, client device $115_i$ includes communication application 205. Communication application 205 can be any type of application configured to enable a user to send and receive data messages with one or more other client devices 115. A data message can be any type of data that can be transmitted from one computing device to another, such as text data, image data, sound data, etc. In some embodiments, communication application 205 can be a text and/or instant messaging application such as iMessage® available by Apple Inc., of Cupertino, Calif.

A user of client device $115_i$ can use communication application 205 to conduct communication sessions with one or more groups of users and/or entities. A communication session can be a group of messages transmitted between a group of users and/or entities. For example, a communication session can be an instant messaging conversation between a group of two or more users. Alternatively, a communication session can be an instant messaging conversation between one or more users and a third party service, such as with a representative of the $3^{rd}$ party service and/or an automated computer system maintained by the $3^{rd}$ party service. As another example, a communication session can be an instant messaging conversation between one or more users and a virtual assistant.

Communication application 205 can provide a user with a messaging interface that enables the user to conduct a communication session. For example, the messaging interface can enable a user to create a new communication session by selecting one or more participant users and entering a message to be transmitted to the participant users. Further, the messaging interface can enable a user to view existing communication session and enter and transmit new messages as part of the existing communication sessions.

Client device $115_i$ can also include virtual assistant 210 configured to assist the user with tasks during a communication session. Virtual assistant 210 can be an application, module, software, etc., capable of analyzing messages included in a communication session to identify tasks and provide the user with assistance completing the identified tasks. For example, virtual assistant 210 can be an application such as Siri® available by Apple Inc., of Cupertino, Calif., that uses semantic analysis to analyze text, recognize terms and interpret the intended meaning.

A task can be any type of function, actions, etc., with which virtual assistant 210 can assist a user. For example, a task can be retrieving information, such as retrieving the current time, retrieving directions to a specified destination, retrieving sports scores, retrieving weather information, retrieving movie times, etc. Further a task can be coordinating and executing a transaction and/or communication with a $3^{rd}$ party service, such as scheduling a meeting, performing a financial transaction, purchasing tickets, initiating communication with a representative, etc.

Client device $115_i$ can enable a user to select to utilize virtual assistant 210 in relation to one or more communication sessions. In some embodiments, communication application 205 can be configured to enable a user to select to utilize virtual assistant 210 by adding virtual assistant 210 as a participant of the communication session. For example, the user can add a nickname associated with virtual assistant 210 as a participant to a communication session. In response, communication application 205 can communicate with virtual assistant 210 to utilize virtual assistant 210 to assist with the communication session.

Further, in some embodiments, communication application 205 can transmit a notification message to the other participants of the communication session indicating that the user of client device $115_i$ has selected to utilize virtual assistant 210. For example, communication application 205 can transmit a message as part of the communication session indicating that the user of client device $115_i$ is utilizing virtual assistant 210. As another example, the nickname associated with virtual assistant 210 can be presented as a member of the communication session, thereby indicating that at least one participant of the communication session is utilizing the virtual assistant. In some embodiments, the other participants can be prompted regarding whether they would like to utilize the virtual assistant in regards to the communication session.

To assist a user with a communication session, virtual assistant 210 can analyze messages included in the communication session to identify tasks. For example, virtual assistant 210 can use semantic analysis to recognize terms, sets of terms, etc., and interpret the intended meaning of the terms to identify one or more tasks that the user may need assistance with.

Virtual assistant 210 can use any type or techniques of semantic analysis known in the art to identify tasks with which virtual assistant 210 can assist the user. For example, in some embodiments, the semantic analysis can include the use of natural language processing (e.g., speech tagging, noun-phrase chunking, dependency and constituent parsing, etc.) to translate text into parsed text. Virtual assistant 210 can then analyze the parsed text to identify tasks. For example, virtual assistant 210 can use question and intent analysis, to detect user commands and/or actions from the text (e.g., schedule a meeting, set my alarm, purchase tickets, connect me with a representative, etc.). Virtual assistant 210 can then analyze the resulting commands and/or actions to determine whether they are commands and/or actions with which virtual assistant can assist the user. For example, virtual assistant 210 can compare the tasks and/or actions to a list of known commands and/or actions with which virtual assistant 210 can assist the user. Any commands and/or actions identified by virtual assistant as being a command and/or action with which virtual assistant 210 can assist the user can be identified as a task by virtual assistant 210.

Further, virtual assistant 210 can identify a $3^{rd}$ party service with which the user would like to communicate and/or perform a task. For example, a message may identify a specific $3^{rd}$ party service, such as a specified airline, bank, etc., and virtual assistant 210 can identify the $3^{rd}$ party service from the message. Alternatively, a message may identify a type of service and virtual assistant can determine the appropriate $3^{rd}$ party service. For example, messages such as "book a flight," "check my account balance" and "make a reservation" can infer a type of service such as airline, bank and restaurant respectively.

Virtual assistant 210 can select a $3^{rd}$ party service based on the type of service determined from the message. For example, virtual assistant 210 can select a $3^{rd}$ party service of the specified type based on user history and/or user preferences. Alternatively, virtual assistant 210 can query the user regarding which $3^{rd}$ party service the user would like to use. For example, virtual assistant 210 can identify candidate $3^{rd}$ party services and prompt the user as part of the communication to select from one of the candidate $3^{rd}$ party services.

Virtual assistant 210 can analyze messages transmitted amongst the participant users of the communication session to identify tasks. This can include messages entered by a user of client device $115_i$ to be transmitted to the other participants as part of the communication session, as well as messages received from other users as part of the communication session.

Further, virtual assistant 210 can determine whether a message provided by the user of client device $115_i$ was intended for the other participants of the communication session or intended for the virtual assistant. A user can use communication application 205 to enter a message intended for virtual assistant 210, such as a request or command that the virtual assistant assist the user with a specified task. For example, a user can enter requests such as "help us schedule a meeting," "help me book a flight" "connect me to a representative," etc., and virtual assistant can determine that the message was intended for virtual assistant 210. In some embodiments, a user can address messages intended for the virtual assistant by using a nickname for the personal assistant. For example, the user can enter a messages such as "Assistant, connect me to a representative." Virtual assistant 210 can determine that the message was intended for the virtual assistant based on the use of the nickname addressing the virtual assistant 210.

In some embodiments, messages determined by virtual assistant 210 to be intended for virtual assistant 210 will not be transmitted to the other participant users of the communication session. Likewise, responses provided by virtual assistant 210 can be presented as part of the communication session on client device $115_i$, while not being presented to the other participant users of the communication session. In this way, a user of client device $115_i$ can have a separate conversation with virtual assistant 210 to perform a specified task.

To assist a user with a task, virtual assistant 210 can communicate with one or more computing devices to gather data and perform requested operations. For example, virtual assistant 210 can gather data maintained by client device $115_i$ in memory and/or from other applications on client device $115_i$, such as calendar data, contact data, financial information, flight information, bank account numbers, etc. Further, virtual assistant 210 can gather data from one or more components of client device $115_i$, such as geographic coordinate data from Global positioning system (GPS) component, temperature data, sound data, etc. Virtual assistant 210 can further edit, modify or delete data, such as creating new calendar entries, modifying contact information, etc.

Virtual assistant 210 can also gather data from one or more computing devices in network communication with client device $115_i$. For example, virtual assistant 210 can communicate with one or more of $3^{rd}$ party servers 120 to request and receive data. For example, virtual assistant 210 can communicate with $3^{rd}$ party servers 120 to gather sports scores, movie show times, driving directions, etc. Further, virtual assistant 210 can perform requested operations, such as purchase movie tickets, login to a user account, provide payment information, etc.

Further, virtual assistant 210 can also gather data from client devices 115. For example, to assist a user in determining the estimated time of arrival of a participant of the communication session, virtual assistant 210 can communicate with a client device 115$_j$ of the participant user to gather geographic location data of the user, which can then be used to calculate the estimated time of arrival. In some embodiments, virtual assistant 210 can be required to receive approval from the participant of the communication session prior to receiving data from the participants client device 115$_j$. For example, virtual assistant 210 can transmit a message as part of the communication session to the client device 115$_j$ requesting the specified data and the receiving participant can select to either approve or deny the request.

In some embodiments, virtual assistant 210 can gather data from content management system 105. For example, virtual assistant 210 can gather data from user accounts maintained by content managements system 105. This can include demographic data for one or more participants of the communication session, contact information, content items assigned to each user, such as applications utilized by each user, etc. In some embodiments, virtual assistant 210 can be required to receive approval from the participant of the communication session prior to being able to access data from the participant's user account. For example, virtual assistant 210 can transmit a message as part of the communication session to the client device 115$_j$ requesting approval to access the participant's user account and the receiving participant can select to either approve or deny the request. As another example, virtual assistant 210 can present a user with a message as part of the communication session requesting that the user provide the user credentials associated with the user account (e.g., user name and password).

Alternatively, a participant can authorize virtual assistant 210 to access their user account by selecting to utilize the virtual assistant with respect to the communication session. Thus, virtual assistant 210 can be automatically authorized to access the user account of each participant of the communication session that has selected to utilize the virtual assistant 210. Virtual assistant 210 can transmit messages requesting approval to access the user account of any participant that has not selected to utilize the personal assistant 210.

In some embodiments, virtual assistant 210 can gather data directly from the participants of a communication session. For example, virtual assistant 210 can present a poll as part of the communication session to gather feedback from the users. This can include presenting the users with multiple options, such as potential restaurants, meeting times, available services, etc. The poll can enable each participant to enter their selection and virtual assistant 210 can select a time, restaurant, service, etc., based on the provided selections.

In some embodiments, the options presented to the users as part of a poll can be based on data gathered by virtual assistant 210 from the users. For example, to help with the task of selecting a restaurant, the virtual assistant can gather location information from each participant and select restaurants that are nearby or equidistance from the participants. The selected restaurants can then be presented to the users in a poll.

As another example, to assist users schedule a meeting, virtual assistant 210 can gather calendar information from each user to identify a set of candidate times that works best for the participants. Virtual assistant 210 can then present the candidate times to the users as part of the communication session and allow the users to provide feedback.

As another example, to assist a user to perform a financial transaction with one or more other users, virtual assistant 210 can gather data indicating payment methods available to each user and select a set of candidate payment methods that are available to each user. For example, a payment method can be an application that enables a user to transfer money from one party to another. Virtual assistant 210 can determine which payment methods are installed on each user's client device 115 and then present a set of candidate payments methods from which the user can select.

In some embodiments, virtual assistant 210 can gather communication instructions for a specified 3$^{rd}$ party service and use the communication instructions to facilitate communication with the respective 3$^{rd}$ party service. For example, upon determining that a user has requested that virtual assistant 210 assist the user to communicate with a 3$^{rd}$ party service, virtual assistant 210 can transmit an instruction request to content management system 120 that request the set of communication instructions for the 3$^{rd}$ party service. The instruction request can identify the specified 3$^{rd}$ party service, for example, by including the name of the 3$^{rd}$ party service, an identifier identifying the 3$^{rd}$ party service, etc.

In some embodiments, client device 115$_i$ can maintain the set of communication instructions locally, for example, in data storage 250. Virtual assistant 210 can gather the appropriate set of communication instruction from data storage 250.

Virtual assistant 210 can use the communication instructions to identify services that are offered by the 3$^{rd}$ party service and with which virtual assistant 210 can assist the user. For example, virtual assistant 210 can present the user with a poll within a communication session that lists the services and prompts the user to select a service with which the user would like help.

Virtual assistant 210 can use the set of communication instructions to identify data required by the 3$^{rd}$ party service to facilitate communication between the user and the 3$^{rd}$ party service to perform a specified service. For example, a 3$^{rd}$ party service may require a user's name, flight number and departure date to perform a service such as change a user's flight. As another example, a 3rp party service may require a user's account number and password to perform a service such as providing the user with an account balance. Virtual assistant 210 can gather the required data and provide it to the 3$^{rd}$ party service.

Virtual assistant 210 can utilize the commands included in the set of communication instructions to communicate with a 3$^{rd}$ party service 120$_i$ to transmit data, receive data, present interface elements, etc. This can enable the user to communicate and interact with the 3$^{rd}$ party service completely through use of communication application 205. For example, to perform a service such as booking a flight, virtual assistant 210 can enable a user to select a departure and destination city, provide dates, select flights, present flights to the user, etc.

Virtual assistant 210 can also connect a user to a representative of a 3$^{rd}$ party service so that a user can communicate directly with the representative as part of the communication session. In some embodiments, virtual assistant 210 can determine an expected wait time to be connected to a representative and notify the user of the expected wait. A communication session with a representative can remain active (e.g., messages entered will be received by the other party) until terminated by either the user or the representative or, alternatively, after a specified period of time with no activity. The communication session record will remain available to the user and the user may request that virtual assistant again reconnect the user to the representative. This further allows each party to have a record of all previous communication between the parties available within the communication session.

Figure 3:
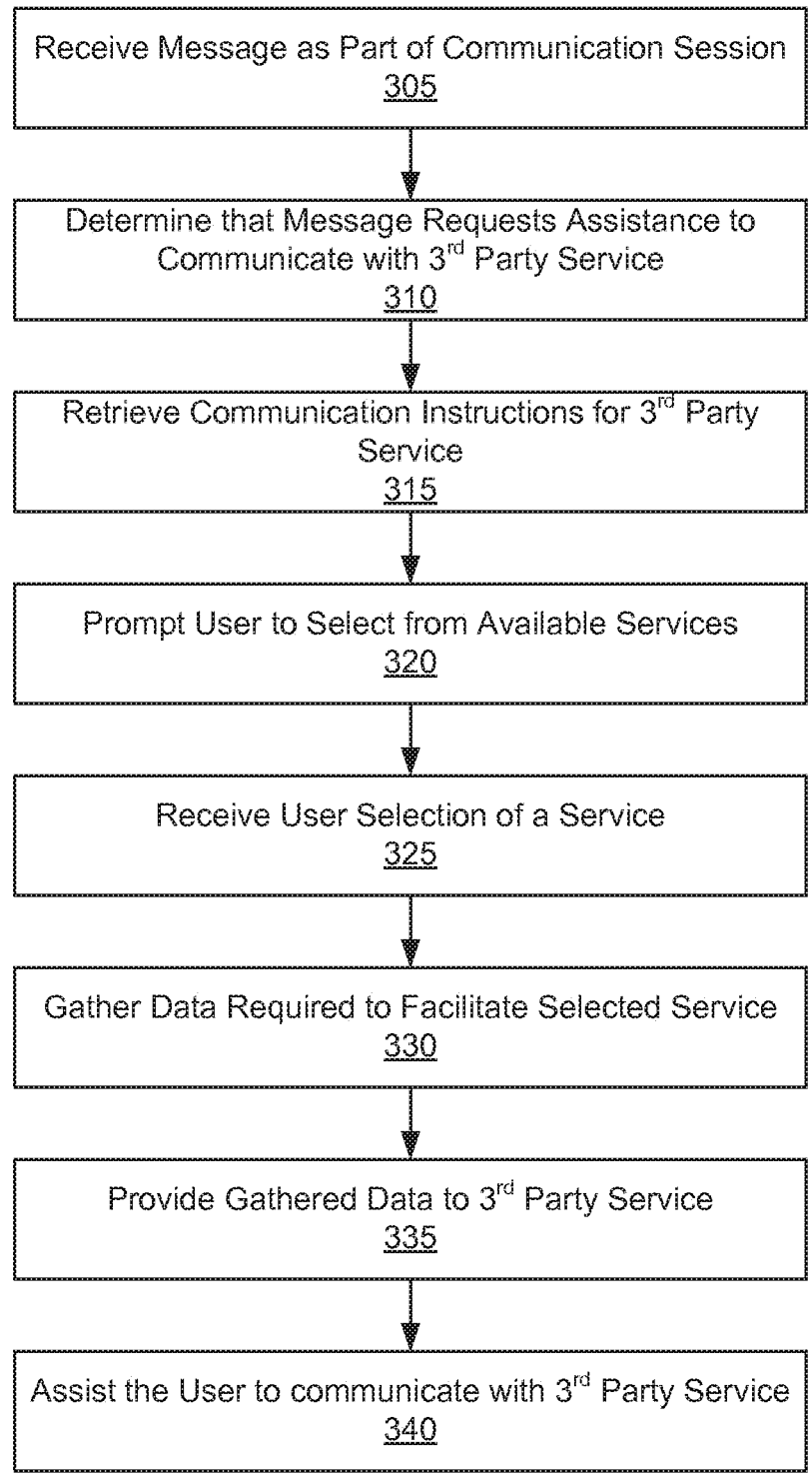
FIG. 3 shows a method of a client device utilizing a virtual assistant to assist a user communicate with a $3^{rd}$ party service.

FIG. 3 shows a method of a client device $115_i$ utilizing a virtual assistant 120 to assist a user communicate with a $3^{rd}$ party service. The method shown in FIG. 3 is described in view of the systems shown in FIG. 1 and FIG. 2. Although specific steps are shown in FIG. 3, in other embodiments the method may have more or less steps. Further, the order in which the steps are performed is just one possible embodiment and is not meant to be limiting. The method may be performed in a variety of differing orders, including one or more steps being performed simultaneously, and/or including more or less steps than those shown in FIG. 3.

At block 305, a client device $115_i$ can receive a message as part of a communication session. For example, a user of the client device $115_i$ may have entered the message using communication application 205.

At block 310, the virtual assistant 210 can determine that the message requests that the virtual assistant 210 assist the user to communicate with a $3^{rd}$ party service. For example, virtual assistant 210 can use semantic analysis to analyze the text of the message, recognize terms and interpret the intended meaning. The message may identify a specified $3^{rd}$ party service and the virtual assistant 210 can determine that the user would like to communicate with the specified $3^{rd}$ party service. Alternatively, the message may identify a $3^{rd}$ party service type and the virtual assistant 210 can either select a $3^{rd}$ party service of the specified type or query the user regarding which $3^{rd}$ party service the user would like to communicate with.

In some embodiments, the user may use a name that is common to two or more $3^{rd}$ party services. In this type of situation, the virtual assistant 210 can prompt the user to clarify the desired $3^{rd}$ party service. For example, the virtual assistant can present the user with a poll including the $3^{rd}$ party services associated with the name and ask the user to select the desired $3^{rd}$ party service.

At block 315, the virtual assistant 210 can retrieve communication instruction for the $3^{rd}$ party service. For example, the virtual assistant 210 can transmit an instruction request to a content management system 105 that maintains communication instructions for one or more $3^{rd}$ party services. Alternatively, the virtual assistant 210 can retrieve the communication instructions from a data storage 250 of the client device $115_i$.

At block 320, the virtual assistant 210 can prompt the user to select from one or more available services offered by the $3^{rd}$ party service. For example, a $3^{rd}$ party service such as a bank may offer multiple services such as transferring funds, retrieving an account balance, etc. As another example, a $3^{rd}$ party service such an airline may offer services such as booking a flight, changing a flight, checking an arrival time, etc.

The virtual assistant 210 can determine the available services from the set of communication instructions for the $3^{rd}$ party service. For example, the set of communication instructions may include a listing of services provided by the $3^{rd}$ party service and the virtual assistant may prompt the user to select from one or more of the available services. The virtual assistant 210 can prompt the user by presenting the user with a message as part of the communication session that prompts the user to enter the service. Alternatively, the virtual assistant 210 can present the user with one or more services to choose from, for example, in the form of a poll presented in the communication session, and the user can select from one of the presented options.

In some embodiments, the message provided by the user in block 305 may identify a specified service that the user would like help with. For example, a user may enter a message such as "please help me book a flight," in which case the virtual assistant does not need to prompt the user regarding which service the user would like help with.

At block 330, the virtual assistant 210 can gather data required to facilitate the selected service. A $3^{rd}$ party service may require specified data to provide or facilitate a selected service. For example, to provide a service such as accessing a bank account, a $3^{rd}$ party service may require a user's account number and user account credentials. As another example, to provide a service such as booking a flight, a $3^{rd}$ party service may require the user's name, address, desired destination and travel dates.

The virtual assistant 210 can determine the data required from the set of communication instructions for the $3^{rd}$ party service. The set of communication instructions can identify data required by the $3^{rd}$ party service based on a selected service and the virtual assistant 210 can identify the specified data based on the service selected by the user.

The virtual assistant 210 can automatically gather the required data. For example, the virtual assistant 210 can gather data from the user's account maintained by a content management system 105, from a data storage 250 on the client device $115_i$, etc.

In some embodiments, the virtual assistant 210 can prompt the user to provide their user credentials prior to accessing the user's account to gather data. For example, the virtual assistant 210 can request that the user enter a user name and password, provide fingerprint verification, etc.

In some embodiments, the virtual assistant 210 can query the user for specified data. For example, the virtual assistant 210 can present the user with messages as part of the communication session that prompt the user to provide the specified data. Alternatively, the virtual assistant 210 can present the user with one or more options to select from, for example, as a poll within the communication session. The user can select from the provided options to provide the virtual assistant 210 with the specified data.

At block 335, the virtual assistant 210 can provide the gathered data to the $3^{rd}$ party service. For example, the virtual assistant 210 can use the appropriate command from the set of communication instructions to initiate contact with a $3^{rd}$ party server $120_i$ associated with the $3^{rd}$ party service and provide the gathered data to the $3^{rd}$ party service.

At block 340, the virtual assistant 210 can assist the user communicate with the $3^{rd}$ party service. This can include using the appropriate commands to communicate with the $3^{rd}$ party server $120_i$ to assist the user perform the requested service. For example, the virtual assistant 210 can transmit data to the $3^{rd}$ party server $120_i$, receive data from the $3^{rd}$ party server $120_i$, present data to the user as part of the communication session, gather data needed by the $3^{rd}$ party service, connect the user to a representative of the $3^{rd}$ party service, etc.

Further, in some embodiments, the virtual assistant 210 can add other users to the communication session and facilitate communication between each user and the $3^{rd}$ party service. For example, a user may wish to change their flight to correspond to a friend flight. The virtual assistant 210 can add the friend to the communication session so that the user and the friend can both communicate with a representative and each other to schedule the appropriate flight.

Figure 4A:
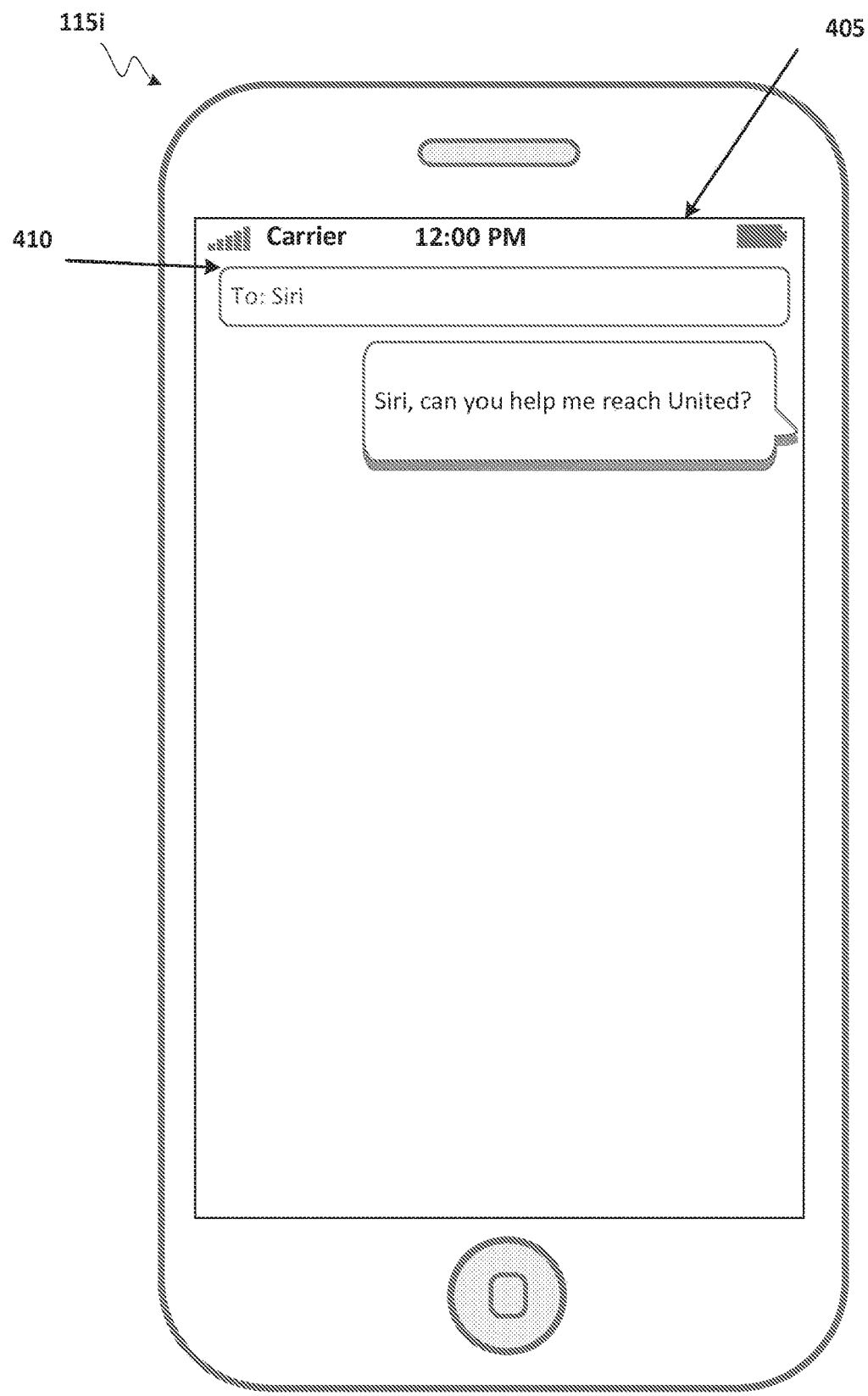
FIGS. 4A-4J show an example of a virtual assistant assisting a participant of a communication session to communicate with a $3^{rd}$ party service.

FIGS. 4A-4J show an example of a virtual assistant assisting a participant of a communication session to communicate with a $3^{rd}$ party service. FIGS. 4A-4J will be discussed in view of the systems shown in FIG. 1 and FIG. 2. FIG. 4A shows a client device $115_i$ used to conduct a communication session 405. The communication session 405 can be facilitated by communication application 205.

The communication session 405 can include a recipient list 410 identifying the other participants of the communication session 405. As shown, the only other participant of the communication session 405 is virtual assistant 210. Accordingly, messages provided by the user of the client device $115_i$ as part of the communication session 405 will only be presented on the client device $115_i$ and will not be transmitted to another client device 115. As shown, the user has entered a message directed to the virtual assistant 210 and requesting that the virtual assistant 210 assist the user communicate with an airline.

The virtual assistant 210 can analyze the message to identify the specified $3^{rd}$ party service. Virtual assistant 210 can then communicate with the content management system 105 to transmit an instruction request for the set of communication instructions associated with the $3^{rd}$ party service. The set of communication instructions can include a listing of services provided by the $3^{rd}$ party service, listing of data needed by the $3^{rd}$ party service to facilitate communication and commands for communicating with the $3^{rd}$ party service.

Figure 4B:
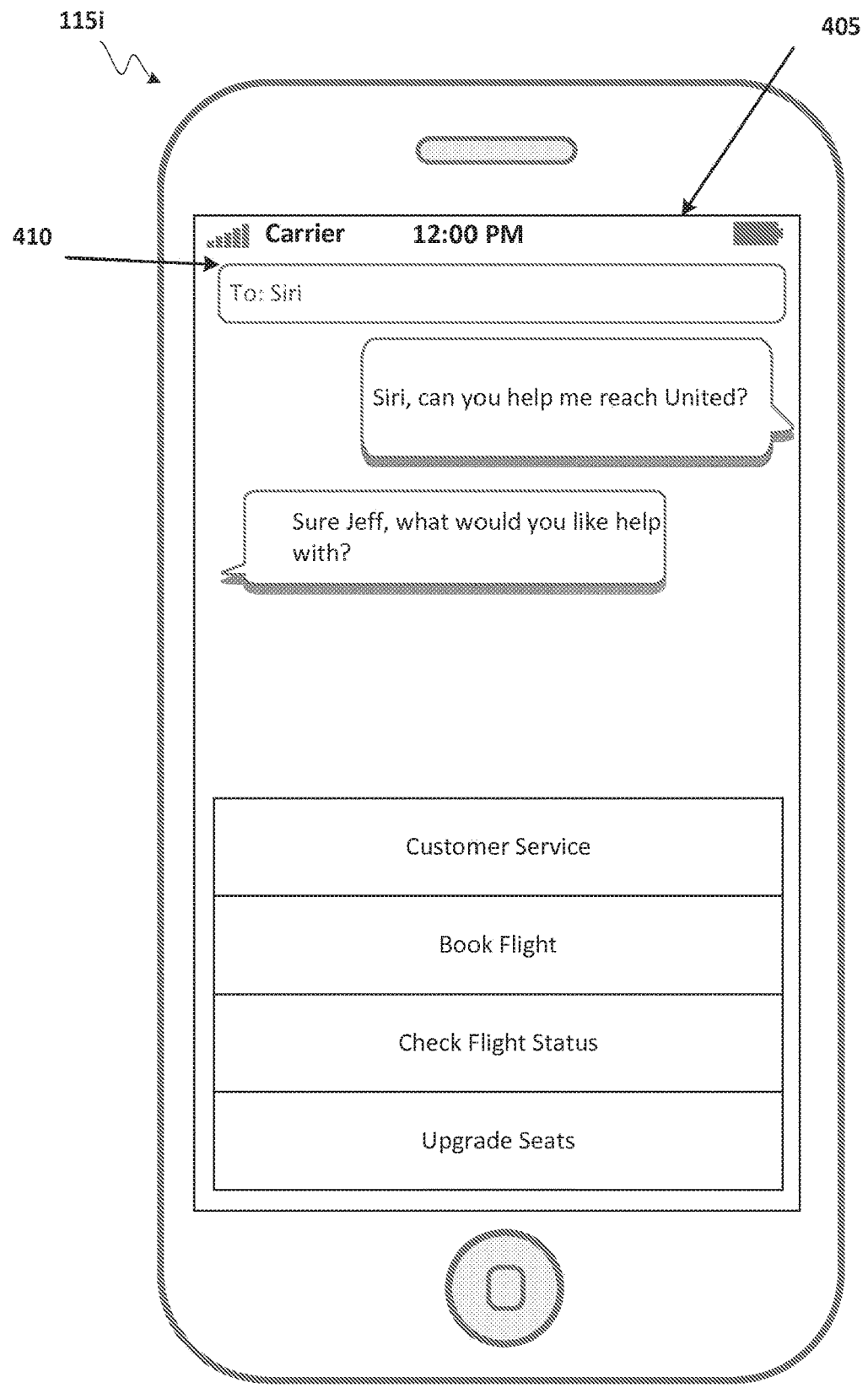

FIG. 4B shows the next step in communication session 405. As shown, virtual assistant 210 has presented the user with a reply message as part of communication session 405 and presented the user with a poll regarding what specified service the user would like help with. Virtual assistant 210 can gather the listing of for the $3^{rd}$ part service from the set of communication instructions. The user can then select the specified service with which the user would like help.

Figure 4C:
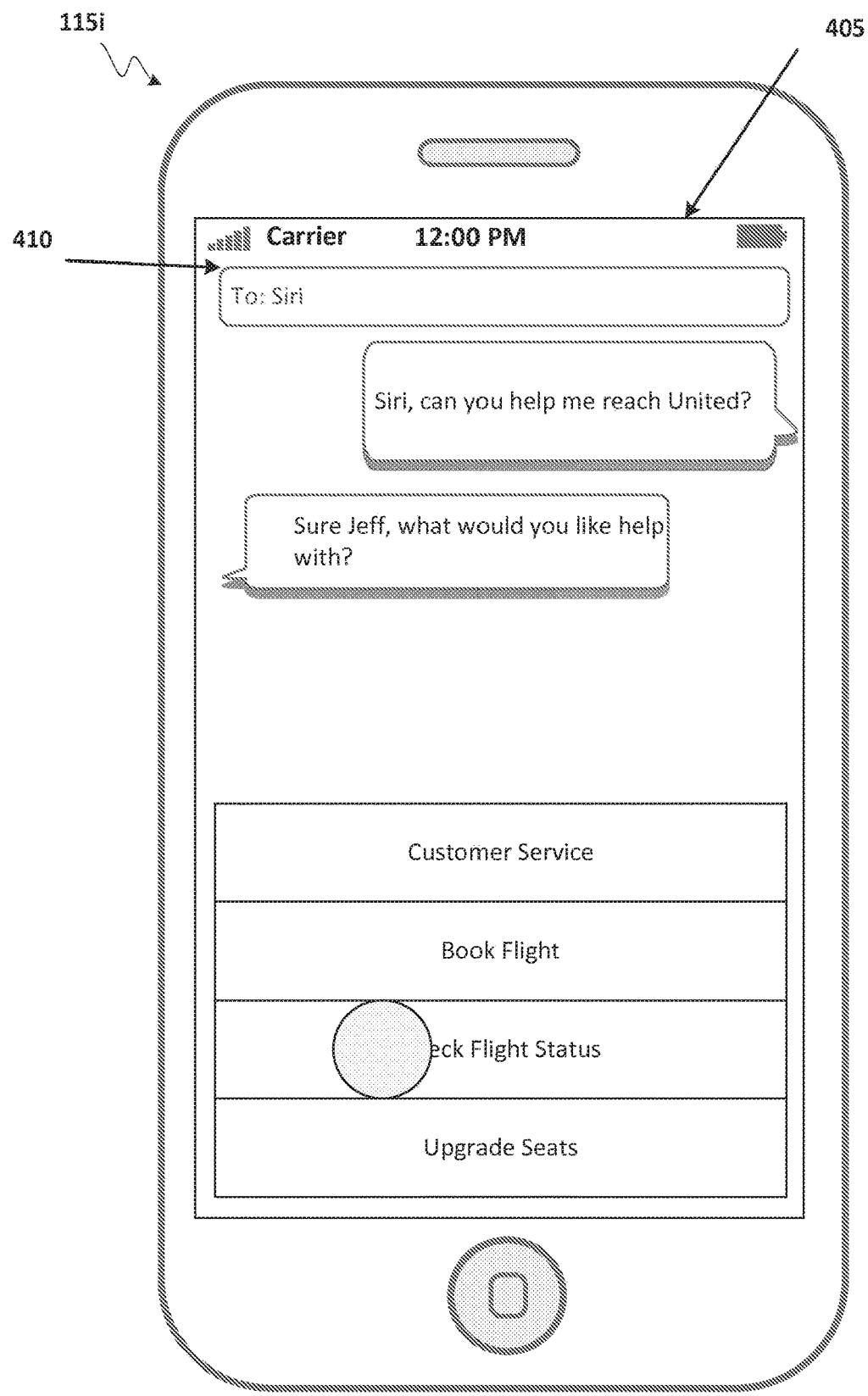

FIG. 4C shows that the user has selected to upgrade seats. Based on the user selection and the set of communication instructions, virtual assistant 210 can determine data required by the $3^{rd}$ party to perform the specified service. For example, the $3^{rd}$ party service may require the user's name, flight number, confirmation number, etc. to assist with upgrading the user's seats. Virtual assistant 210 can gather this data and provide it to the $3^{rd}$ party service. For example, virtual assistant 210 can gather data from data storage 250 and/or from the user's profile on content management system 105.

Figure 4D:
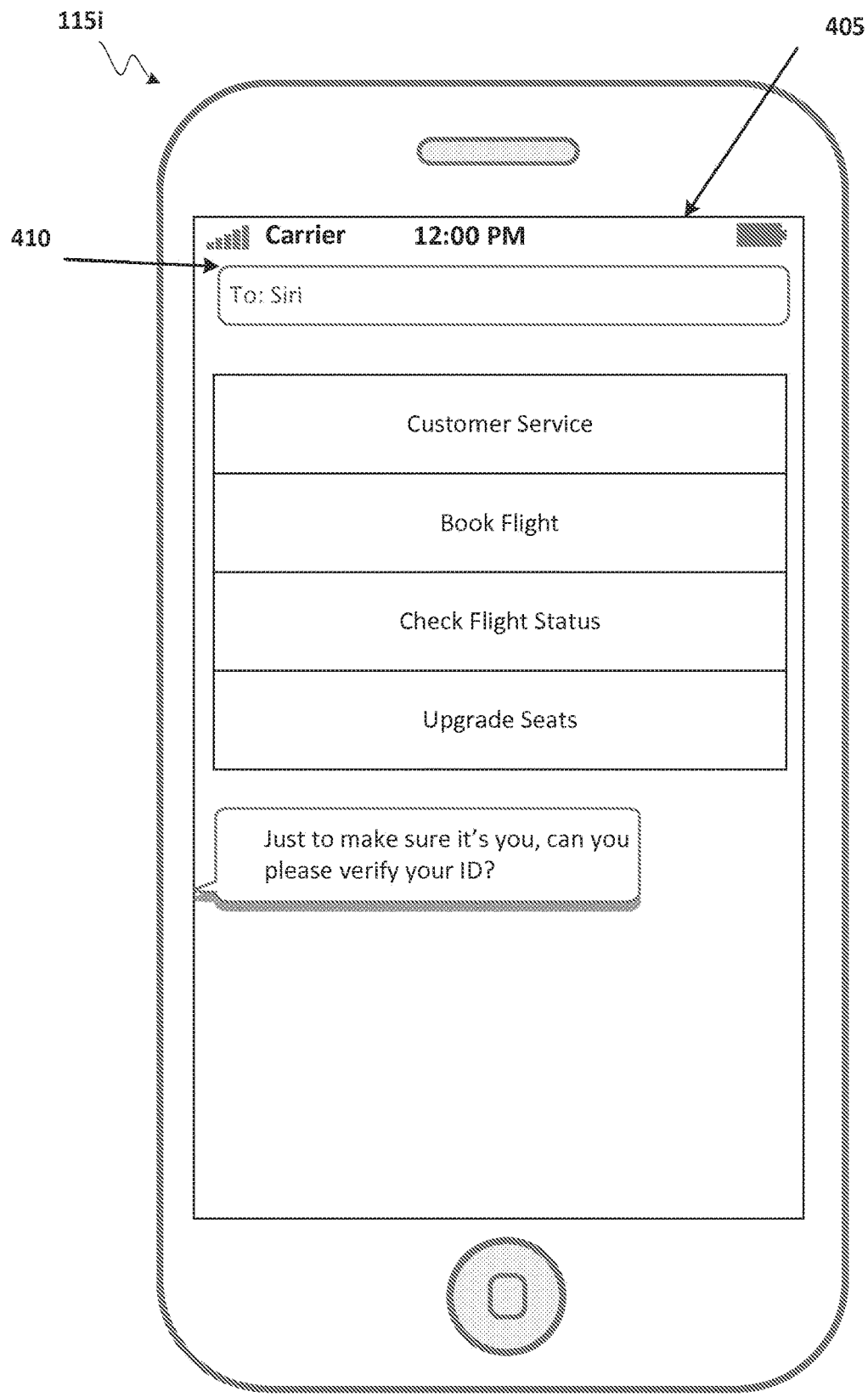

FIG. 4D shows that the virtual assistant 210 has entered a message into the communication session 405 that requests the user to provide user credentials for the user's account. This verification can be required prior to virtual assistant 210 being granted to access the user's data and provide it to a $3^{rd}$ party service.

Figure 4E:
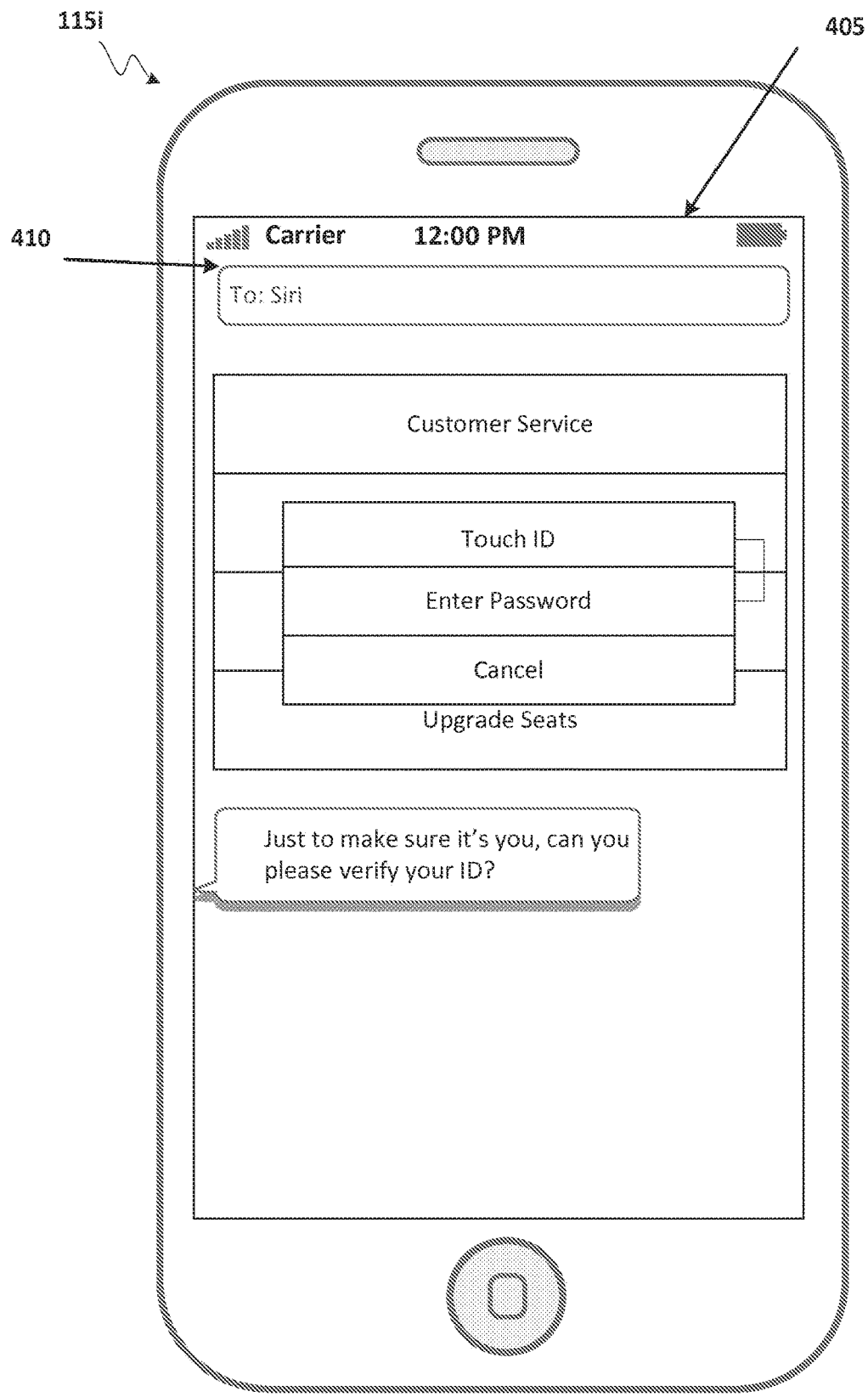

FIG. 4E shows the user being prompted to enter their user credentials. As shown, the user can select to either enter a password or provide their fingerprint.

Figure 4F:
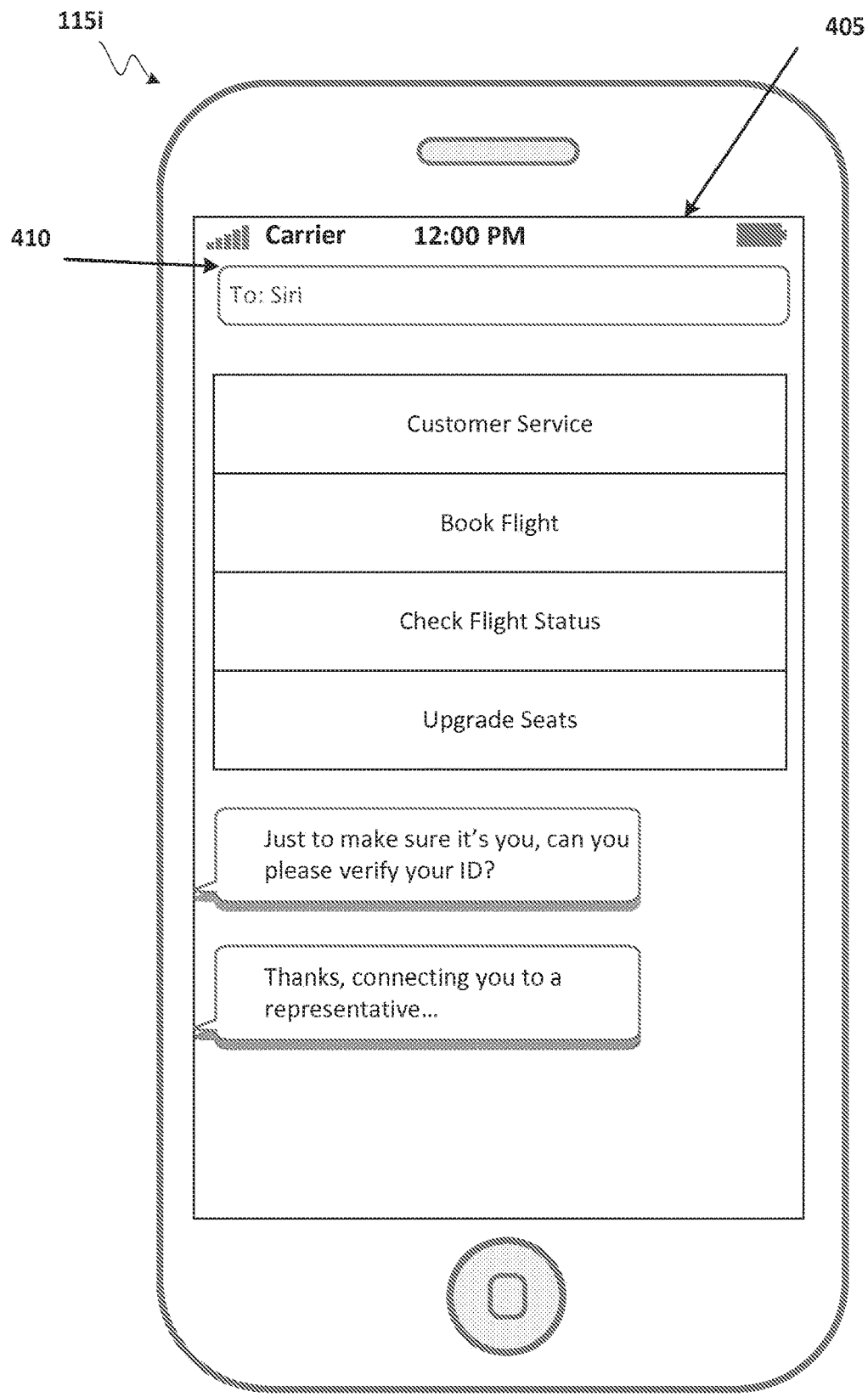

FIG. 4F shows that the virtual assistant 210 has presented the user with a message as part of the communication session 405 indicating that the virtual assistant 210 is initiating communication with the $3^{rd}$ party service. This can include the virtual assistant 210 using a command from the set of communication instructions to communicate with an appropriate $3^{rd}$ party server $120_i$ to initiate communication for the selected service, as well as provide any necessary data to facilitate the communication.

Figure 4G:
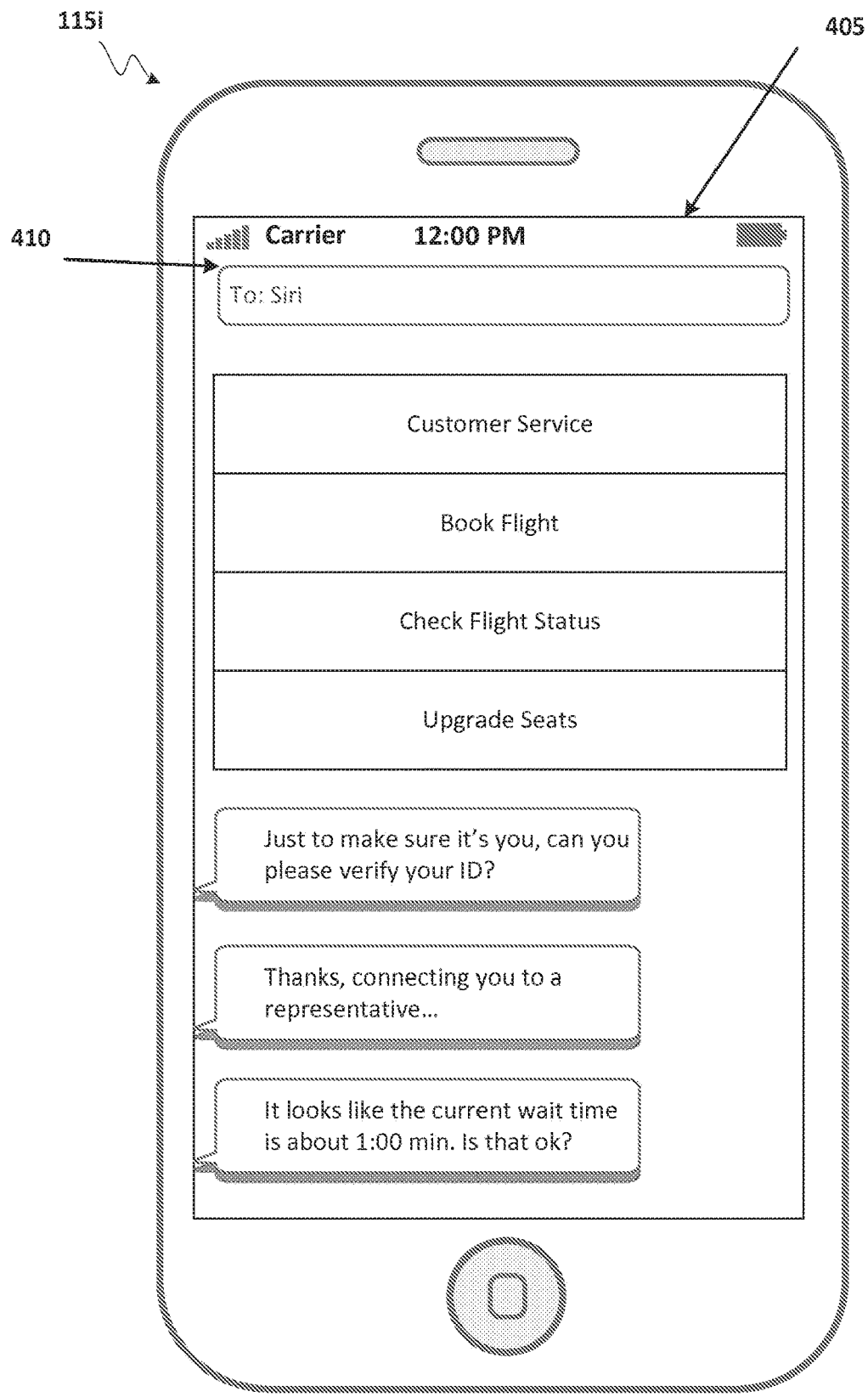

FIG. 4G shows that the virtual assistant 210 has presented the user with a message as part of the communication session 405 that notifies the user of an estimated wait time to be connected to a representative. The $3^{rd}$ party server $120_i$ associated with the $3^{rd}$ party service can provide the virtual assistant 210 with the estimated wait time, which can then be presented to the user. Further, the virtual assistant 210 can prompt the user regarding whether the user would like to wait to speak with the representative.

In some embodiments, the virtual assistant 210 can notify a user that a representative is not currently available. For example, some $3^{rd}$ party services may only offer live representatives during specified hours. The virtual assistant 210 can notify the user that the representative is not available as well as when the user can connect to a live representative.

Figure 4H:
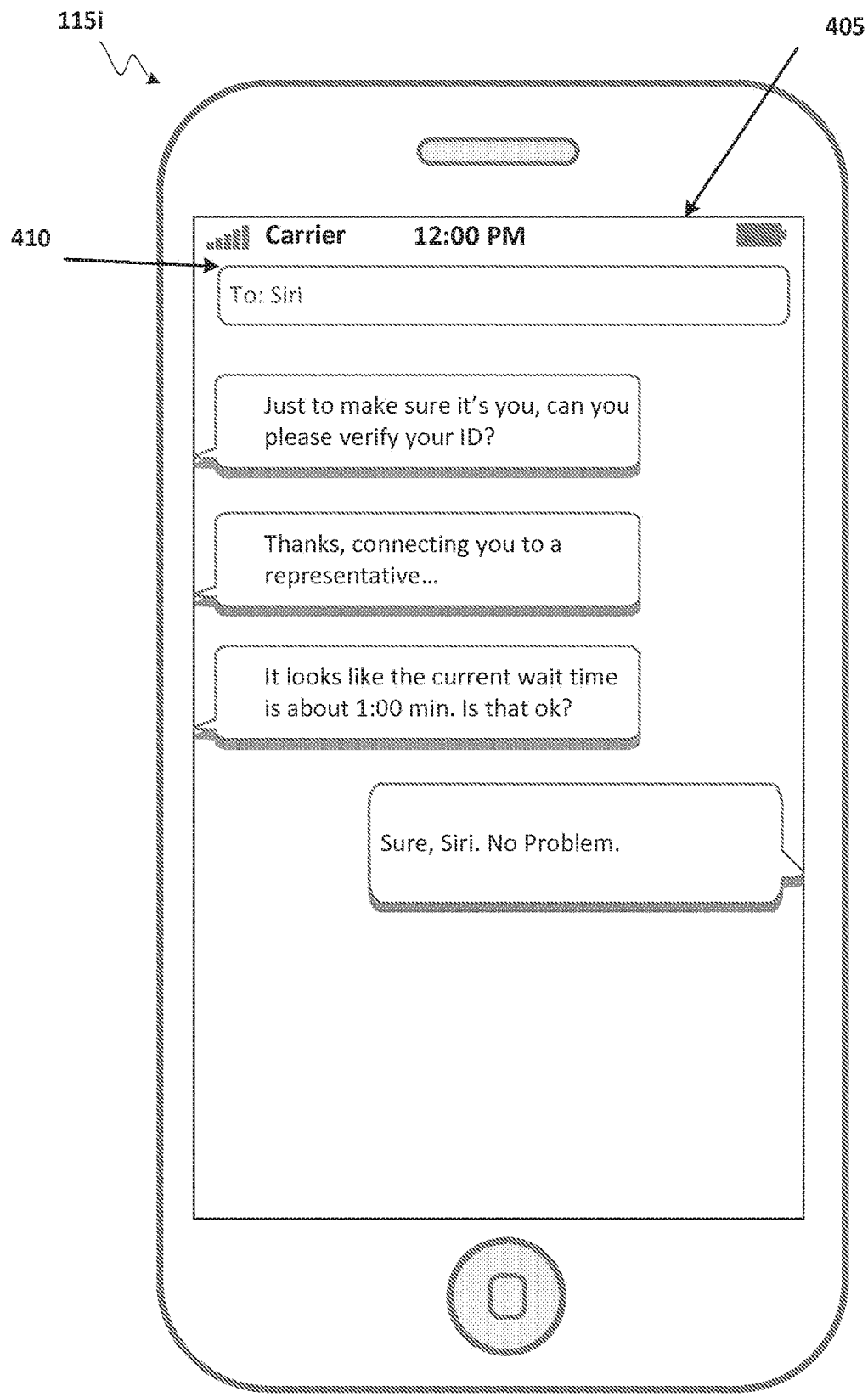

FIG. 4H shows that the user has entered a message into the communication session 405 indicating that the user is alright waiting for the estimated wait time to speak to the representative. Alternatively, if the user had indicated that the user would not like to wait, the virtual assistant 210 could terminate the attempted connection with the representative.

Figure 4I:
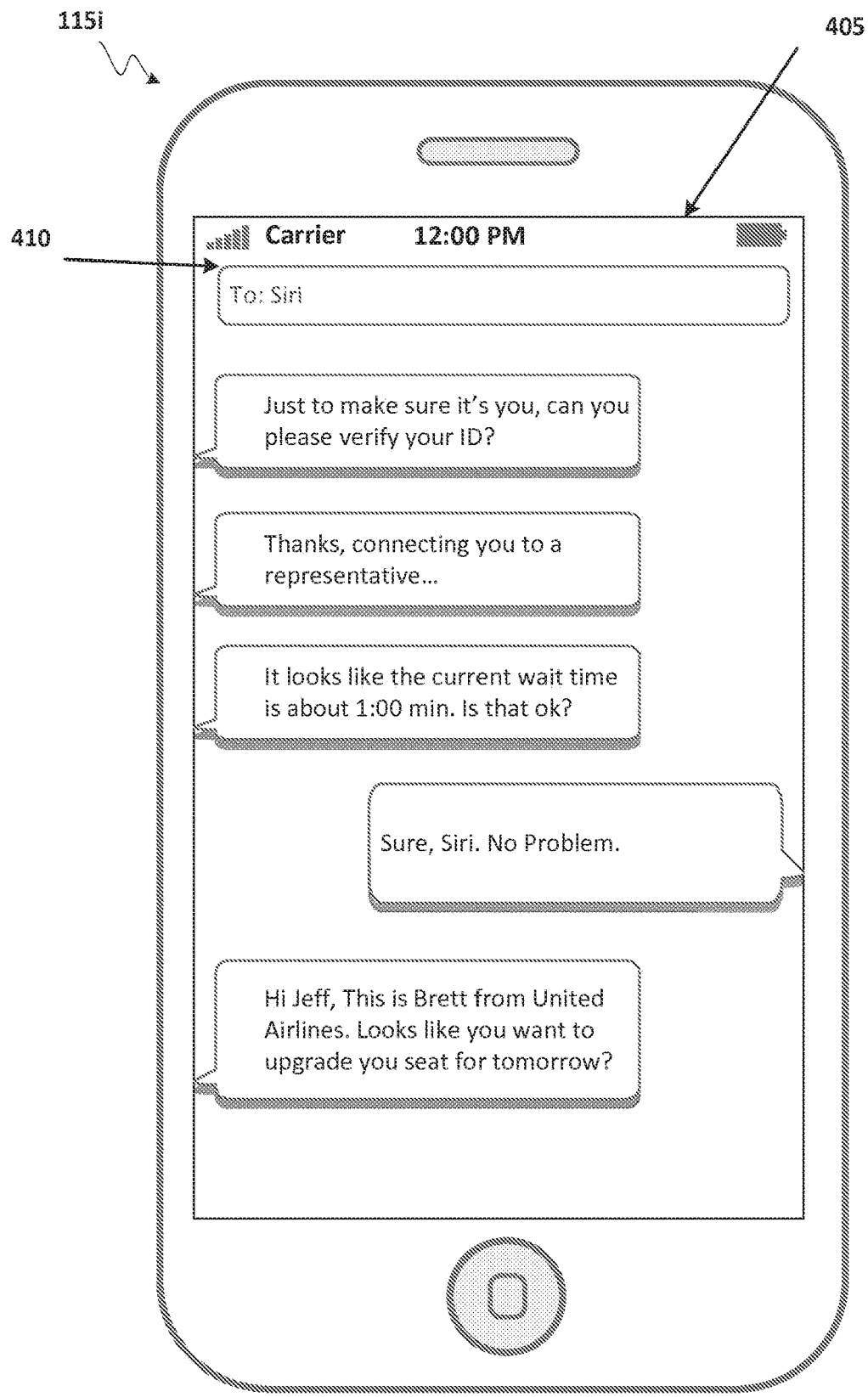

FIG. 4I shows that the user has been connected with a representative of the $3^{rd}$ party service and that the representative has presented the user with a message as part of the communication session 405 requesting specific information regarding the service specified by the user. The representative already has the users information, such as name, flight, requested service, etc., that was provided by the virtual assistant. As a result, the representative is ready to discuss the specifics of the service with the user when they are connected.

Figure 4J:
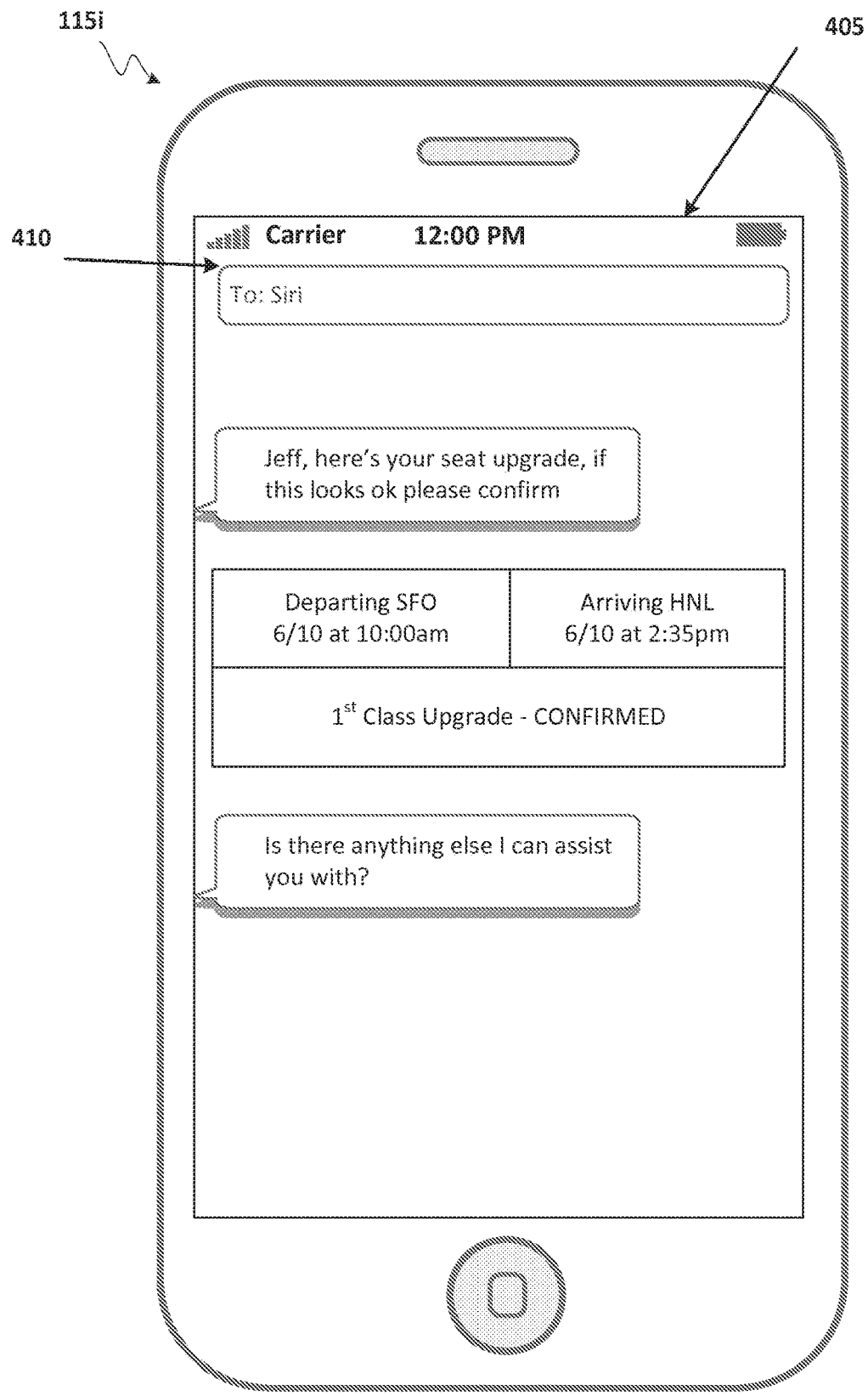

FIG. 4J shows that the representative has completed the user's request to upgrade seats. Further, the user is presented with a confirmation within the communication session 405.

Figure 5A:
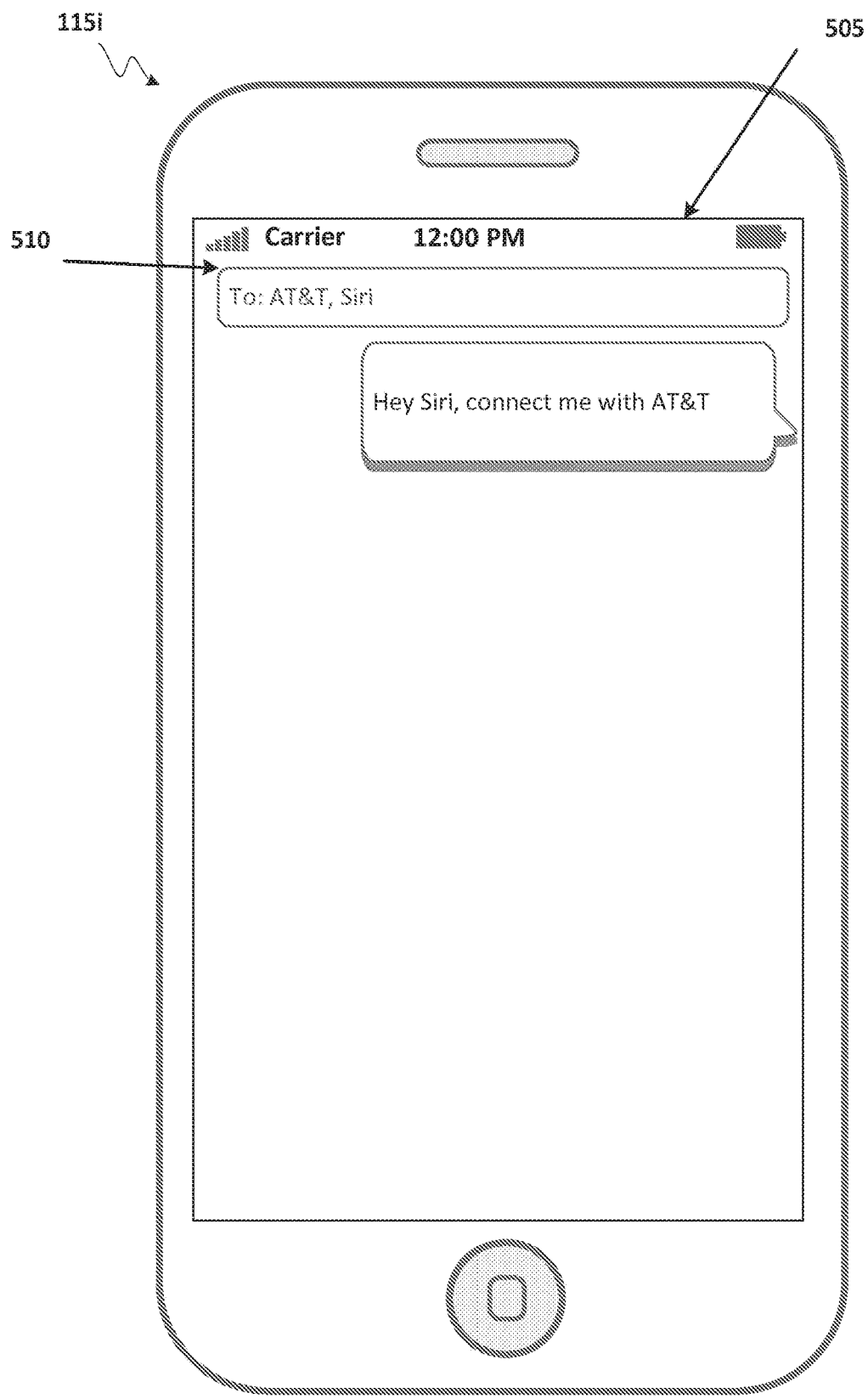
FIGS. 5A-5J shown another example of a virtual assistant assisting a participant of a communication session to communicate with a $3^{rd}$ party service.

FIGS. 5A-5J show another example of a virtual assistant assisting a participant of a communication session to communicate with a $3^{rd}$ party service. FIGS. 5A-5J will be discussed in view of the systems shown in FIG. 1 and FIG. 2. FIG. 5A shows a client device $115_i$ used to conduct a communication session 505. The communication session 505 can be facilitated by communication application 205.

The communication session 505 can include a recipient list 410 identifying the other participants of the communication session 505. As shown, the only other participant of the communication session 505 is virtual assistant 210. Accordingly, messages provided by the user of the client device $115_i$ as part of the communication session 505 will only be presented on the client device $115_i$ and will not be transmitted to another client device 115. As shown, the user has entered a message directed to the virtual assistant 210 and requesting that the virtual assistant 210 assist the user communicate with a specified telephone provider.

Figure 5B:
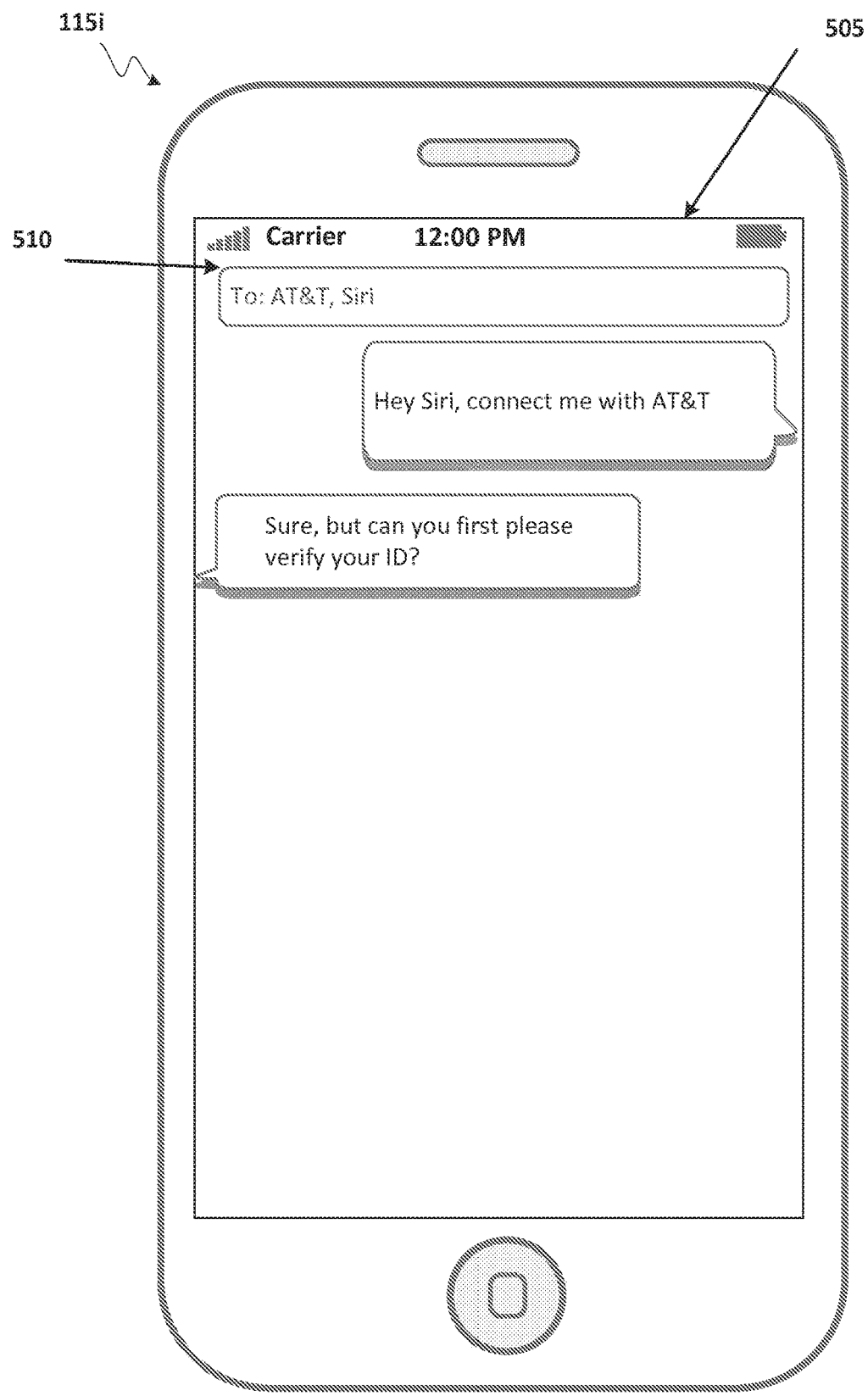
Figure 5C:
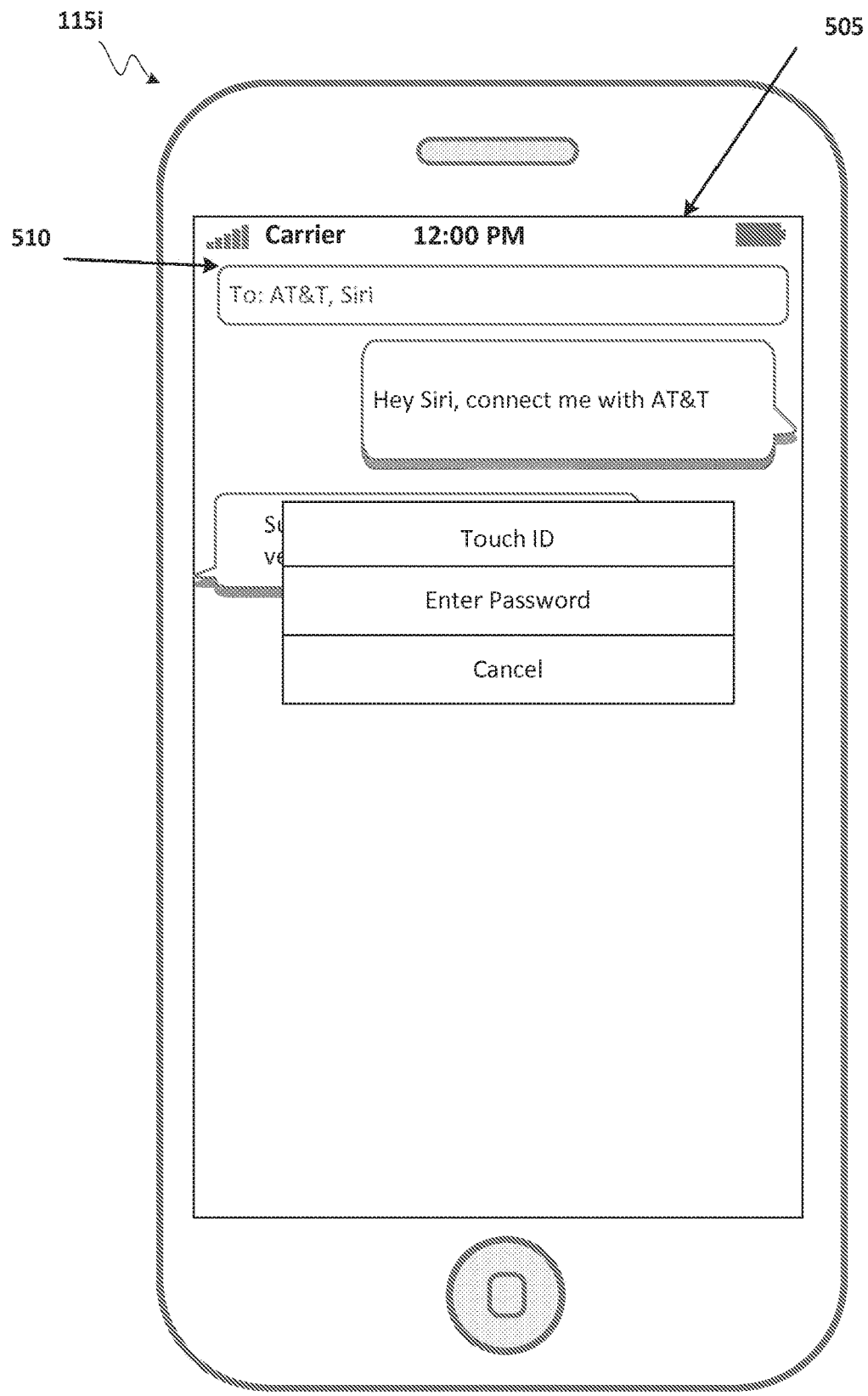

FIG. 5B shows that the virtual assistant 210 presented a follow up message responding to the users request and prompting the user to present authentication information. FIG. 5C shows that the user is prompted to either enter their password or, alternatively, authorize using their fingerprint.

Figure 5D:
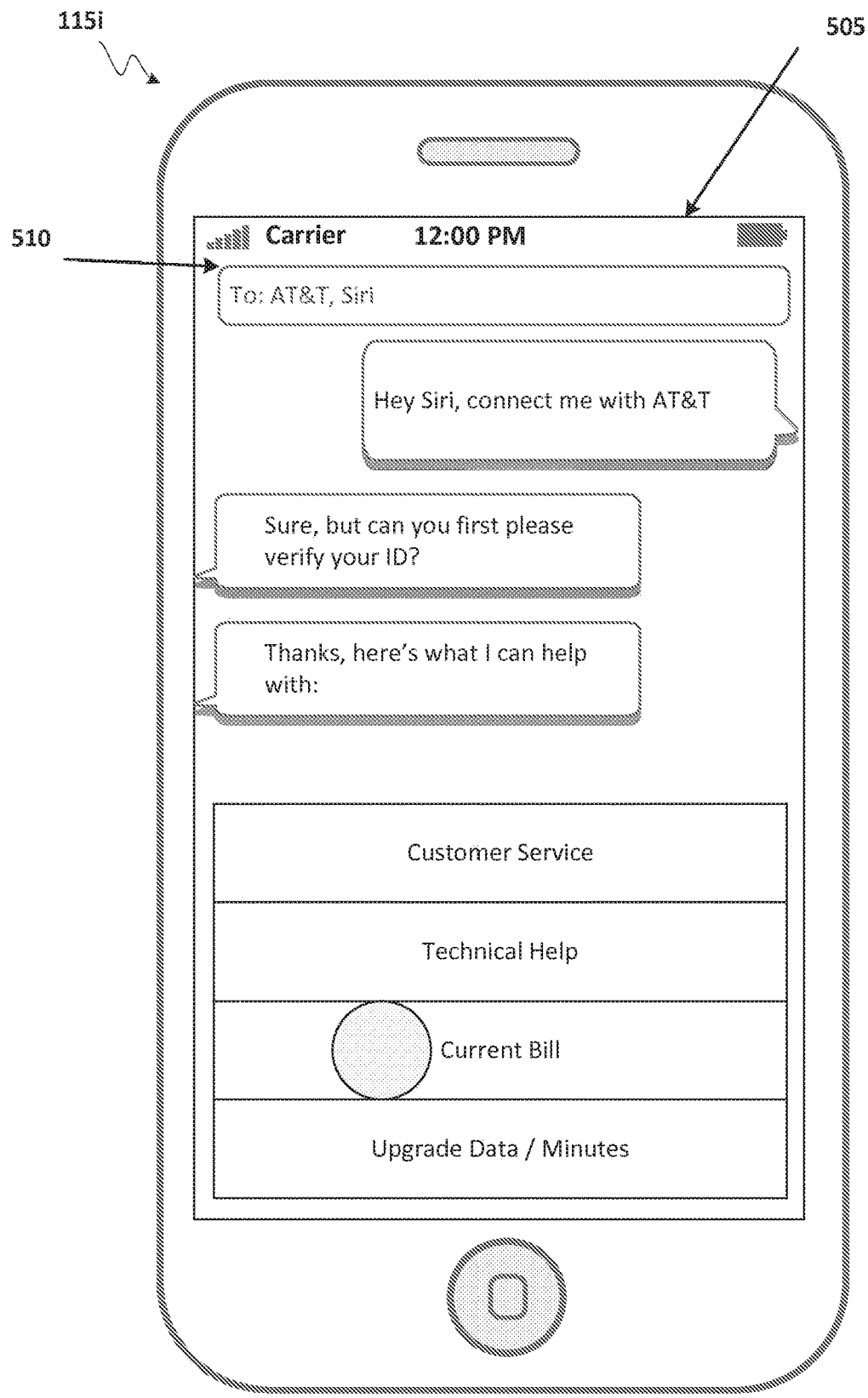

FIG. 5D shows that the virtual assistant 210 has presented the user with a poll to select from the services provided by the $3^{rd}$ party service. The virtual assistant 210 can identify the services from the set of communication instructions for the $3^{rd}$ party service.

Figure 5E:
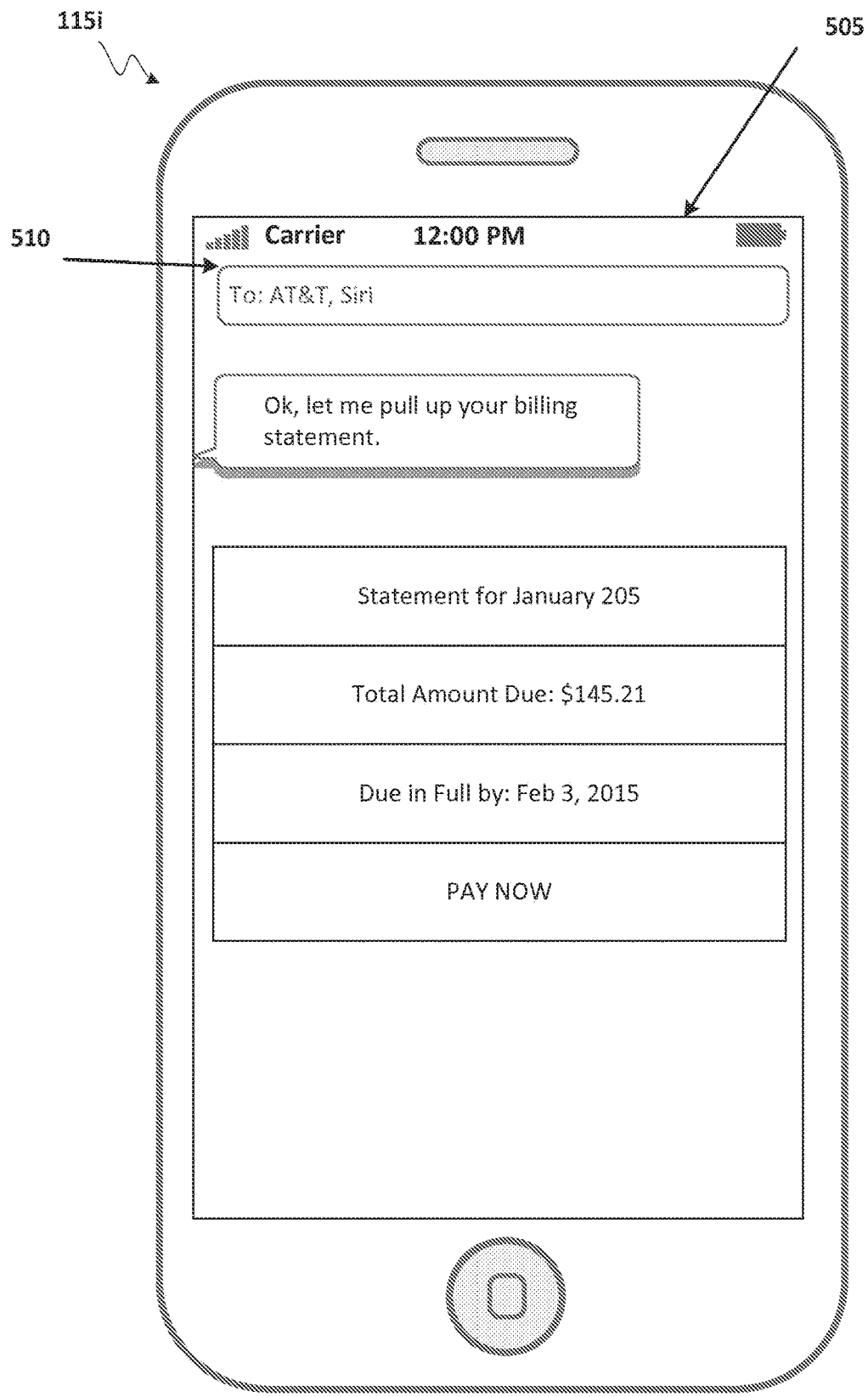

FIG. 5E shows that the virtual assistant 210 has presented the user with the user's current billing statement. The virtual assistant can use the set of communication instructions to gather the required data and commands to request the user's current billing statement, which can be presented as part of the communication session 505. Further, the user can select to pay the current bill through the communication session 505.

Figure 5F:
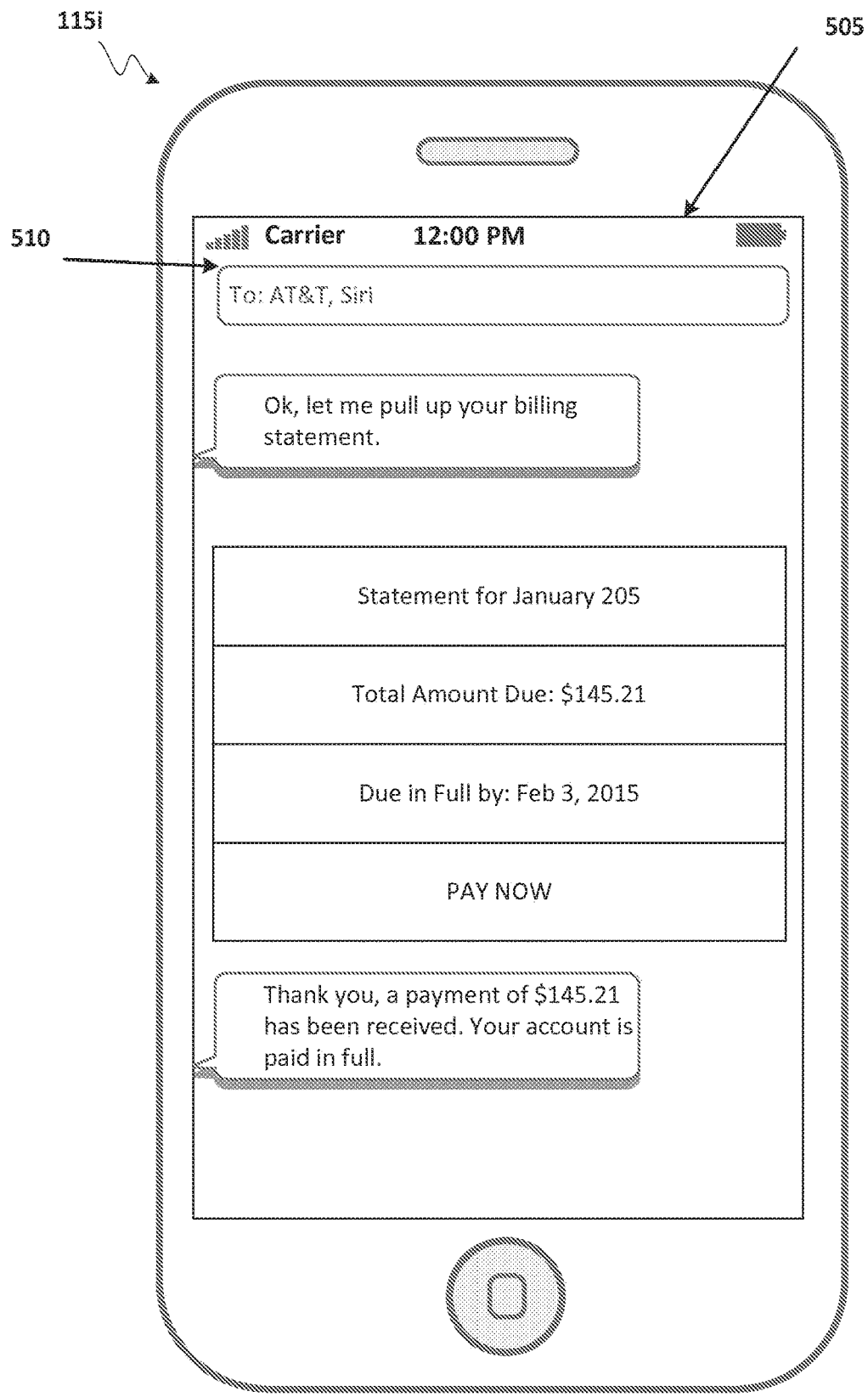

FIG. 5F shows that the user has been presented with confirmation that the user's payment has been received by the 3$^{rd}$ party service.

Figure 5G:
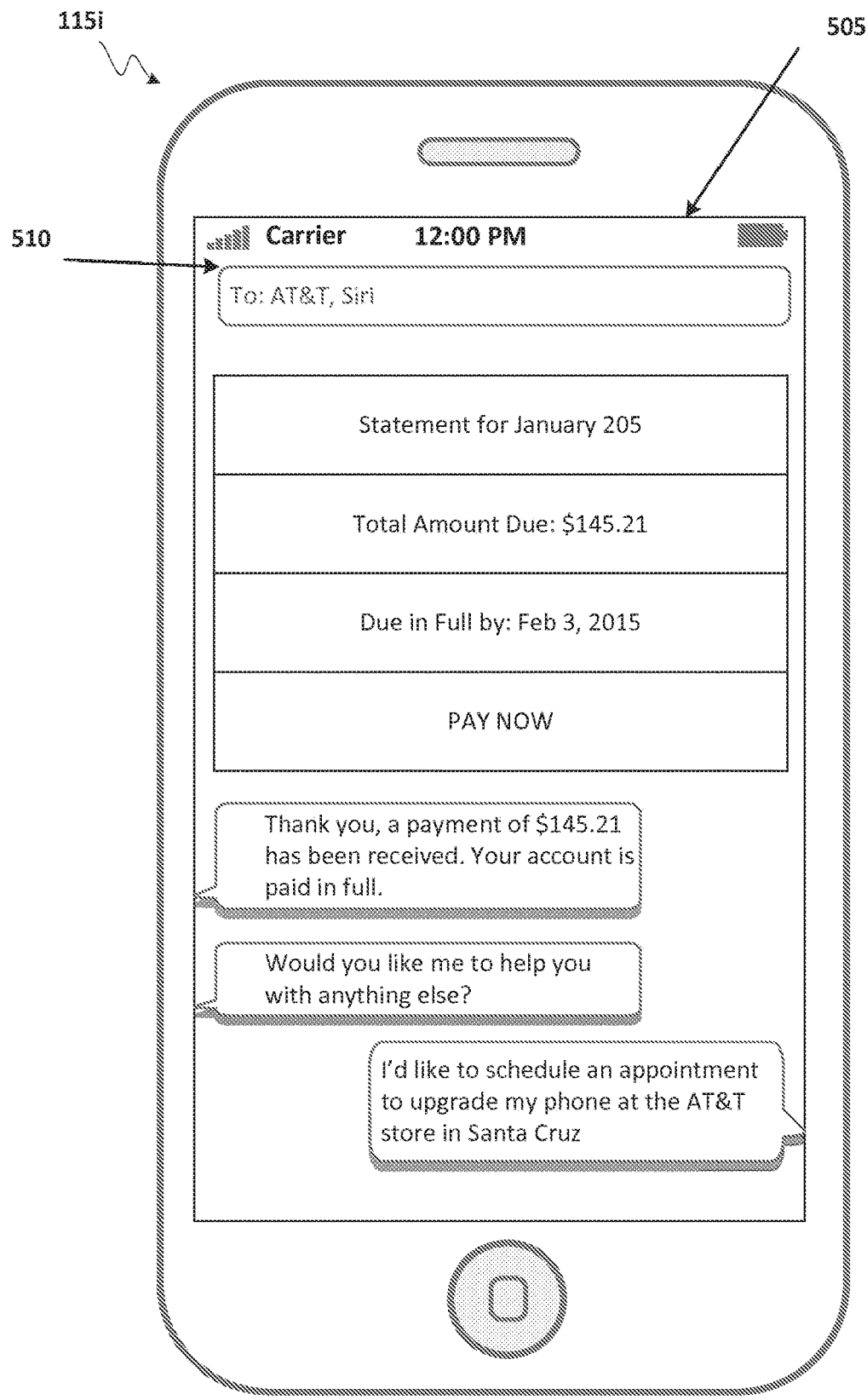

FIG. 5G shows that the virtual assistant 210 has prompted the user regarding whether the user needs further assistance. As shown, the user has responded that the user would like assistance scheduling an in-store appointment.

Figure 5H:
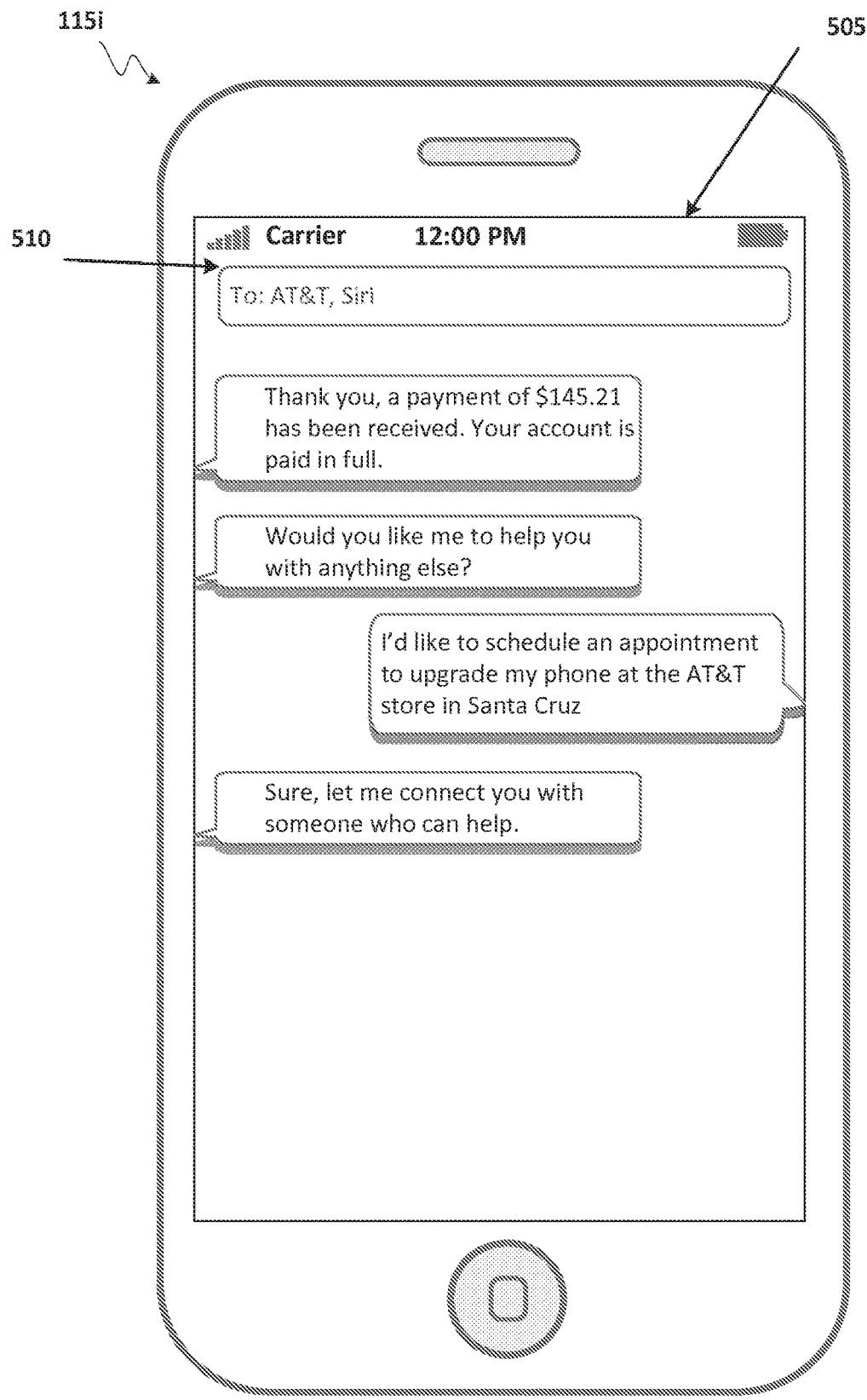

FIG. 5H shows that the virtual assistant 210 has responded to the user indicating that the virtual assistant will assist the user connect to a representative of the 3rd party service.

Figure 5I:
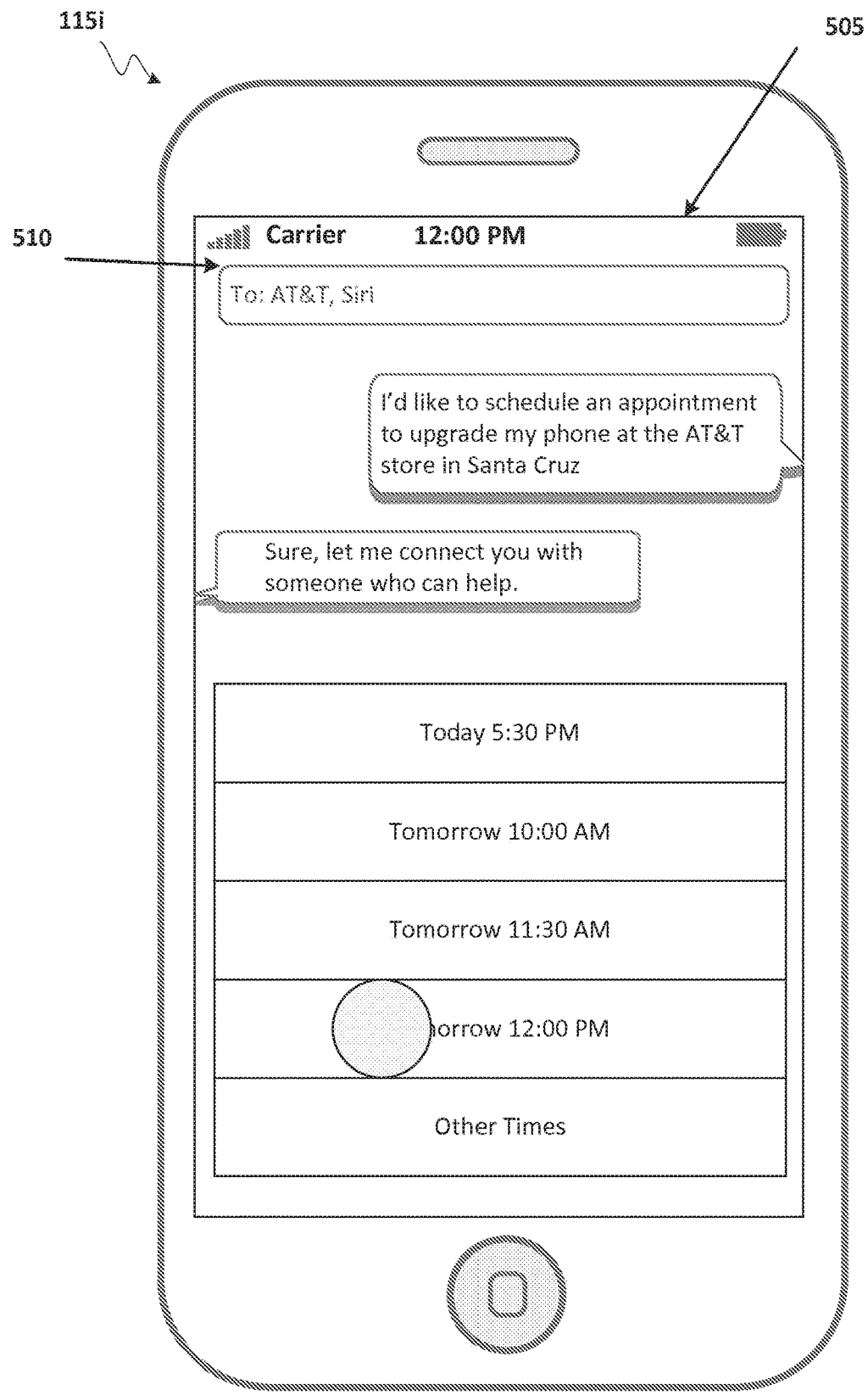

FIG. 5I shows that the user has been connected with a representative of the 3$^{rd}$ party service and that the virtual assistant 210 is assisting the parties schedule a time to meet. As shown, the virtual assistant 210 has presented the user with a poll that lists multiple candidate times for the meeting. The virtual assistant 210 can gather data from a calendar of the user and the 3$^{rd}$ party service to identify the set of candidate times during which both parties are free. A user can select one of the presented time to schedule the meeting.

Figure 5J:
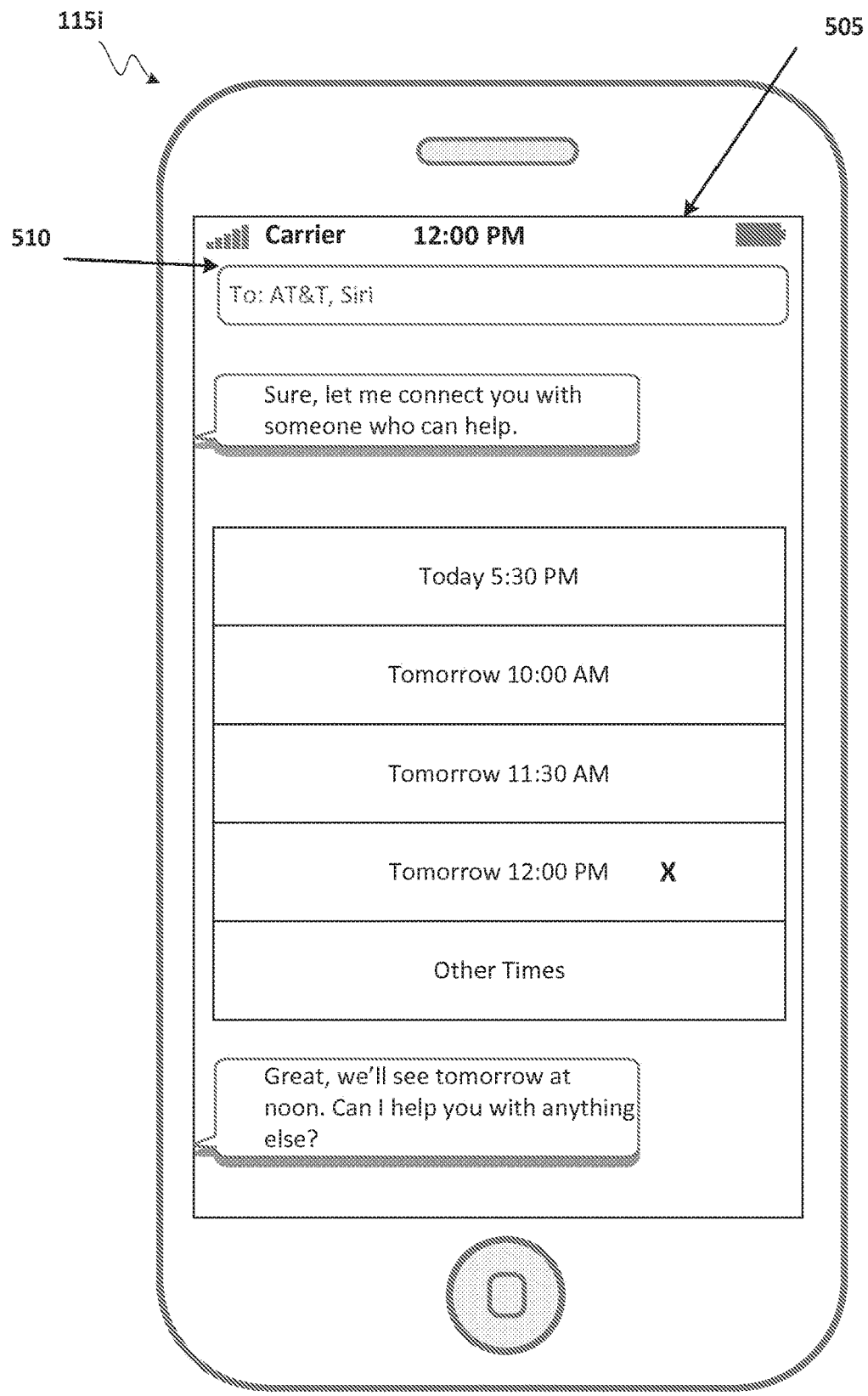

FIG. 5J shows that after the user has selected a time for the meeting, the representative of the 3$^{rd}$ party service has presented the user with a message confirming the meeting.

Figure 6A:
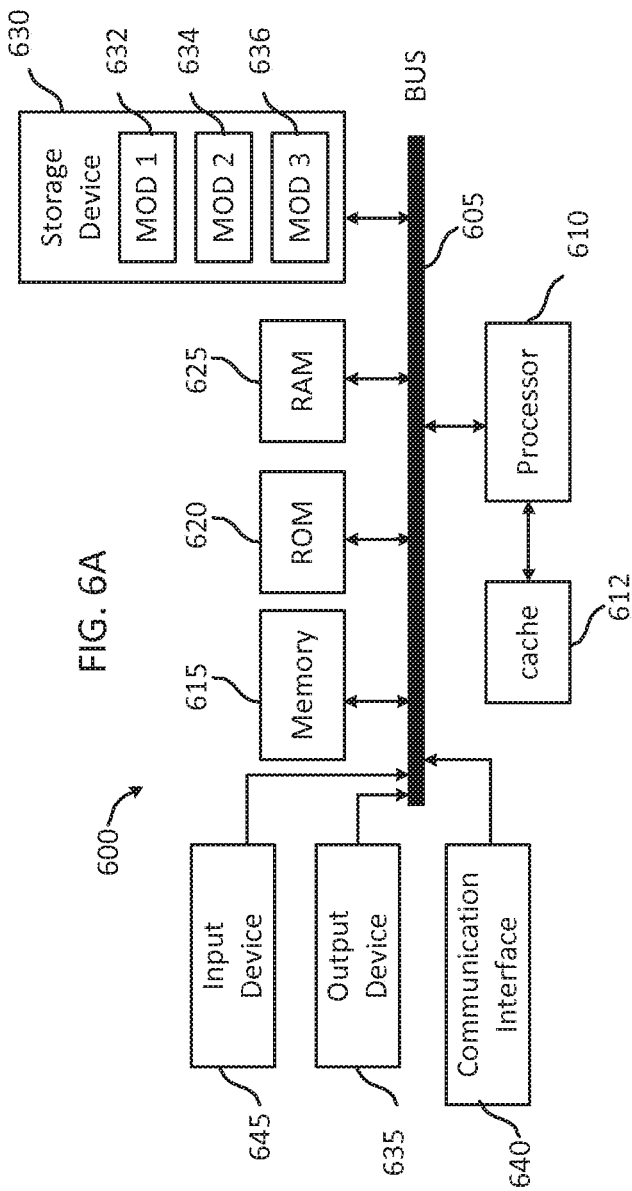
FIGS. 6A and 6B illustrate exemplary possible system embodiments.
Figure 6B:
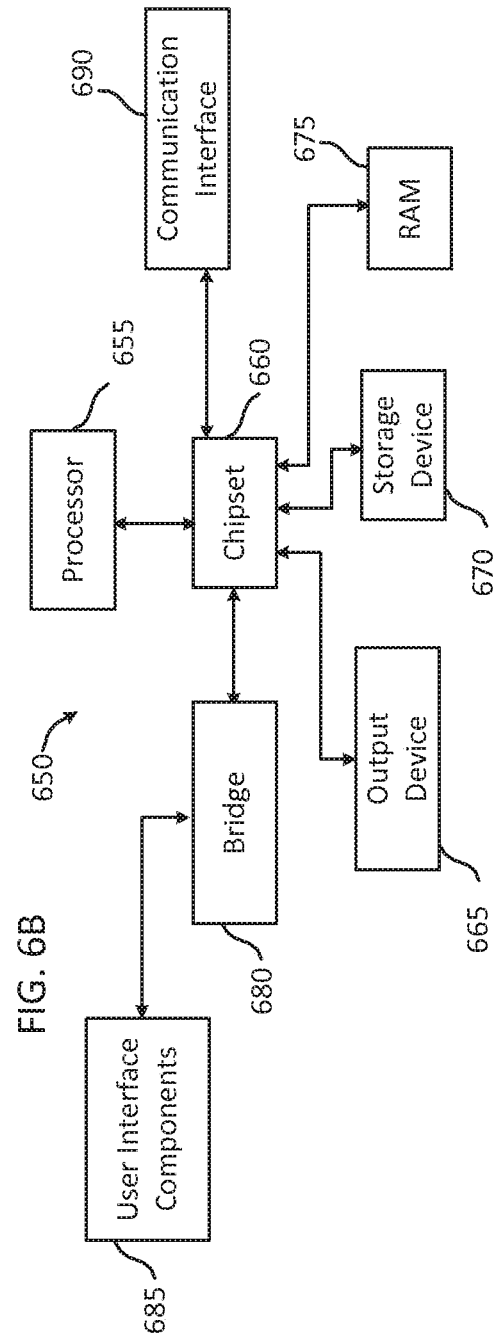

FIG. 6A, and FIG. 6B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 520 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that exemplary systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A non-transitory computer-readable medium storing one or more programs comprising instructions, wherein the instructions, when executed by one or more processors of an electronic device, cause to the electronic device to:
receive a message transmitted during a communication session from a first user of a plurality of users to a second user of the plurality of users, wherein the communication session is a conversation between the plurality of users;
determine whether a virtual assistant is capable of facilitating a third party service associated with content of the message;
in accordance with a determination that the virtual assistant is capable of facilitating the third party service associated with the content of the message:
identify one or more values associated with a third party service provided by a third party;
transmit the one or more values to the third party;
receive a response message from the third party regarding the third party service; and
display, in the communication session, information corresponding to the response message received from the third party regarding the third party service.

2. The non-transitory computer-readable storage medium of claim 1, wherein determining whether the virtual assistant is capable of facilitating the third party service associated with the content of the message further comprises:
analyzing the message; and
identifying at least one task associated with the message.

3. The non-transitory computer-readable storage medium of claim 2, wherein analyzing the message further comprises performing semantic analysis on text within the message.

4. The non-transitory computer-readable storage medium of claim 3, wherein performing semantic analysis further comprises utilizing natural language processing.

5. The non-transitory computer-readable storage medium of claim 1, wherein the instructions, which when executed by the one or more processors, further cause the electronic device to:
display the virtual assistant as a participant of the communication session.

6. The non-transitory computer-readable storage medium of claim 1, wherein the third party service is associated with at least one of an airline, a bank, a restaurant, an insurance company, and/or a store.

7. The non-transitory computer-readable storage medium of claim 1, wherein the instructions, which when executed by the one or more processors, further cause the electronic device to:
prompt at least one user of the plurality of users regarding whether the at least one user prefers to utilize the virtual assistant in the communication session.

8. The non-transitory computer-readable storage medium of claim 1, wherein the conversation is an instant messaging conversation.

9. The non-transitory computer-readable storage medium of claim 1, wherein determining whether a virtual assistant is capable of facilitating a third party service associated with content of the message further comprises identifying the third party service based on at least user history information and/or user preference information.

10. The non-transitory computer-readable storage medium of claim 1, wherein determining whether a virtual assistant is capable of facilitating a third party service associated with content of the message further comprises analyzing at least one message entered by the second user of the plurality of users.

11. The non-transitory computer-readable storage medium of claim 1, wherein the instructions, which when executed by the one or more processors, further cause the electronic device to:
connect the electronic device to the third party;
determine that a predetermined amount of time has elapsed during which messages have not been entered as part of the communication session; and in accordance with a determination that the predetermined amount of time has elapsed during which messages have not been entered as part of the communication session, disconnect the electronic device from the third party.

12. The non-transitory computer-readable storage medium of claim 1, wherein determining whether a virtual assistant is capable of facilitating a third party service associated with content of the message further comprises determining at least one service associated with the third party.

13. The non-transitory computer-readable storage medium of claim 12, wherein determining at least one service associated with the third party further comprises:
displaying, in the communication session, at least one service;
receiving, from the first user of the plurality of users, a selection of a displayed service.

14. The non-transitory computer-readable storage medium of claim 1, wherein the instructions, which when executed by the one or more processors, further cause the electronic device to:
prompt the first user of the plurality of users to provide the one or more values associated with the third party service provided by the third party.

15. The non-transitory computer-readable storage medium of claim 1, wherein the instructions, which when executed by the one or more processors, further cause the electronic device to:
add, by the virtual assistant, at least one additional user to the communication session.

16. The non-transitory computer-readable storage medium of claim 1, wherein the instructions, which when executed by the one or more processors, further cause the one or more processors to:
establish, by the virtual assistant, communication between at least one user of the communication session and at least one representative of the third party service.

17. An electronic device comprising:
one or more processors;
a memory; and
one or more programs, wherein the one or more programs are stored in the memory and configured to be executed by the one or more processors, the one or more programs including instructions for:
receiving a message transmitted during a communication session from a first user of a plurality of users to a second user of the plurality of users, wherein the communication session is a conversation between the plurality of users;
determining whether a virtual assistant is capable of facilitating a third party service associated with content of the message;
in accordance with a determination that the virtual assistant is capable of facilitating the third party service associated with the content of the message:
identifying one or more values associated with a third party service provided by a third party;
transmitting the one or more values to the third party;
receiving a response message from the third party regarding the third party service; and
displaying, in the communication session, information corresponding to the response message received from the third party regarding the third party service.

18. The electronic device of claim 17, wherein determining whether the virtual assistant is capable of facilitating the third party service associated with the content of the message further comprises:
analyzing the message; and
identifying at least one task associated with the message.

19. The electronic device of claim 18, wherein analyzing the message further comprises performing semantic analysis on text within the message.

20. The electronic device of claim 19, wherein performing semantic analysis further comprises utilizing natural language processing.

21. The electronic device of claim 17, wherein the one or more programs further include instructions for:
displaying the virtual assistant as a participant of the communication session.

22. The electronic device of claim 17, wherein the third party service is associated with at least one of an airline, a bank, a restaurant, an insurance company, and/or a store.

23. The electronic device of claim 17, wherein the one or more programs further include instructions for:
prompting at least one user of the plurality of users regarding whether the at least one user prefers to utilize the virtual assistant in the communication session.

24. The electronic device of claim 17, wherein the conversation is an instant messaging conversation.

25. The electronic device of claim 17, wherein determining whether a virtual assistant is capable of facilitating a third party service associated with content of the message further comprises identifying the third party service based on at least user history information and/or user preference information.

26. The electronic device of claim 13, wherein determining whether a virtual assistant is capable of facilitating a third party service associated with content of the message further comprises analyzing at least one message entered by the second user of the plurality of users.

27. The electronic device of claim 13, wherein the one or more programs further include instructions for:
connecting the electronic device to the third party;
determining that a predetermined amount of time has elapsed during which messages have not been entered as part of the communication session; and
in accordance with a determination that the predetermined amount of time has elapsed during which messages have not been entered as part of the communication session, disconnecting the electronic device from the third party.

28. The electronic device of claim 13, wherein determining whether a virtual assistant is capable of facilitating a third party service associated with content of the message further comprises determining at least one service associated with the third party.

29. The electronic device of claim 28, wherein determining at least one service associated with the third party further comprises:
displaying, in the communication session, at least one service;
receiving, from the first user of the plurality of users, a selection of a displayed service.

30. The electronic device of claim 13, wherein the one or more programs further include instructions for:
prompting the first user of the plurality of users to provide the one or more values associated with the third party service provided by the third party.

31. The electronic device of claim 17, wherein the one or more programs further include instructions for:

adding, by the virtual assistant, at least one additional user to the communication session.

32. The electronic device of claim 17, wherein the one or more programs further include instructions for:
establishing, by the virtual assistant, communication between at least one user of the communication session and at least one representative of the third party service.

33. A method comprising:
at an electronic device:
receiving a message transmitted during a communication session from a first user of a plurality of users to a second user of the plurality of users, wherein the communication session is a conversation between the plurality of users;
determining whether a virtual assistant is capable of facilitating a third party service associated with content of the message;
in accordance with a determination that the virtual assistant is capable of facilitating the third party service associated with the content of the message:
identifying one or more values associated with a third party service provided by a third party;
transmitting the one or more values to the third party;
receiving a response message from the third party regarding the third party service; and
displaying, in the communication session, information corresponding to the response message received from the third party regarding the third party service.

34. The method of claim 33, wherein determining whether the virtual assistant is capable of facilitating the third party service associated with the content of the message further comprises:
analyzing the message; and
identifying at least one task associated with the message.

35. The method of claim 34, wherein analyzing the message further comprises performing semantic analysis on text within the message.

36. The method of claim 35, wherein performing semantic analysis further comprises utilizing natural language processing.

37. The method of claim 33, further comprising:
displaying the virtual assistant as a participant of the communication session.

38. The method of claim 33, wherein the third party service is associated with at least one of an airline, a bank, a restaurant, an insurance company, and/or a store.

39. The method of claim 33, further comprising:
prompting at least one user of the plurality of users regarding whether the at least one user prefers to utilize the virtual assistant in the communication session.

40. The method of claim 33, wherein the conversation is an instant messaging conversation.

41. The method of claim 33, wherein determining whether a virtual assistant is capable of facilitating a third party service associated with content of the message further comprises identifying the third party service based on at least user history information and/or user preference information.

42. The method of claim 33, wherein determining whether a virtual assistant is capable of facilitating a third party service associated with content of the message further comprises analyzing at least one message entered by the second user of the plurality of users.

43. The method of claim 33, further comprising:
connecting the electronic device to the third party;
determining that a predetermined amount of time has elapsed during which messages have not been entered as part of the communication session; and
in accordance with a determination that the predetermined amount of time has elapsed during which messages have not been entered as part of the communication session, disconnecting the electronic device from the third party.

44. The method of claim 33, wherein determining whether a virtual assistant is capable of facilitating a third party service associated with content of the message further comprises determining at least one service associated with the third party.

45. The method of claim 44, wherein determining at least one service associated with the third party further comprises:
displaying, in the communication session, at least one service;
receiving, from the first user of the plurality of users, a selection of a displayed service.

46. The method of claim 33, further comprising:
prompting the first user of the plurality of users to provide the one or more values associated with the third party service provided by the third party.

47. The method of claim 33, further comprising:
adding, by the virtual assistant, at least one additional user to the communication session.

48. The method of claim 33, further comprising:
establishing, by the virtual assistant, communication between at least one user of the communication session and at least one representative of the third party service.

* * * * *